(12) United States Patent
Mitani et al.

(10) Patent No.: US 12,492,182 B2
(45) Date of Patent: Dec. 9, 2025

(54) HYDROXYTRIAZINE COMPOUNDS AND PHARMACEUTICAL USE THEREOF

(71) Applicant: Japan Tobacco Inc., Tokyo (JP)

(72) Inventors: Ikuo Mitani, Osaka (JP); Yutaro Hirono, Osaka (JP); Masaki Yamashita, Osaka (JP)

(73) Assignee: Japan Tobacco Inc., Tokyo (JP)

( * ) Notice: Subject to any disclaimer, the term of this patent is extended or adjusted under 35 U.S.C. 154(b) by 0 days.

(21) Appl. No.: 18/114,043

(22) Filed: Feb. 24, 2023

(65) Prior Publication Data

US 2024/0076278 A1 Mar. 7, 2024

Related U.S. Application Data

(63) Continuation of application No. 16/807,719, filed on Mar. 3, 2020, now abandoned, which is a
(Continued)

(30) Foreign Application Priority Data

Aug. 17, 2015 (JP) .................................. 2015-160284

(51) Int. Cl.
| | |
|---|---|
| *C07D 251/22* | (2006.01) |
| *A61K 31/53* | (2006.01) |
| *A61P 9/10* | (2006.01) |
| *A61P 19/02* | (2006.01) |
| *A61P 25/04* | (2006.01) |
| *A61P 27/02* | (2006.01) |
| *A61P 27/06* | (2006.01) |
| *A61P 29/00* | (2006.01) |
| *C07D 401/04* | (2006.01) |

(52) U.S. Cl.
CPC ............ *C07D 401/04* (2013.01); *A61K 31/53* (2013.01); *A61P 19/02* (2018.01); *A61P 27/06* (2018.01); *C07D 251/22* (2013.01)

(58) Field of Classification Search
CPC .... C07D 251/22; C07D 401/04; A61K 31/53; A61P 9/10; A61P 19/02; A61P 25/04; A61P 27/02; A61P 27/06; A61P 29/00
See application file for complete search history.

(56) References Cited

U.S. PATENT DOCUMENTS

| | | | |
|---|---|---|---|
| 3,293,247 A | 12/1966 | Duennenberger et al. | |
| 5,955,060 A | 9/1999 | Huglin et al. | |

(Continued)

FOREIGN PATENT DOCUMENTS

| | | |
|---|---|---|
| BE | 661225 | 9/1965 |
| CA | 2746427 | 6/2010 |

(Continued)

OTHER PUBLICATIONS

U.S. Appl. No. 15/228,681, filed Aug. 4, 2016, Gharat et al.
(Continued)

*Primary Examiner* — Brenda L Coleman
(74) *Attorney, Agent, or Firm* — Fish & Richardson P.C.

(57) ABSTRACT

The present invention provides a compound having an mPGES-1 inhibitory activity and useful for the prophylaxis or treatment of pain, rheumatism, osteoarthritis, fever, Alzheimer's disease, multiple sclerosis, arteriosclerosis, glaucoma, ocular hypertension, ischemic retinal disease, systemic scleroderma and/or cancer including colorectal cancer.

The present invention relates to a compound of formula [I-a], [I-b] or [I-c] or a pharmaceutically acceptable salt thereof:

wherein each symbol is as defined in the specification.

9 Claims, No Drawings

Related U.S. Application Data continuation of application No. 15/237,763, filed on Aug. 16, 2016, now abandoned.

(56) References Cited

U.S. PATENT DOCUMENTS

| | | | |
|---|---|---|---|
| 6,096,753 | A | 8/2000 | Spohr et al. |
| 6,265,405 | B1 | 7/2001 | Cox et al. |
| 6,410,729 | B1 | 6/2002 | Spohr et al. |
| 6,414,149 | B1 | 7/2002 | Chu-Moyer et al. |
| 6,420,385 | B1 | 7/2002 | Spohr et al. |
| 6,465,461 | B1 | 10/2002 | Cox et al. |
| 6,602,875 | B2 | 8/2003 | Chu-Moyer et al. |
| 6,610,698 | B2 | 8/2003 | Spohr et al. |
| 6,649,604 | B2 | 11/2003 | Spohr et al. |
| 6,660,740 | B1 | 12/2003 | Chu-Moyer et al. |
| 6,869,943 | B2 | 3/2005 | Chu-Moyer et al. |
| 6,936,600 | B2 | 8/2005 | Chu-Moyer et al. |
| 8,592,580 | B2 | 11/2013 | Lochead et al. |
| 8,648,200 | B2 | 2/2014 | Hughes et al. |
| 8,716,474 | B2 | 5/2014 | Kamimoto et al. |
| 8,822,521 | B2 | 9/2014 | Taggi et al. |
| 8,871,777 | B2 | 10/2014 | Liu et al. |
| 8,951,999 | B2 | 2/2015 | Priepke et al. |
| 8,952,150 | B2 | 2/2015 | Schuster et al. |
| 9,096,545 | B2 | 8/2015 | Gharat et al. |
| 9,115,121 | B2 | 8/2015 | Arnaud et al. |
| 9,198,433 | B2 | 12/2015 | Taggi et al. |
| 9,439,890 | B2 | 9/2016 | Gharat et al. |
| 2012/0202806 | A1 | 8/2012 | Duerrenberger et al. |
| 2012/0208839 | A1 | 8/2012 | Priepke et al. |
| 2015/0148301 | A1 | 5/2015 | Clement-Schatlo et al. |
| 2015/0266834 | A1 | 9/2015 | Nagamori et al. |
| 2015/0335023 | A1 | 11/2015 | Finkelstein et al. |
| 2018/0200229 | A1 | 7/2018 | Gharat et al. |
| 2020/0087266 | A1 | 3/2020 | Nagamori et al. |

FOREIGN PATENT DOCUMENTS

| | | |
|---|---|---|
| CA | 2769553 | 3/2011 |
| CN | 105586773 | 5/2016 |
| JP | 2002514195 | 5/2002 |
| JP | 2009292754 | 12/2009 |
| JP | 2011-525905 | 9/2011 |
| JP | 2012-511517 | 5/2012 |
| SU | 220877 | 6/1968 |
| SU | 1313854 | 5/1987 |
| WO | WO 1999/32462 | 7/1999 |
| WO | WO 2000/059510 | 10/2000 |
| WO | WO 2008/124092 | 10/2008 |
| WO | WO 2009/156860 | 12/2009 |
| WO | WO 2010/066111 | 6/2010 |
| WO | WO 2011/026835 | 3/2011 |
| WO | WO 2011/037610 | 3/2011 |
| WO | WO 2011/048004 | 4/2011 |
| WO | WO 2012/022792 | 8/2012 |
| WO | WO 2012/161965 | 11/2012 |
| WO | WO 2013/087643 | 6/2013 |
| WO | WO 2013/174947 | 11/2013 |
| WO | WO 2013/186692 | 12/2013 |
| WO | WO 2015/059618 | 4/2015 |
| WO | WO 2015/125842 | 8/2015 |
| ZA | 9710911 | 6/1998 |

OTHER PUBLICATIONS

U.S. Appl. No. 16/807,719, filed Mar. 3, 2020, Mitani et al.
Akitake et al., "Microsomal Prostaglandin E Synthase-I Is Induced in Alzheimer's Disease and Its Deletion Mitigates Alzheimer's Disease-Like Pathology in a Mouse Model", J. Neurosci. Res., 91(7):909-919 (2013).
Alsofrom et al., "A new synthesis of s-triazines," J. Heterocycl. Chem., 1976, 13(4):917-919.
Alvarez-Soria et al., "Long-term NSAID treatment directly decreases COX-2 and mPGES-1 production in the articular cartilage of patients with osteoarthritis," Osteoarthritis and Cartilage, 16(12):1484-1493 (Dec. 2008).
Appendix-Cancer, Jan. 4, 2017, 32 pages.
Boolbol et al., "Cyclooxygenase-2 Overexpression and Tumor Formation Are Blocked by Sulindac in a Murine Model of Familial Adenomatous Polyposis," Cancer Research, 56:2556-2560 (Jun. 1996).
Brunetti et al., "Synthesis of asymmetrically substituted o-hydroxyphenyl-s-triazines," Helv. Chim. Act, 1972, 55(5):1566-1595 (with English abstract—Abstract on p. 1).
Candelario-Jalil et al., "Ascorbic acid enhances the inhibitory effect of aspirin on neuronal cyclooxygenase-2-mediated prostaglandin $E_2$ production," Journal of Neuroimmunogy, 174(1-2):39-51 (Sep. 2006), Abstract, Retrieved on Nov. 4, 2016, Retrieved from <http://www.jni-journal.com/article/S0165-5728(06)00007-5/pdf>, 2 pages.
Castelino, "Lipids and eicosanoids in fibrosis: emerging targets for therapy," Curr Opin Rheumatol., 24(6):649-55 (Nov. 2012), Abstract, Retrieved on Nov. 4, 2016, Retrieved from <https://www.ncbi.nlm.nih.gov/pubmed/22810365>, 2 pages.
Cecil Textbook of Medicine, edited by Bennet, J.C., and Plum F., 20th edition, 1:1004-101 (1996).
Chang et al., "Identification and development of mPGES-1 inhibitors: where we are at?," Future Med Chem., 3(15):1909-1934 (Nov. 2011).
Chang et al., "Identification of a Novel Class of Anti-Inflammatory Compounds with Anti-Tumor Activity in Colorectal and Lung Cancers," Invest New Drugs, 30(5):1865-1877 (Oct. 2012).
Chen et al., "Myeloid cell microsomal prostaglandin E synthase-1 fosters atherogenesis in mice," Proceeding of the National Academy of Sciences, Apr. 21, 2014, 111(18):6826-6833.
Cipollone et al., "Overexpression of Functionally Coupled Cyclooxygenase-2 and Prostaglandin E Synthase in Symptomatic Atherosclerotic Plaques as a Basis of Prostaglandin $E_2$-Depending Plaque Instability," Circulation, 104:921-927 (May 2001).
Dallaporta et al., "Towards the Management of Inflammation: Recent Developments of mPGES-1 Inhibitors," Recent patents on CNS Drug Discovery, 5:70-80 (2010).
Dermer et al., Bio/Technology, 12:320 (1994).
Engblom et al., "Microsomal prostagladin E synthase-1 is the central switch during immune-induced pyresis," Nat Neurosci., 6(11):1137-1138 (2003).
English-Language Translation of International Search Report issued in PCT Application No. PCT/JP2015/054519, published on Aug. 27, 2015, 4 pages.
Fattahi et al., "Positive and negative effects of prostaglandins in Alzheimer's disease," Psychiatry and Clinical Neurosciences, 68:50-60 (May 2013).
Finetti et al., "Pharmacological Inhibition of Microsomal Prostaglandin E Synthase-1 Suppresses Epidermal Growth Factor Receptor-Mediated Tumor Growth and Angiogenesis," PLOS One, 7(7):e40576 (Jul. 2012).
Flach et al., "Topical prostaglandin E2 effects on normal human intraocular pressure", J Ocul. Pharmacol., 4(1):13-18 (1988).
Freshney et al., Culture of Animals Cells, a Manual of Basic Technique, Alan R. Liss, Inc., New York, p. 4, (1983).
Ghassemi et al., "S. 13.3 Pharmacological Inhibition of mPGES-1 Results in Reduced Pro-Fibrotic and Pro-Inflammatory Signalling in Human Scleroderma Fibroblasts," Rheumatology, 51(suppl 2):ii25-ii26 (Feb. 2012).
Goh et al., "Prostaglandin D2 reduces intraocular pressure", Br J Ophthalmol. 72(6):461-464 (Jun. 1988).
Golub et al., Science, 286:531-537 (1999).
Gomez et al., "The role of prostaglandin E2 in human vascular inflammation," PLEFA, 89(2-3):55-63 (Aug. 2013), Abstract, Retrieved Nov. 4, 2016, Retrieved from <http://www.plefa.com/article/S0952-3278(13)00094-X/abstract>, 2 pages.
Gomez-Hernandez et al., "Atorvastatin reduces the expression of prostaglandin $E_2$ receptors in human carotid atherosclerotic plaques and monocytic cells: potential implications for plaque stabilization," J Cardiovasc Pharmacol., 47(1):60-9 (Jan. 2006), Abstract, Retrieved on Nov. 4, 2016, Retrieved from <https://www.ncbi.nlm.nih.gov/pubmed/16424787>, 2 pages.

(56) References Cited

OTHER PUBLICATIONS

Guo et al., "Misoprostol Reverse Hippocampal Neuron Cyclooxygenase-2 Downstream Signaling Imbalance in Aluminum-Overload Rats," Curr Alzheimer Res., 13(9):1006-1016 (Sep. 2016).
Guo et al., "mPGES-1: A New Target for Drug Development", Progress in Pharmaceutical Sciences, 2008, 32(3):103, Abstract provided.
Hamdy et al., "New pyridone, thioxopyridine, pyrazolopyridine and pyridine derivatives that modulate inflammatory mediators in stimulated RAW 264.7 murine macrophage," EP J Med Chem., 2009, 44:4547-4556.
Hara et al., "Prostaglandin E synthases: Understanding their pathophysiological roles through mouse genetic models," 92(6):651-659 (Jun. 2010), Abstract, retrieved on Nov. 4, 2016, retrieved from <http://www.sciencedirect.com/science/article/pii/S0300908410000519>, 3 pages.
Hassan, "mPGES-1 as a novel target for arthritis," Current Opinion in Rheumatology, 16(5):623-627 (Sep. 2004) Abstract.
He et al., "Molecular Docketing and Competitive Binding Study Discovered Different Binding Modes of Microsomal Prostaglandin E Synthase-1 Inhibitors," J. Chem. Inf. Model., 51(12):3254-61 (2011).
Ikeda-Matsuo et al., "Microsomal prostaglandin E synthase-1 contributes to ischaemic excitotoxicity through prostaglandin $E_2$ $EP_3$ receptors," British Journal of Pharmacology, 160:847-859 (Jan. 2010).
International Search Report in International Application No. PCT/JP2015/054519, mailed May 12, 2015, 5 pages.
International Search Report in International Application No. PCT/JP2016/073879, dated Nov. 15, 2016, 7 pages (English Translation).
Ishikawa et al., "The Friedel-Crafts reaction of chloro-s-triazines with aromatic compounds and the synthesis of their derivatives. III. Reaction with xylenes," Yuki Gosei Kagaku Kyokaishi, 1967, 25(1):55-59 (with English translation of abstract).
Jakobsson et al., "Identification of human prostaglandin E synthase: a microsomal, glutathione-dependent, inducible enzyme, constituting a potential novel drug target," Proc Natl Acad Sci USA., 96(13):7220-7225 (Jun. 1999).
Jongthawin et al., "$PGE_2$ signaling and its biosynthesis-related enzymes in cholangiocarcinoma progression," Fumour Biol., 35(8):8051-64 (Aug. 2014), abstract, retrieved on Nov. 4, 2016, retrieved from <https://www.ncbi.nlm.nih.gov/pubmed/24839005>, 2 pages **structures and abstract only.
Kakroodi, The role of Microsomal prostaglandin synthase-1 (mPGES-1) and Ephrin B2 in Scleroderma, University of Montreal Ph.D. Dissertation of Parisa Ghassemi Kakroodi, 100 pages, Mar. 2013.
Kamei et al., "Reduced pain hypersensitivity and inflammation in mice lacking microsomal prostaglandin e synthase-1," J Biol. Chem. 279(32):33684-33695 (Aug. 2004).
Kanekura et al., "Cyclooxygenase-2 expression and prostaglandin E2 biosynthesis are enhanced in scleroderma fibroblasts and inhibited by UVA irradiation," J Rheumatol., 28(7):1568-72 (Jul. 2001), Abstract, Retrieved on Nov. 4, 2016, Retrieved from <https://www.ncbi.nlm.nih.gov/pubmed/11469463>, 2 pages.
Kihara et al., "Targeted lipidomics reveals mPGES-1-PGE2 as a therapeutic target for multiple sclerosis," Proc Natl Acad Sci USA., 106(51):21807-21812 (Dec. 2009).
Koeberle et al., "Myrtucommulone, a natural acylphloroglucinol, inhibits microsomal prostaglandin E(2) synthase-1," Br J Pharmachol., 156(6):952-961 (Mar. 2009).
Koeberle et al., "Perspective of microsomal prostaglandin E2 synthase-1 as drug target in inflammation-related disorders," Biochemical Pharmacology, 98(1):1-15 (Nov. 2015), Abstract, Retrieved on Nov. 4, 2016, Retrieved from <http://www.sciencedirect.com/science/article/pii/S000629521500338X>, 4 pages.
Kojima et al., Inflamm Regen., 31(2):157-166 (Mar. 2011).
Korotkova et al., "Characterization of microsomal prostaglandin E synthase 1 inhibitors," Basic Clin Pharmacol Toxicol., 114(1):64-9 (Jan. 2014).
Korotkova et al., "Variants of gene for microsomal prostaglandin E2 synthase show association with disease and severe inflammation in rheumatoid arthritis," Eur. J Hum Genet., 19(8):908-914 (Aug. 2011).
Kothavade et al., "Arzanol, a Potent mPGES-1 Inhibitor: Novel Anti-Inflammatory Agent," The Scientific World Journal, Hindawi Publishing Company, vol. 2013, 9 pages (Sep. 2013).
Kuroki et al., "Deletion of microsomal prostaglandin E sythase-1 protects neuronal cells from cytotoxic effects of beta-amyloid peptide fragment 31-35," Biochem Biophys Res Commun., 424(3):409-413 (Aug. 2012).
Larsson et al., "Inhibition of microsomal prostaglandin E synthase-1 as targeted therapy in cancer treatment," Prostaglandins Other Lipid Mediat., 120:161-165 (2015).
Lauro et al., "Identification of novel microsomal prostaglandin $E_2$ synthase-1 (mPGES-1) lead inhibitors from fragment Virtual Screening," European Journal of Medical Chemistry, pp. 278-287 (Jan. 2017), Abstract, Retrieved on Nov. 4, 2016, retrieved from <http://www.sciencedirect.com/science/article/pii/S0223523416307735>, 3 pages.
Leclerc et al., "Characterization of a new mPGES-1 inhibitor in rat models of inflammation," Prostaglandins Other Lipid Mediat., 102-103:1-12 (Apr.-May 2013), Abstract, Retrieved on Nov. 4, 2016, Retrieved from <https://www.ncbi.nlm.nih.gov/pubmed/?term=LeClerc+et.+al.+Prostaglandins+%26+Other+Lipid+Mediators%2C+vol.+102-103%2C+pp.+1-12.>, 2 pages.
Li et al., "[Effect of mPGES-1 inhibitor MK886 on cell cycle of leukemia HL-60 cells]," Zhonqquo Shi Yan Xue Ye Xue Za Zhi, 20(5):1072-6 (Oct. 2012), English Abstract, 2 pages.
Lu et al., "Microsomal Prostaglandin E Synthase-1 Inhibits PTEN and Promotes Experimental Cholangiocarinogenesis and Tumor Progression," Gastroenterology, 140(7):2084-2094 (Jun. 2011).
Luz et al., "Crystal Structures of mPGES-1 Inhibitor Complexes Form a Basis for the Rational Design of Potent Analgesic and Anti-Inflammatory Therapeutics," J. Med. Chem., 58(11):4727-4737 (May 2015), Abstract, Retrieved on Nov. 4, 2016, Retrieved from <http://pubs.acs.org/doi/abs/10.1021/acs.jmedchem.5b00330>, 2 pages.
Maione et al., "Anti-inflammatory and analgesic activity of carnosol and carnosic acid in vivo and in vitro and in silico analysis of their target interactions," Br J Pharmacol., (Jul. 2016), Abstract, Retrieved on Nov. 4, 2016, Retrieved from <https://www.ncbi.nlm.nih.gov/pubmed/27464306>, 2 pages.
Mashkovskiy, "Medicinal Drugs," Doctors Manual, 2001, 1:1-3, 6 pages (with English Translation).
Masuko-Hongo et al., "Up-regulation of microsomal prostaglandin E synthase 1 in osteoarthritic human cartilage: critical roles of the ERK-1/2 and p38 signaling pathways," Arthritis Rheum., 50(9):2829-38 (Sep. 2004).
Mbalaviele et al., "Distinction of microsomal prostaglandin E synthase-1 (mPGES-1) inhibition from cyclooxygenase-2 inhibition in cells using a novel, selective mPGES-1 inhibitor," Biochem Pharmacol., 79(10):1445-54 (May 2010), Abstract, Retrieved on Nov. 4, 2016, Retrieved from <http://www.sciencedirect.com/science/article/pii/S0006295210000109>.
McCann et al., "Mpges-1 null mice are resistant to bleomycin-induced skin fibrosis," Arthritis Res Ther. 13(1):R6 (2011).
Mezzetti et al., "[New insights on the molecular mechanisms of type-1 angiotensin II receptor blockers and their contribution to atherosclerotic plaque stabilization]," Recenti Prog Med., 95(12):586-90 (Dec. 2004), Italian, English Abstract, Retrieved on Nov. 4, 2016, Retrieved from <https://www.ncbi.nlm.nih.gov/pubmed/15666492>, 2 pages.
Montine et al., "Elevated CSF prostaglandin E2 levels in patients with probable AD," Neurology, 53(7):1495-8 (Oct. 1999), Abstract, Retrieved on Nov. 4, 2016, Retrieved from <https://www.ncbi.nlm.nih.gov/pubmed/10534257>, 2 pages.
Mouawad et al., "Statins Modulate Cyclooxygenase-2 and Microsomal Prostaglandin E Synthase-1 in Human Hepatic Myofibroblasts," J Cell Biochem., 117(5):1176-86 (May 2016), Abstract, Retrieved on Nov. 4, 2016, Retrieved from <https://www.ncbi.nlm.nih.gov/pubmed/26477987>, 2 pages.

(56) References Cited

OTHER PUBLICATIONS

Nakajima et al., "Effects of prostaglandin E2 on intraocular pressure, anterior chamber depth and blood flow volume of the iris and the ciliary body in rabbit eyes," Nihon Ganka Gakkai Zasshi, 96(4):455-461 (Apr. 1992).
Nakanishi et al., "mPGES-1 as a Target for Cancer Suppression: A comprehensive invited review" Phospholipase $A_2$ and lipid mediators, Biochimie., 96(6):660-664 (Jun. 2010).
Platas et al., "Conditioned Media from Adipose-Tissue-Derived Mesenchymal Stem Cells Downregulate Degradative Mediators Induced by Interleukin-1β in Osteoarthritic Chondrocytes," Mediators of Inflammation, Hindawi Publishing Corporation, 2013, 11 pages.
Rullah et al., "Inhibition of prostaglandin $E_2$ production synthetic minor prenylated chalcones and flavonoids: Synthesis, biological activity, crystal structure, and in silico evaluation," Bioorganic & Medicinal Chemistry Letters, 24(16):3826-3834 (Aug. 2014), Abstract, Retrieved on Nov. 4, 2016, Retrieved from <http://www.sciencedirect.com/science/article/pii/S0960894X14006891>, 3 pages.
Samuelsson et al., "Membrane prostaglandin E synthase-1: novel therapeutic target," Pharmacol Rev., 59(3):207-224 (Sep. 2007).
Sasaki et al., "Microsomal prostaglandin E synthas-1 is involved in multiple steps of colon carcinogenesis," Oncogene., 31(24)2943-2952 (Jun. 2014).
Schaible et al., "Potent inhibition of human 5-lipoxygenase and microsomal prostaglandin $E_2$ synthase-1 by the anti-carcinogenic and anti-inflammatory agent embelin," Biochemical Pharmacology, 86(4):476-486 (Aug. 2013), Abstract, retrieved on Nov. 4, 2016, retrieved from <http://www.sciencedirect.com/science/article/pii/S0006295213002578>, 4 pages.
Sennlaub et al., "Cyclooxygenase-2 in Human and Experimental Ischemic Proliferative Reintopathy," Circulation, 108:198-204 (Jun. 2003).
Sha et al., "Necrosis in DU145 prostate cancer spheroids induces COX-2/mPGES-1-derived PGE2 to promote tumor growth and to inhibit T cell activation," Int J Cancer, 133(7):1578-88 (Oct. 2013), Abstract, Retrieved on Nov. 4, 2016, retrieved from <https://www.ncbi.nlm.nih.gov/pubmed/23536473>, 2 pages.
STN Tokyo Search Report Document, RN No. 685121-02-2, dated 2013, 1 page.
Sun et al., "Analysis of meniscal degeneration and meniscal gene expression," BMC Musculoskelet Disord., 11:19 (2010).
Takeuchi et al., "Microsomal prostaglandin E synthase-1 aggravates inflammation and demyelination in a mouse model of multiple sclerosis," Neurochem Int., 62(3):271-80 (2013).
Terzuoli et al., "Inhibition of Hypoxia Inducible Factor-1α by Dihydroxyphenylethanol, a Product from Olive Oil, Blocks Microsomal Prostaglandin-E Synthase-1/Vascular Endothelial Growth Factor Expression and Reduces Tumor Angiogenesis," Clinical Cancer Research, 16(16):4207-4216 (Aug. 2010).
Tian et al., "PGE2-EP3 signaling pathway contributes to protective effects of misoprostol on cerebral injury in APP/PSI mice," Oncotarget, 7(18):25304-25314 (Mar. 2016).
Trebino et al., "Impaired inflammatory and pain responses in mice lacking an inducible prostaglandin E synthase," Proc Natl Acad Sci USA., 100(15):9044-9049 (Jul. 2003).
Trebino et al., "Redirection of eicosanoid metabolism in mPGES-1-deficient macrophages," J Biol Chem., 280(17)16579-16585 (Apr. 2005).
Wang et al., "Deletion of microsomal prostaglandin E synthase-I augments prostacyclin and retards atherogenesis," Proc Natl Acad Sci USA., 103(39):14507-14512 (Sep. 2006).
Wang et al., "Targeting Microsomal Prostaglandin E Synthase 1 to Develop Drugs Treating the Inflammatory Diseases", American Journal of Translational Research, 2012, 13(1):391-419.
Xu et al., "MF63 [2-(6-Chloro-1H-phenanthro[9, 10-d]imidazole-2-yl)-isophthalonitrile], a Selective Microsomal Prostaglandin E Synthase-I Inhibitor, Relieves Pyresis and Pain in Preclinical Models of Inflammation," JPET., 326:754-763 (2008).
Yang et al., "Distinct Roles of Central and Peripheral Prostaglandin $E_2$ and EP Subtypes in Blood Pressure Regulation," American Journal of Hypertension, 25(10):1042-1049 (2012), Abstract, Retrieved on Nov. 4, 2016, Retrieved from <http://ajh.oxfordjournals.org/content/25/10/1042.abstract>, 2 pages.
Yanni et al., "The role of PGE2 receptor EP4 in pathologic ocular angiogenesis," Invest Ophthalmol Vis Sci., 50(11):5479-5486 (Nov. 2009).

HYDROXYTRIAZINE COMPOUNDS AND PHARMACEUTICAL USE THEREOF

TECHNICAL FIELD

The present invention relates to a hydroxytriazine compound having a microsomal prostaglandin E2 synthase-1 (mPGES-1) inhibitory activity or a pharmaceutically acceptable salt thereof, a pharmaceutical composition containing same, pharmaceutical use thereof and the like.

BACKGROUND ART

Non-steroidal anti-inflammatory drugs (NSAIDs) are often used for the treatment of diseases accompanying inflammation, fever and pain, for example, rheumatism, osteoarthritis, headache and the like. NSAIDs show an anti-inflammatory action, an antipyretic action and an analgesic action by preventing production of prostanoids by inhibiting cyclooxygenase (COX).

COX includes two isoforms of COX-1 which is ubiquitously distributed and constitutively expressed, and COX-2 which expression is induced by various pro-inflammatory stimulations, for example, cytokines such as interleukin-1β (IL-1β) and the like. COX-1 and COX-2 are enzymes that convert arachidonic acid derived from cell membrane phospholipids to prostaglandin H2 (PGH2) which is a prostanoid precursor. Specific prostanoid synthases are responsible for the conversion of PGH2 to respective prostanoids (prostaglandin E2 (PGE2), prostaglandin F2α (PGF2α), prostaglandin I2 (PGI2), prostaglandin D2 (PGD2), thromboxane A2 (TXA2) etc.). These prostanoids have various physiological activities, for example, induction/suppression of inflammation, vasodilation/vasoconstriction, bronchodilation/bronchoconstriction, induction of/awakening from sleep, development of fever and the like. PGE2 is the most commonly existing prostaglandin in living organisms, and is known to be deeply involved in inflammation, pain and fever. Therefore, suppression of PGE2 production is considered the main action mechanism of NSAIDs.

Inhibition of COX-1 or COX-2 suppresses all prostanoids production in the downstream thereof. This is considered to cause side effects of NSAIDs. Since NSAIDs that non-selectively inhibit COX also suppress production of PGE2 by COX-1 and PGE2 protectively acts on stomach mucosal injury, NSAIDs are considered to suppress secretion of gastric mucus and gastric mucosal blood flow, thereby increasing the risk of stomach perforations, bleeding and the like. While COX-2 selective inhibitors suppress production of PGI2 having a vasodilation action and a platelet aggregation inhibitory action in vascular endothelial cells, they do not suppress production of TXA2 which is a blood coagulation factor produced by platelet COX-1. Therefore, they are considered to disrupt the balance of the blood coagulation system to increase the risk of cardiovascular disorder.

Microsomal prostaglandin E2 synthase-1 (mPGES-1) is an enzyme that catalyzes the final step of PGE2 biosynthesis, and belongs to the membrane-associated proteins in eicosanoid and glutathione metabolism family (MAPEG family). The human mPGES-1 gene was cloned in 1999, and indicated to be constitutively expressed in placenta, prostate, testis and mammary gland (non-patent document 1). In other organs, human mPGES-1 gene expression is induced by various pro-inflammatory stimulations, conjugated with COX-2. For example, inflammatory cytokine IL-1β and Tumor Necrosis Factor-α (TNF α) induce mPGES-1 expression in synovial cell, osteoblast, endothelial cell, orbital fibroblast, gingival cell, chondrocyte, endothelial cell, myocardial cell and the like. For example, Lipopolysaccharide (LPS), which is a bacterial endotoxin, induces mPGES-1 expression in macrophage, smooth muscle and the like.

mPGES-1 inhibitor is considered to selectively suppress PGE2 production only in the topical site of inflammation or tissues where mPGES-1 is expressed, and does not suppress production of prostanoids (PGI2, PGD2, PGF2α, TXA2 etc.) other than PGE2 (non-patent documents 2, 3). Therefore, mPGES-1 inhibitor is considered to be a medicament having an efficacy equivalent to that of NSAIDs but free of side effects of NSAIDs derived from a decreased production of prostanoids other than PGE2.

It is also known that when one of the metabolism pathways downstream from PGH2 is shut off in the arachidonic acid is cascade, PGH2 is converted to prostanoids other than the shut-off pathway, or shunt occurs. That is, it is known that while the production amount of PGE2 in macrophage derived from mPGES-1 knockout mice stimulated with LPS becomes lower than the PGE2 production amount in macrophage derived from wild-type (WT) mice stimulated with LPS, the production amounts of TXB2, PGI2, PGD2 and PGF2α in macrophage derived from mPGES-1 knockout mice stimulated with LPS increase beyond the production amounts thereof in macrophage derived from WT mice stimulated with LPS (non-patent document 4). Since mPGES-1 inhibitor increases production of other prostanoids while suppressing the PGE2 production, it is considered to be effective even for diseases different from those treated by NSAIDs.

Use of mPGES-1 inhibitor is described below.

(1) Pain

In mPGES-1 knockout mice, intraperitoneal PGE2 production amount and nociceptive response per unit time significantly decrease as compared to WT mice, in the evaluation of nociceptive response by LPS stimulation which is an acute inflammatory pain model. Therefore, mPGES-1 inhibitor is considered to be an analgesic for acute inflammatory pain (non-patent documents 3, 6).

(2) Rheumatism mPGES-1 gene of Swedish females contains some single nucleotide polymorphisms that increase the onset risk and severity of rheumatism. An increase in the mPGES-1 expression is immunohistologically confirmed in the synovium of rheumatism patients showing single nucleotide polymorphism (Reference SNP ID number: rs23202821) that increases severity, as compared to patients free of mutation (non-patent document 5). In mPGES-1 knockout mice, intraarticular infiltration of inflammatory cells, articular destruction and tumentia of the four limbs are markedly suppressed in a collagen-induced arthritis model, which is an animal model of rheumatism, as compared to WT mice (non-patent document 6). Therefore, mPGES-1 inhibitor is considered to be a therapeutic drug for rheumatism.

(3) Osteoarthritis mRNA expression of mPGES-1 increases in meniscus cells of osteoarthritis patients (non-patent document 7). mPGES-1 inhibitor reduces nociceptive responses in osteoarthritis model using monoiodoacetic acid, as compared to WT mice (patent document 1). Therefore, mPGES-1 inhibitor is considered to be a therapeutic drug for osteoarthritis.

(4) Fever

In mPGES-1 knockout mice, body temperature elevation due to LPS stimulation is suppressed as compared to WT mice (non-patent document 8). Therefore, mPGES-1 inhibitor is considered to be an antipyretic drug.

(5) Alzheimer's Disease

Long-term use of NSAIDs mitigates the onset and progression of Alzheimer's disease. Under amyloid 0 peptide treatment, PGE2 production in the primary culture brain neuron of mPGES-1 knockout mice is suppressed, compared to the brain neuron of WT mice, and nerve cell death does not occur (non-patent document 9). Therefore, mPGES-1 inhibitor is considered to be a therapeutic drug for Alzheimer's disease.

(6) Multiple Sclerosis

EP4 gene of multiple sclerosis patients contains some single nucleotide polymorphisms that increase the onset risk (Reference SNP ID numbers: rs9292777, rs4613763, rs1044063, rs6896969). In macrophage present in the periventricular demyelinating lesion of multiple sclerosis patients, expression of mPGES-1 protein is confirmed. In mPGES-1 knockout mice, PGE2 production in the spinal cord of experimental autoimmune encephalomyelitis model mice, which is an animal model of multiple sclerosis, is suppressed, and progression of paralysis is suppressed, as compared to WT mice, (non-patent document 10). Therefore, mPGES-1 inhibitor is considered to be a therapeutic is drug for multiple sclerosis.

(7) Arteriosclerosis

In mPGES-1 knockout mice, PGE2 production in vascular endothelial cells of high-fat fed low density lipoprotein (LDL) receptor deficient mice, which is an atherosclerosis model, decreases, and atheroma formation is delayed as compared to WT mice. In vascular endothelial cells, production of PGI2, which is known to have a platelet function suppressive action, increases (non-patent document 11). Therefore, mPGES-1 inhibitor is considered to be a prophylactic or therapeutic drug for arteriosclerosis.

(8) Glaucoma, Ocular Hypertension

Glaucoma is a disease showing a characteristic change in the optic nerve and the field of vision. Optic nerve disorder can be generally improved or suppressed by sufficiently decreasing the intraocular pressure. Glaucoma can be categorized into open angle glaucoma and closed angle glaucoma.

mPGES-1 gene is constitutively highly expressed in human conjunctiva (GEO accession No: GSE2513 (Gene Expression Omnibus:http://www.ncbi.nlm.nih.gov/geo/)). In the retina of glaucoma patients, expression of mPGES-1 increases as compared to healthy individuals. In the retina of high intraocular pressure dogs and high intraocular pressure mice, which are glaucoma models, expression of mPGES-1 increases as compared to normal animals (GEO accession No: human GSE2378, dog GSE21879, mouse GSE3554).

When PGE2 is instilled into the eyes of healthy individuals, the intraocular pressure increases, along with the expansion of blood vessels, for 2 hours after instillation (non-patent document 12). When PGE2 is administered to rabbits subconjunctivally, the intraocular pressure increases due to dilatation of ciliary body and increase in the aqueous humor production (non-patent document 13). PGF2α and PGD2, which are prostaglandins that may increase when mPGES-1 is inhibited, decrease the intraocular pressure of rabbit (non-patent document 14). PGF2α formulations increase outflow of aqueous humor and are used as therapeutic drugs for glaucoma that decrease the intraocular pressure. PGI2 does not show a clear action on the intraocular pressure of rabbits. That is, the intraocular pressure is considered to decrease since decrease of PGE2 suppresses aqueous humor production by mPGES-1 inhibition, and/or since increased PGD2 and PGF2α promote outflow of aqueous humor due to shunt. In addition, when mPGES-1 inhibitor is administered by instillation into the eyes of Cynomolgus monkey with normal intraocular pressure, the intraocular pressure significantly decreases (Patent Document 2).

Also, PGE2 promotes expression of vascular endothelial growth factor (VEGF) from retina (non-patent document 15). Since VEGF produced in retina transfers to the anterior ocular segment to cause angiogenesis glaucoma, which is increase of the intraocular pressure that is caused by obstruction of corner angle due to angiogenesis in iris, mPGES-1 inhibitor is considered to show an improvement or prophylactic effect on angiogenesis glaucoma as well. Furthermore, considering an anti-inflammatory action by the inhibition of PGE2 production, mPGES-1 inhibitor is applicable to patients having intraocular inflammation, who require careful administration of the existing prostaglandin formulations (latanoprost etc.). Therefore, mPGES-1 inhibitor is considered to be a therapeutic drug also effective for glaucoma having various background diseases.

(9) Ischemic Retinal Disease

Excessive secretion of VEGF plays a key role in ischemic retinal diseases such as diabetic retinopathy, diabetic macular edema, retinal vein occlusion and the like. Since PGE2 promotes expression of VEGF (non-patent document 15), mPGES-1 inhibitor is considered to improve these diseases.

(10) Systemic Scleroderma

Expression of mPGES-1 increases in the skin of systemic scleroderma patients, as compared to healthy individuals. Similarly, expression of mPGES-1 increases in the skin of bleomycin induced scleroderma model mice, which is a systemic scleroderma model, as compared to the skin of normal mice. As compared to WT mice, mPGES-1 knockout mice showed a decrease in the accumulation of macrophage in the dermal lesion of bleomycin induced scleroderma model mice, and mitigation of cutaneous thickening, deposition of extracellular matrix and increase in the collagen content (non-patent document 16). Therefore, mPGES-1 inhibitor is considered to be a therapeutic drug for systemic scleroderma.

(11) Cancer

In mPGES-1 knockout mice, the polyp number and size were markedly suppressed in azoxymethane-induced colorectal cancer model mice, which are animal model of colorectal cancer, as compared to WT mice. In mPGES-1 knockout mice, PGE2 production in large intestinal tumor tissue decreased and production amount of PGI2 that inhibits adhesion of cancer cells and PGD2 that induces cell death via peroxisome proliferator-activated receptor γ (PPARγ) increased, as compared to WT mice. When colorectal cancer or lung cancer cells were transplanted into the spleen of mPGES-1 knockout mice, the post-transplantation weight of spleen tumor and the rate of metastasis to the liver decreased as compared to WT mice. Growth of lung cancer cells was decreased when they ware co-cultured in vitro with mPGES-1 knockout mice-derived bone marrow macrophages compared to when they ware co-cultured with WT mice-derived bone marrow macrophages, which indicates that host macrophage-derived PGE2 is involved in cancer cell growth (non-patent document 17). Therefore, mPGES-1 inhibitor is considered to be an anticancer drug that suppresses the growth and metastasis of cancer including colorectal cancer.

(12) Disease for which Suppression of PGE2 Production is Effective

As inflammatory symptoms and/or pain relating to the conditions thereof, for which NSAIDs are effective, for example, arthritis, gout, nephrolithiasis, urolithiasis, headache, menstrual pain, toothache, lumbago, muscular pain, periarthritis scapulohumeralis, cervical syndrome, temporomandibular disorder, and postoperative or posttraumatic inflammation and pain, and inflammation and pain after tooth extraction can be mentioned. Besides these, acute and chronic non-bacterial inflammation of eye can be mentioned and, for example, uveitis, allergic conjunctivitis and postoperative inflammation and ophthalmalgia in intraocular operation can be mentioned.

The main mechanism for the efficacy of NSAIDs is considered to be the suppression of PGE2 production, which is an is inflammation promoting substance. Since mPGES-1 inhibitor also has a suppressive action on the PGE2 production, it is considered to be a therapeutic drug for these diseases.

The mPGES-1 inhibitor is considered to be beneficial for the prophylaxis or treatment of pain, rheumatism, osteoarthritis, fever, Alzheimer's disease, multiple sclerosis, arteriosclerosis, glaucoma, ocular hypertension, ischemic retinal disease, systemic scleroderma, cancer including colorectal cancer and/or diseases for which suppression of PGE2 production is effective.

DOCUMENT LIST

Patent Document

Patent Document 1: WO 2012/161965
Patent Document 2: WO 2015/125842

Non-Patent Document

Non-Patent Document 1: JAKOBSSON, P J et al. Identification of human prostaglandin E synthase: a microsomal, glutathione-dependent, inducible enzyme, constituting a potential novel drug target. Proc Natl Acad Sci USA. Jun. 22 1999, Vol. 96, No. 13, pages 7220-7225.

Non-Patent Document 2: SAMUELSSON, B et al. Membrane prostaglandin E synthase-1: a novel therapeutic target. Pharmacol Rev. September 2007, Vol. 59, No. 3, pages 207-224.

Non-Patent Document 3: KAMEI, D et al. Reduced pain hypersensitivity and inflammation in mice lacking microsomal prostaglandin e synthase-1. J Biol Chem. Aug. 6 2004, Vol. 279, No. 32, pages 33684-33695.

Non-Patent Document 4: TREBINO, C E et al. Redirection of eicosanoid metabolism in mPGES-1-deficient macrophages. J Biol Chem. Apr. 29 2005, Vol. 280, No. 17, pages 16579-16585.

Non-Patent Document 5: KOROTKOVA, M et al. Variants of gene for microsomal prostaglandin E2 synthase show association with disease and severe inflammation in rheumatoid arthritis. Eur J Hum Genet. August 2011, Vol. 19, No. 8, pages 908-914.

Non-Patent Document 6: TREBINO, C E et al. Impaired inflammatory and pain responses in mice lacking an inducible prostaglandin E synthase. Proc Natl Acad Sci USA. Jul. 22 2003, Vol. 100, No. 15, pages 9044-9049.

Non-Patent Document 7: SUN, Y et al. Analysis of meniscal degeneration and meniscal gene expression. BMC Musculoskelet Disord. 2010, Vol. 11, pages 19.

Non-Patent Document 8: ENGBLOM, D et al. Microsomal prostaglandin E synthase-1 is the central switch during immune-induced pyresis. Nat Neurosci. November 2003, Vol. 6, No. 11, pages 1137-1138.

Non-Patent Document 9: KUROKI, Y et al. Deletion of microsomal prostaglandin E synthase-1 protects neuronal cells from cytotoxic effects of beta-amyloid peptide fragment 31-35. Biochem Biophys Res Commun. Aug. 3 2012, Vol. 424, No. 3, pages 409-413.

Non-Patent Document 10: KIHARA, Y et al. Targeted lipidomics reveals mPGES-1-PGE2 as a therapeutic target for multiple sclerosis. Proc Natl Acad Sci USA. Dec. 22 2009, Vol. 106, No. 51, pages 21807-21812.

Non-Patent Document 11: WANG, M et al. Deletion of microsomal prostaglandin E synthase-1 augments prostacyclin and retards atherogenesis. Proc Natl Acad Sci USA. Sep. 26 2006, Vol. 103, No. 39, pages 14507-14512.

Non-Patent Document 12: FLACH, A J et al. Topical prostaglandin E2 effects on normal human intraocular pressure. J Ocul Pharmacol. Spring 1988, Vol. 4, No. 1, pages 13-18.

Non-Patent Document 13: NAKAJIMA, T et al. [Effects of prostaglandin E2 on intraocular pressure, anterior chamber depth and blood flow volume of the iris and the ciliary body in rabbit eyes]. Nihon Ganka Gakkai Zasshi. April 1992, Vol. 96, No. 4, pages 455-461.

Non-Patent Document 14: GOH, Y et al. Prostaglandin D2 reduces intraocular pressure. Br J Ophthalmol. June 1988, Vol. 72, No. 6, pages 461-464.

Non-Patent Document 15: YANNI, S E et al. The role of PGE2 receptor EP4 in pathologic ocular angiogenesis. Invest Ophthalmol Vis Sci. November 2009, Vol. 50, No. 11, pages 5479-5486.

Non-Patent Document 16: MCCANN, M R et al. mPGES-1 null mice are resistant to bleomycin-induced skin fibrosis. Arthritis Res Ther. 2011, Vol. 13, No. 1, pages R6.

Non-Patent Document 17: SASAKI, Y et al. Microsomal prostaglandin E synthase-1 is involved in multiple steps of colon carcinogenesis. Oncogene. Jun. 14 2012, Vol. 31, No. 24, pages 2943-2952.

SUMMARY OF THE INVENTION

The present invention aims to provide a hydroxytriazine compound having an mPGES-1 inhibitory activity or a pharmaceutically acceptable salt thereof, a pharmaceutical composition containing same, and pharmaceutical use thereof and the like. Examples of the the target disease include pain, rheumatism, fever, osteoarthritis, arteriosclerosis, Alzheimer's disease, multiple sclerosis, glaucoma, ocular hypertension, ischemic retinal disease, systemic scleroderma, cancer including colorectal cancer and diseases for which suppression of PGE2 production is effective.

The present inventors have found a hydroxytriazine compound having an mPGES-1 inhibitory activity, which is represented by the following formula [I-a], [I-b] or [I-c], and completed the present invention.

Accordingly, the present invention is as follows.

[1] A compound of the formula [I-a], [I-b] or [I-c], or a pharmaceutically acceptable salt thereof:

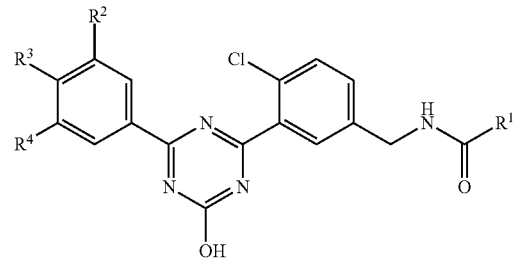

[I-b]

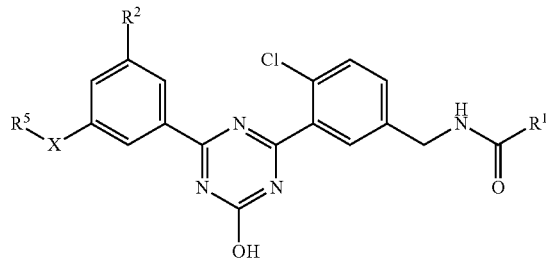

[I-c]

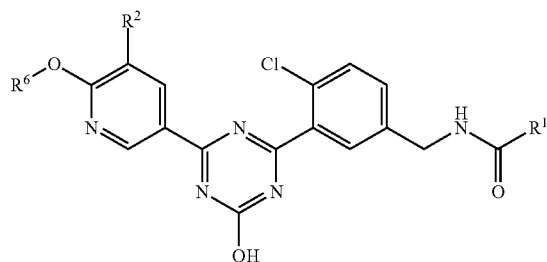

wherein
R¹ is
(1) the formula:

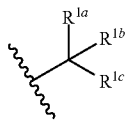

wherein
R$^{1a}$ is C$_{1-4}$ alkyl,
R$^{1b}$ is C$_{1-4}$ alkyl or trifluoromethyl, and
R$^{1c}$ is
  (a) C$_{1-4}$ alkyl,
  (b) C$_{1-4}$ fluoroalkyl,
  (c) C$_{1-4}$ alkoxy, or
  (d) C$_{1-4}$ alkoxy C$_{1-4}$ alkyl, or
(2) the formula:

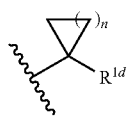

wherein
n is 1, 2, 3, 4 or 5, and
R$^{1d}$ is
  (a) fluoro,
  (b) C$_{1-4}$ alkyl,
  (c) C$_{1-4}$ fluoroalkyl,
  (d) C$_{1-4}$ alkoxy, or
  (e) C$_{1-4}$ alkoxy C$_{1-4}$ alkyl,
R² is hydrogen or C$_{1-4}$ alkyl,
R³ is
  (1) hydrogen,
  (2) halogen,
  (3) C$_{1-4}$ alkyl, or
  (4) C$_{1-4}$ alkoxy, R⁴ is
(1) the formula:

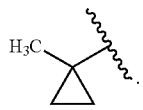

wherein
R$^{4a}$ is hydrogen, C$_{1-4}$ alkyl or C$_{1-4}$ alkoxy, or
(2) the formula:

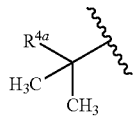

,

R⁵ is C$_{1-6}$ alkyl,
R⁶ is
  (1) C$_{1-6}$ alkyl,
  (2) C$_{3-5}$ cycloalkyl, or
  (3) C$_{1-4}$ alkoxy C$_{1-4}$ alkyl, and
X is CH$_2$ or O,
provided that when R² in the formula [I-a] is C$_{1-4}$ alkyl, then R³ is hydrogen.

[2] The compound or pharmaceutically acceptable salt according to [1], wherein, in the formula [I-a],
R² and R³ are both hydrogens, and
R⁴ is
  (1) isopropyl or tert-butyl, or
  (2) the formula:

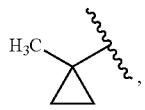

.

[3] The compound or pharmaceutically acceptable salt according to [1], wherein, in the formula [I-a],
R² is hydrogen,
R³ is chloro, and
R⁴ is isopropyl.

[4] The compound or pharmaceutically acceptable salt according to [1], wherein X in the formula [I-b] is O.

[5] The compound or pharmaceutically acceptable salt according to [1], wherein, in the formula [I-c],
R² is hydrogen, and
R⁶ is 1-methylbutyl or n-hexyl.

[6] The compound or pharmaceutically acceptable salt according to any one of [1] to [5], wherein R¹ is the formula:

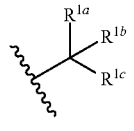

wherein
R$^{1a}$ is C$_{1-4}$ alkyl,
R$^{1b}$ is C$_{1-4}$ alkyl or trifluoromethyl, and $R^{1c}$ is
(b) difluoromethyl or trifluoromethyl, or
(c) methoxy.

[7] The compound or pharmaceutically acceptable salt according to any one of [1] to [5], wherein $R^1$ is the formula:

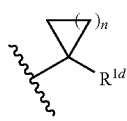

wherein
n is 3, 4 or 5, and
$R^{1d}$ is
(a) fluoro,
(c) $C_{1-4}$ fluoroalkyl,
(d) methoxy, or
(e) methoxymethyl.

[8] The compound or pharmaceutically acceptable salt according to [7], wherein
n is 3 or 4, and
$R^{1d}$ is monofluoromethyl, difluoromethyl or trifluoromethyl.

[9] A compound selected from the following formulas:

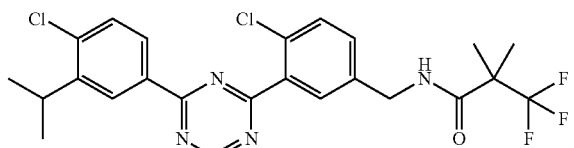

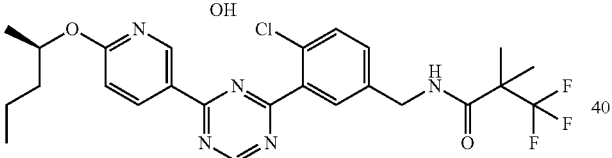

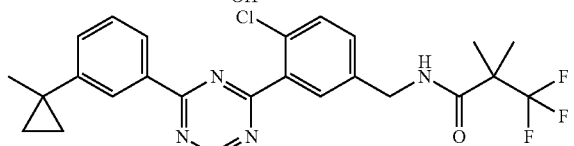

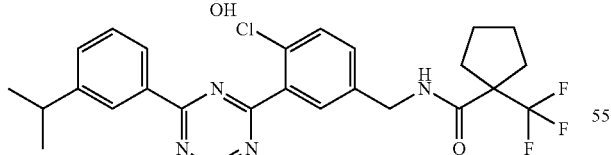

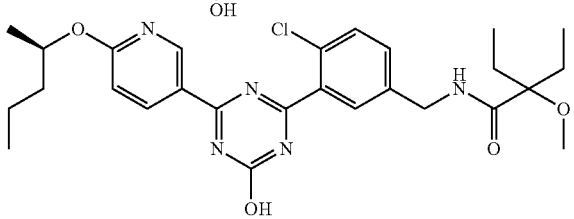

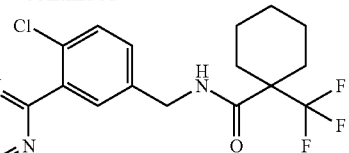

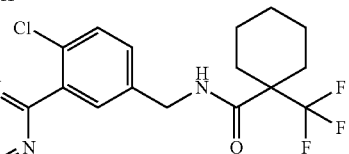

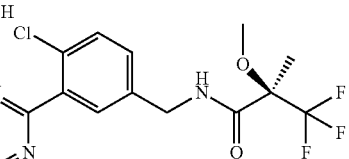

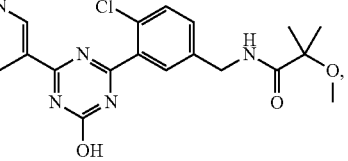

or a pharmaceutically acceptable salt thereof.

[10] A pharmaceutical composition comprising the compound or pharmaceutically acceptable salt according to any one of [1] to [9], and a pharmaceutically acceptable carrier.

[11] An mPGES-1 inhibitor comprising the compound or pharmaceutically acceptable salt according to any one of [1] to [9]

[12] A therapeutic or prophylactic agent for pain, rheumatism, fever, osteoarthritis, arteriosclerosis, Alzheimer's disease, multiple sclerosis, glaucoma, ocular hypertension, ischemic retinal disease, systemic scleroderma and/or cancer, which comprises the compound or pharmaceutically acceptable salt according to any one of [1] to [9].

[13] A therapeutic or prophylactic agent for glaucoma and/or ocular hypertension, which comprises the compound or pharmaceutically acceptable salt according to any one of [1] to [9], and one or more kinds of other therapeutic agents for glaucoma in combination.

[14] A method of inhibiting mPGES-1, which comprises administering a pharmaceutically effective amount of the compound or pharmaceutically acceptable salt according to any one of [1] to [9] to a human.

[15] A method of treating or preventing pain, rheumatism, fever, osteoarthritis, arteriosclerosis, Alzheimer's disease, multiple sclerosis, glaucoma, ocular hypertension, ischemic retinal disease, systemic scleroderma and/or cancer, which comprises administering a pharmaceutically effective amount of the compound or pharmaceutically acceptable salt according to any one of [1] to [9] to a human.

[16] A method of treating or preventing glaucoma and/or ocular hypertension, which comprises administering a pharmaceutically effective amount of the compound or pharmaceutically acceptable salt according to any one of [1] to [9] and one or more kinds of other therapeutic agents for glaucoma to a human.

[17] Use of the compound or pharmaceutically acceptable salt according to any one of [1] to [9] for the production of an mPGES-1 inhibitor.

[18] Use of the compound or pharmaceutically acceptable salt according to any one of [1] to [9] for the production of a therapeutic or prophylactic agent for pain, rheumatism, fever, osteoarthritis, arteriosclerosis, Alzheimer's disease, multiple sclerosis, glaucoma, ocular hypertension, ischemic retinal disease, systemic scleroderma and/or cancer.

EMBODIMENTS OF THE INVENTION

The definitions of the terms used in the present invention are as follows.

The "halogen" is fluoro, chloro, bromo or iodo.

The "$C_{1-4}$ alkyl" means straight chain or branched chain alkyl having 1 to 4 carbon atoms. Examples thereof include methyl, ethyl, propyl, isopropyl, butyl, isobutyl, sec-butyl, tert-butyl and the like. Preferred are methyl, ethyl, propyl, isopropyl, butyl and tert-butyl.

The "$C_{1-6}$ alkyl" means straight chain or branched chain alkyl having 1 to 6 carbon atoms. Examples thereof include methyl, ethyl, propyl, isopropyl, butyl, isobutyl, sec-butyl, tert-butyl, pentyl, isopentyl, neo-pentyl, 1-ethylpropyl, hexyl, isohexyl, 1-methylbutyl, 1,1-dimethylbutyl, 2,2-dimethylbutyl, 3,3-dimethylbutyl, 2-ethylbutyl and the like. Preferred are methyl, ethyl, propyl, sec-butyl, pentyl, hexyl, 1-methylbutyl and 2,2-dimethylbutyl.

The "$C_{1-4}$ alkoxy" means alkoxy wherein the alkyl moiety is the above-defined "$C_{1-4}$ alkyl". Examples thereof include methoxy, ethoxy, propoxy, isopropoxy, butoxy, isobutoxy, sec-butoxy, tert-butoxy and the like. Preferred is methoxy.

The "$C_{1-4}$ fluoroalkyl" means straight chain or branched chain alkyl having 1-4 carbon atoms, which is substituted by 1 to 3 fluorine. Examples thereof include monofluoromethyl, difluoromethyl, trifluoromethyl, 1,1-difluoroethyl, 2,2,2-trifluoroethyl and the like. Preferred are monofluoromethyl, difluoromethyl and trifluoromethyl.

The "$C_{1-4}$ alkoxy $C_{1-4}$ alkyl" means the above-defined "$C_{1-4}$ alkyl" substituted by the above-defined "$C_{1-4}$ alkoxy". Examples thereof include methoxymethyl, 4-methoxybutyl, 3-ethoxypropyl, 2-propoxyethyl and the like. Preferred are 4-methoxybutyl, 3-ethoxypropyl and 2-propoxyethyl.

The "$C_{3-5}$ cycloalkyl" means 3- to 5-membered monocyclic cycloalkyl. Examples thereof include cyclopropyl, cyclobutyl and cyclopentyl. Preferred is cyclobutyl.

Among of the compounds of formulas [I-a], [I-b] and [I-c], preferable embodiment is the compound of formula [I-c].

One of more preferable embodiments is the compound of formula [I-c] wherein $R^1$ is (1) the formula:

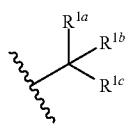

wherein $R^{1a}$ is $C_{1-4}$ alkyl, $R^{1b}$ is $C_{1-4}$ alkyl or trifluoromethyl, and $R^{1c}$ is (b) $C_{1-4}$ fluoroalkyl, (c) $C_{1-4}$ alkoxy, or (d) $C_{1-4}$ alkoxy $C_{1-4}$ alkyl, or (2) the formula:

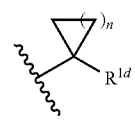

wherein n is 1, 2, 3, 4 or 5, and $R^{1d}$ is (a) fluoro, (b) $C_{1-4}$ alkyl, (c) $C_{1-4}$ fluoroalkyl, (d) $C_{1-4}$ alkoxy, or (e) $C_{1-4}$ alkoxy $C_{1-4}$ alkyl, $R^2$ is hydrogen, and $R^6$ is (1) $C_{1-6}$ alkyl, (2) $C_{3-5}$ cycloalkyl, or (3) $C_{1-4}$ alkoxy $C_{1-4}$ alkyl.

A pharmaceutically acceptable salt of the compound represented by the formula [I-a], [I-b] or [I-c](hereinafter to be also referred to as the compound of the present invention) may be any salt as long as it forms a nontoxic salt with the compound of the present invention, and examples thereof include salts with inorganic acid, salts with organic acid, salts with inorganic base, salts with organic base, salts with amino acid, and the like.

Various forms of pharmaceutically acceptable salts are well known in the art and, for example, they are described in the following documents.

(a) Berge et al., J. Pharm. Sci., 66, p 1-19 (1977), (b) Stahl et al., "Handbook of Pharmaceutical Salt: Properties, Selection, and Use" (Wiley-VCH, Weinheim, Germany, 2002), (c) Paulekuhn et al., J. Med. Chem., 50, p 6665-6672 (2007)

Examples of the salts with inorganic acid include salts with hydrochloric acid, nitric acid, sulfuric acid, phosphoric acid, hydrobromic acid and the like.

Examples of the salts with organic acid include salts with oxalic acid, maleic acid, citric acid, fumaric acid, lactic acid, malic acid, succinic acid, tartaric acid, acetic acid, trifluoroacetic acid, gluconic acid, ascorbic acid, methanesulfonic acid, benzenesulfonic acid, p-toluenesulfonic acid and the like.

Examples of the salts with organic acid include salts with adipic acid, alginic acid, 4-aminosalicylic acid, anhydromethylenecitric acid, benzoic acid, calcium edetate, camphoric acid, camphor-10-sulfonic acid, carbonic acid, edetic acid, ethane-1,2-disulfonic acid, dodecylsulfuric acid, ethanesulfonic acid, glucoheptonic acid, glucuronic acid, glucoheptonic acid, glycollyarsanilic acid, hexylresorcinic acid, hydrofluoric acid, hydroiodic acid, hydroxy-naphtoic acid, 2-hydroxy-1-ethanesulfonic acid, lactobionic acid, mandelic acid, methylsulfuric acid, methylnitric acid, methylenebis (salicylic acid), galactaric acid, naphthalene-2-sulfonic acid, 2-naphtoic acid, 1,5-naphthalenedisulfonic acid, oleic acid, pamoic acid, pantothenic acid, pectin acid, picric acid, propionic acid, polygalacturonic acid, salicylic acid, stearic acid, tannic acid, teoclic acid, thiocyanic acid, undecanoic acid and the like.

Examples of the salts with inorganic base include sodium salt, potassium salt, calcium salt, magnesium salt, ammonium salt and the like.

Furthermore, examples of the salts with inorganic base include salts with aluminum, barium, bismuth, lithium or zinc.

Examples of the salts with organic base include salts with methylamine, diethylamine, trimethylamine, triethylamine, ethanolamine, diethanolamine, triethanolamine, ethylenediamine, tris(hydroxymethyl)methylamine, dicyclohexylamine, N,N'-dibenzylethylenediamine, guanidine, pyridine, picoline, choline, cinchonine, meglumine and the like.

Furthermore, examples of the salts with organic base also include salts with arecoline, betaine, clemizole, N-methylglucamine, N-benzylphenethylamine or tris(hydroxymethyl)methylamine.

Examples of the salts with amino acid include salts with lysine, arginine, aspartic acid, glutamic acid and the like.

Among the above-mentioned salts, preferred are salts with hydrochloric acid, sulfuric acid or p-toluenesulfonic acid.

Various salts can be obtained by reacting the compound of the present invention with inorganic base, organic base, inorganic acid, organic acid or amino acid according to a known method.

The compound of the present invention or a pharmaceutically acceptable salt thereof may be present as a solvate. The "solvate" is the compound of the present invention or a pharmaceutically acceptable salt thereof, which is coordinated with a solvent molecule, and also encompasses hydrates. The solvate is preferably a pharmaceutically acceptable solvate, and examples thereof include a hydrate, ethanolate, dimethyl sulfoxidate and the like of the compound of the present invention or a pharmaceutically acceptable salt thereof. Specific examples include semihydrate, monohydrate, dihydrate or monoethanolate of the compound of the present invention, monohydrate of sodium salt or 2/3 ethanolate of dihydrochloride of the compound of the present invention, and the like.

The solvates can be obtained by a known method.

In addition, the compound of the present invention may be labeled with isotope (e.g., $^2$H, $^3$H, $^{14}$C, $^{35}$S etc.).

The compound of the present invention may exist as a tautomer. In this case, the compound of the present invention can be a single tautomer or a mixture thereof. For example, the compound represented by the formula [I-a] may contain a tautomer shown below

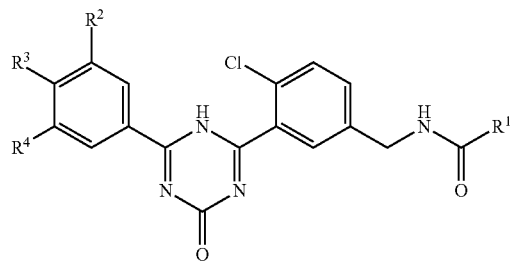

Such tautomer is also encompassed in the compound represented by the formula [I-a].

The compound of the present invention may have a carbon double bond. In this case, the compound of the present invention can be present as E form, Z form, or a mixture of E form and Z form.

The compound of the present invention may contain a stereoisomer that should be recognized as a cis/trans isomer. In this case, the compound of the present invention can be present as a cis form, a trans form, or mixture of a cis form and a trans form.

The compound of the present invention may contain one or more asymmetric carbons. In this case, the compound of the present invention may be present as a single enantiomer, a single diastereomer, a mixture of enantiomers or a mixture of diastereomers.

The compound of the present invention may be present as an atropisomer. In this case, the compound of the present invention may be present as a single atropisomer or a mixture thereof.

The compound of the present invention may simultaneously contain plural structural characteristics that produce the above-mentioned isomers. Moreover, the compound of the present is invention may contain the above-mentioned isomers at any ratio.

Unless otherwise referred to note, the formulae, chemical structures and compound names indicated in the present specification without specifying the stereochemistry thereof encompass all the above-mentioned isomers that may exist.

A diastereomeric mixture can be separated into each diastereomer by conventional methods such as chromatography, crystallization and the like. In addition, each diastereomer can also be formed by using a stereochemically single starting material, or by a synthesis method employing a stereoselective reaction.

An enantiomeric mixture can be separated into each single enantiomer by a method well known in the art.

For example, a diastereomic mixture can be prepared by reacting an enantiomeric mixture with a substantially pure enantiomer that is known as a chiral auxiliary. The diastereomeric mixture can be separated into each diastereomer mentioned above. The separated diastereomer can be converted to a desired enantiomer by removing the added chiral auxiliary by cleavage.

In addition, an enantiomeric mixture can also be directly separated by a chromatography method using a chiral solid phase well known in the art.

Alternatively, one of enantiomers can also be obtained by using a substantially pure optically active starting material or by employing stereoselective synthesis (asymmetric induction) of a prochiral intermediate using a chiral auxiliary and an asymmetric catalyst.

The absolute steric configuration can be determined based on the X-ray crystal analysis of the crystalline product or intermediate. In this case, a crystalline product or intermediate derivatized with a reagent having an asymmetric center with a known steric configuration may be used if necessary.

The compound of the present invention or a pharmaceutically acceptable salt thereof is preferably substantially purified, more preferably purified so as to have a purity of 80% or more.

Examples of the "pharmaceutical composition" include oral preparations such as tablet, capsule, granule, powder, troche, syrup, emulsion, suspension and the like, and parenteral agents such as external preparation, suppository, injection, eye drop, nasal preparations, pulmonary preparation and the like.

The pharmaceutical composition of the present invention is produced according to a method known per se in the art of pharmaceutical preparations, by mixing etc. the compound of the present invention or a pharmaceutically acceptable salt thereof, or a solvate thereof with a suitable amount of at least one kind of pharmaceutically acceptable carrier and the like as appropriate. While the content of the compound of the present invention or a pharmaceutically acceptable salt thereof, or a solvate thereof in the pharmaceutical composition varies depending on the dosage form, dose and the like, it is, for example, 0.00001 to 100 wt % of the whole composition.

Examples of the "pharmaceutically acceptable carrier" include various organic or inorganic carrier substances conventionally used as preparation materials, for example, excipient, disintegrant, binder, glidant, lubricant and the like for solid preparations, and solvent, solubilizing agent, suspending agent, isotonicity agent, buffering agent, soothing agent, surfactant, pH adjuster, thickening agent and the like for liquid preparations. Where necessary, moreover, additives such as preservative, antioxidant, colorant, sweetening agent and the like are used.

Examples of the "excipient" include lactose, sucrose, D-mannitol, D-sorbitol, cornstarch, dextrin, microcrystalline cellulose, crystalline cellulose, carmellose, carmellose calcium, sodium carboxymethyl starch, low-substituted hydroxypropylcellulose, gum arabic and the like.

Examples of the "disintegrant" include carmellose, carmellose calcium, carmellose sodium, sodium carboxymethyl starch, croscarmellose sodium, crospovidone, low-substituted hydroxypropylcellulose, hydroxypropylmethylcellulose, crystalline cellulose and the like.

Examples of the "binder" include hydroxypropylcellulose, hydroxypropylmethylcellulose, povidone, crystalline cellulose, sucrose, dextrin, starch, gelatin, carmellose sodium, gum arabic and the like.

Examples of the "glidant" include light anhydrous silicic acid, magnesium stearate and the like.

Examples of the "lubricant" include magnesium stearate, calcium stearate, talc and the like.

Examples of the "solvent" include purified water, ethanol, propylene glycol, macrogol, sesame oil, corn oil, olive oil and the like.

Examples of the "solubilizing agent" include propylene glycol, D-mannitol, benzyl benzoate, ethanol, triethanolamine, sodium carbonate, sodium citrate and the like.

Examples of the "suspending agent" include benzalkonium chloride, carmellose, hydroxypropylcellulose, propylene glycol, povidone, methylcellulose, glycerol monostearate and the like.

Examples of the "isotonic agent" include glucose, D-sorbitol, sodium chloride, D-mannitol and the like.

Examples of the "buffering agent" include sodium hydrogenphosphate, sodium acetate, sodium carbonate, sodium citrate and the like.

Examples of the "soothing agent" include benzyl alcohol and the like.

Examples of the "surfactant" include polyoxyethylene hydrogenated castor oil (e.g., polyoxyethylene hydrogenated castor oil 60 etc.), polyethylene glycol monostearate, polyoxyethylene sorbitan fatty acid ester (e.g., polysorbate 80 etc.), alkyldiaminoethylglycine, alkylbenzenesulfonate, benzethonium chloride and the like.

Examples of the "pH adjuster" include hydrochloric acid, sulfuric acid, phosphoric acid, citric acid, acetic acid, sodium hydrogen carbonate, sodium carbonate, potassium hydroxide, sodium hydroxide, monoethanolamine, triethanolamine and the like.

Examples of the "thickening agent" include polyvinyl alcohol, carboxyvinyl polymer, methylcellulose, hydroxyethylcellulose, polyethylene glycol, dextran and the like.

Examples of the "preservative" include ethyl parahydroxybenzoate, chlorobutanol, benzyl alcohol, sodium dehydroacetate, sorbic acid and the like.

Examples of the "antioxidant" include sodium sulfite, ascorbic acid and the like.

Examples of the "colorant" include food colors (e.g., Food Color Red No. 2 or 3, Food Color Yellow No. 4 or 5 etc.), β-carotene and the like.

Examples of the "sweetening agent" include saccharin sodium, dipotassium glycyrrhizinate, aspartame and the like.

The pharmaceutical composition of the present invention can be administered orally or parenterally (e.g., topical, rectal, intravenous administration etc.) to human as well as mammals other than human (e.g., hamster, guinea pig, cat, dog, swine, bovine, horse, sheep, monkey etc.). The dose varies depending on the subject of administration, disease, symptom, dosage form, administration route and the like. For example, the daily dose for oral administration to an adult patient (body weight: about 60 kg) is generally within the range of about 0.1 µg to 10 g, based on the compound of the present invention as the active ingredient. This amount can be administered in one to several portions.

The compound of the present invention or a pharmaceutically acceptable salt thereof, or a solvate thereof can be used in combination with one or a plurality of other medicaments (hereinafter to be also referred to as a concomitant drug) according to a method generally employed in the medical field (hereinafter to be referred to as combined use).

The administration period of the compound of the present invention or a pharmaceutically acceptable salt thereof, and a concomitant drug is not limited, and they may be administered to an administration subject as combination preparation, or the both preparations may be administered simultaneously or at given intervals as individual preparations. In addition, the pharmaceutical composition of the present invention and a concomitant drug may be used in the form of a kit. The dose of the concomitant drug is similar to the clinically-employed dose and can be appropriately selected according to the subject of administration, disease, symptom, dosage form, administration route, administration time, combination and the like. The administration form of the concomitant drug is not particularly limited, and it is only required that the compound of the present invention or a pharmaceutically acceptable salt thereof, or a solvate thereof is combined with a concomitant drug.

Examples of the concomitant drug include therapeutic agents for glaucoma such as prostaglandin formulation, β blocker, α receptor agonist, sympathetic nerve stimulation agent, α blocker, carbonic anhydrase inhibitor anticholinesterase agent, Rho kinase inhibitor and the like.

Examples of the prostaglandin formulation include isopropyl unoprostone, latanoprost, travoprost, tafluprost, bimatoprost and the like.

Examples of the β blocker include timolol maleate, Befunolol hydrochloride, carteolol hydrochloride, betaxolol hydrochloride, nipradilol, levobunolol hydrochloride and the like.

Examples of the α receptor agonist include brimonidine tartrate and the like.

Examples of the sympathetic nerve stimulation agent include dipivefrin hydrochloride, pilocarpine hydrochloride and the like.

Examples of the α blocker include bunazosin hydrochloride and the like.

Examples of the carbonic anhydrase inhibitor include dorzolamide hydrochloride, brinzolamide and the like.

Examples of the anticholinesterase agent include distigmine bromide and the like.

Examples of the Rho kinase inhibitor include ripasudil hydrochloride hydrate and the like.

An example of the specific combination of medicaments is a combination of one medicament selected from latanoprost, travoprost, tafluprost, timolol maleate, dorzolamide hydrochloride and brinzolamide, and the compound of the present invention or a pharmaceutically acceptable salt thereof, or a solvate thereof.

Since the compound of the present invention or a pharmaceutically acceptable salt thereof has an mPGES-1 inhibitory action, it is useful for the prophylaxis or treatment of various diseases or symptoms which are expected to be improved by mPGES-1 inhibitory activity modulation, for example, pain, rheumatism, osteoarthritis, fever, Alzheimer's disease, multiple sclerosis, arteriosclerosis, glaucoma, ocular hypertension, ischemic retinal disease, systemic scleroderma and cancer including colorectal cancer.

As used herein, various diseases or symptoms which are expected to be improved by mPGES-1 inhibitory activity modulation are preferably glaucoma and ocular hypertension.

The compound of the present invention is preferably administered as a solution or a suspension, preferably as a solution.

The compound of the present invention is preferably administered by instillation.

For administration of a solution by instillation, the compound preferably has high solubility. The compound has solubility of preferably 0.03% or more, more preferably 0.07% or more, still preferably 0.13% or more, in the solvent used for an ophthalmic solution.

The solvent used for an ophthalmic solution is preferably water. The solvent used for an ophthalmic solution may contain an additive such as polysorbate 80, polyethylene glycol monostearate, polyoxyethylene hydrogenated castor oil and the like.

For administration by instillation, the pH of the compound solution is preferably 7.0-8.5.

The solubility of compound can be measured according to a method known per se, for example, the following method.
(1) Compound is suspended in a buffer solution having pH 7.0-8.0 (e.g., Britton-Robinson buffer, etc.). Where necessary, an additive such as polysorbate 80, polyethylene glycol monostearate, polyoxyethylene hydrogenated castor oil and the like can be used.
(2) The suspension is shaked at room temperature for predetermined time, and filtered through a membrane filter. The filtrate is appropriately diluted to give a sample solution.
(3) Standard solution of compound is prepared, and analyzed by liquid chromatography.
(4) The sample solution is analyzed by liquid chromatography, and the solubility of compound is calculated according to external standard method.

As used herein, the expression "inhibit(s) mPGES-1" means elimination or attenuation of mPGES-1 function, preferably elimination or attenuation of human mPGES-1 function under the below-mentioned condition of Experimental Example 1 or on human clinical indication.

As used herein, the term "treatment" encompasses improvement, prevention of aggravation, maintenance of remission, prevention of exacerbation, and prevention of relapse, of symptom.

As used herein, the term "prophylaxis" means suppression of the onset of symptoms.

One of other embodiments of the present invention is to provide an agent decreasing ocular pressure, which contains the compound of the present invention or a pharmaceutically acceptable salt thereof. Another of other embodiments of the present invention is to provide an agent decreasing ocular pressure, which contains the compound of the present invention or a pharmaceutically acceptable salt thereof and one or more kinds of other therapeutic agents for glaucoma.

One of other embodiments of the present invention is to provide a method of decreasing ocular pressure, which comprises administering the compound of the present invention or a pharmaceutically acceptable salt thereof to a human. Another of other embodiments of the present invention is to provide a method of decreasing ocular pressure, which comprises administering the compound of the present invention or a pharmaceutically acceptable salt thereof and one or more kinds of other therapeutic agents for glaucoma to a human.

As used herein, the expression "decrease(s) ocular pressure" means decrease in intraocular pressure.

The present specification may provide preferable embodiments and options of the compound, method, use and composition of the present invention. Such provision encompasses combinations of the preferable embodiments and options of the compound, method, use and composition of the present invention, as long as such combination is possible without contradiction.

The production methods of the compound of the present invention or a pharmaceutically acceptable salt thereof are explained in the following, which are not to be construed as limitative. The compound obtained in each step can be isolated or purified according to a method known per se such as distillation, recrystallization, column chromatography and the like if necessary, or directly used in the next step without isolation or purification.

[Production Method A]

Compound [I-a]can be obtained according to Production Method A.

[Production Method A]

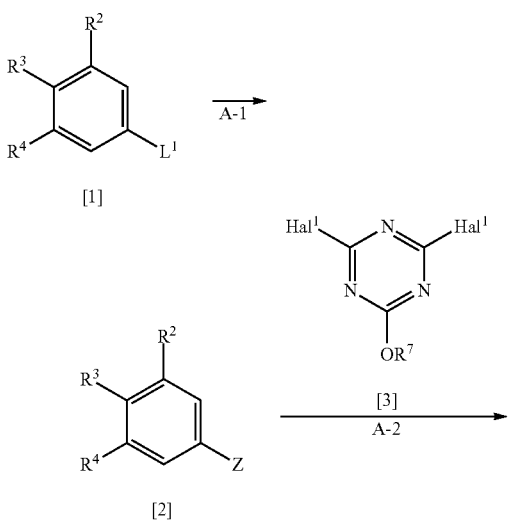

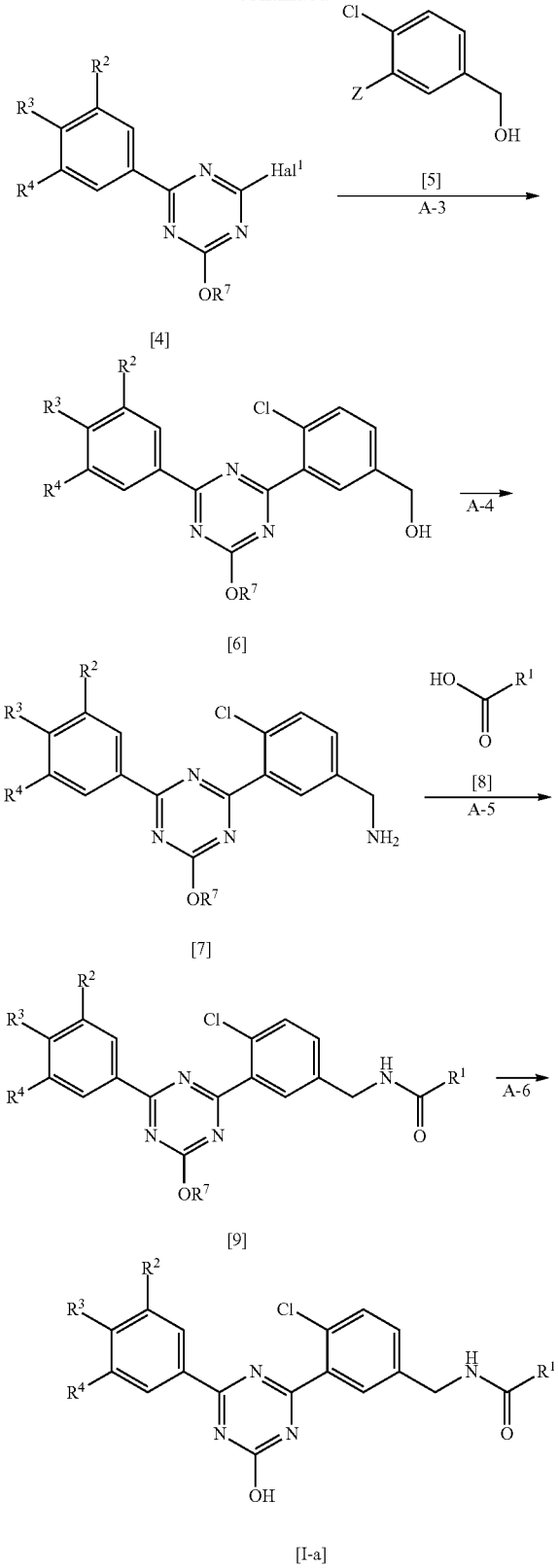

wherein
L¹ is a leaving group such as bromo, iodo, trifluoromethanesulfonyloxy or the like;
Hal¹ is chloro or bromo;

Z is a boron substituent used for the Suzuki coupling reaction, such as —B(OH)$_2$, —B(OR$^8$)$_2$ (wherein R$^8$ is each C$_{1-4}$ alkyl or one of R$^8$ is optionally bonded to the other R$^8$ to form a ring), —BF$_3$, the formula

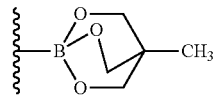

or the like;
R$^7$ is C$_{1-6}$ alkyl such as methyl, ethyl and the like, or benzyl, and
R$^1$, R$^2$, R$^3$ and R$^4$ are as defined in the formula [I-a].
(Step A-1)

Compound [2] can be obtained by subjecting compound [1] to boronation. For example, compound [2] can be obtained by reacting compound [1] with a boron reagent under heating in the presence of a base and a palladium catalyst, in a solvent. Where necessary, a ligand may be added.

Examples of the boron reagent to be used for the reaction include 4,4,4',4',5,5,5',5'-octamethyl-2,2'-bi-1,3,2-dioxaborolane, 5,5,5',5'-tetramethyl-2,2'-bi-1,3,2-dioxaborinane, tetrahydroxydiboron, 4,4,5,5-tetramethyl-1,3,2-dioxaborolane and the like.

Examples of the palladium catalyst to be used for the reaction include palladium acetate, tetrakistriphenylphosphine palladium, bis(triphenylphosphine)palladium dichloride, (bis(diphenylphosphino)ferrocene)palladium dichloride-methylene chloride complex and the like.

Examples of the base to be used for the reaction include inorganic base such as alkali metal salts (e.g., potassium phosphate, sodium carbonate, sodium hydrogencarbonate, potassium carbonate, potassium acetate, sodium acetate, cesium fluoride and the like) and the like; organic bases such as triethylamine and the like.

Examples of the ligand to be used for the reaction include organophosphorous ligands such as triphenylphosphine, tricyclohexylphosphine, 2,2'-bis(diphenylphosphino)-1,1'-binaphthalene, 2-dicyclohexylphosphino-2',6'-dimethoxybiphenyl and the like, and the like.

Examples of the solvent to be used for the reaction include ether solvents such as 1,4-dioxane, tetrahydrofuran, diethyl ether, 1,2-dimethoxyethane, cyclopentyl methyl ether and the like; alcohol solvents such as methanol, ethanol, 1-propanol, 2-propanol and the like; hydrocarbon solvents such as toluene, xylene, hexane and the like; polar solvents such as N,N-dimethylformamide, N,N-dimethylacetamide, dimethyl sulfoxide, acetonitrile and the like; mixed solvents thereof, and solvents thereof mixed with water.

Alternatively, when L¹ is bromo or iodo in compound [1], compound [2] can also be obtained by adding an organic metal reagent to compound [1] in a solvent, at −78° C. to room temperature, and then reacting the resulting compound with a boron compound at −78° C. to room temperature.

Examples of the organic metal reagent to be used for the reaction include n-butyllithium, tert-butyllithium, isopropylmagnesium chloride and the like.

Examples of the boron reagent to be used for the reaction include trimethyl borate, triisopropyl borate, 2-isopropoxy-4,4,5,5-tetramethyl-1,3,2-dioxaborolane and the like.

Examples of the solvent to be used for the reaction include ether solvents such as 1,4-dioxane, tetrahydrofuran, diethyl ether, 1,2-dimethoxyethane, cyclopentyl methyl ether and the like; hydrocarbon solvents such as toluene, xylene, hexane and the like, and mixed solvents thereof.

Compound [1] may be a commercially available product such as 5-bromo-2-chloroisopropylbenzene, or may be obtained by converting a commercially available product as appropriate by a method well known to those of ordinary skill in the art.

(Step A-2)

Compound [4] can be obtained by subjecting compound [2] and compound [3] to the Suzuki coupling reaction. For example, compound [4] can be obtained by reacting compound [2] with compound [3] under heating in the presence of a base and a palladium catalyst, in a solvent. Where necessary, a ligand may be added. In order to prevent the Suzuki coupling reaction of the resulting compound (compound (4)) with compound (2), compound [3] is preferably used in an amount of 1.5 equivalent or more per compound [2].

Examples of the palladium catalyst to be used for the reaction include palladium acetate, tetrakistriphenylphosphine palladium, bis(triphenylphosphine)palladium dichloride, (bis(diphenylphosphino)ferrocene)palladium dichloride-methylene chloride complex and the like.

Examples of the base to be used for the reaction include inorganic bases such as alkali metal salts (e.g., potassium phosphate, sodium carbonate, sodium hydrogencarbonate, potassium carbonate, potassium acetate, sodium acetate, cesium fluoride and the like), and the like, organic bases such as triethylamine and the like.

Examples of the ligand to be used for the reaction include organophosphorous ligands such as triphenylphosphine, tricyclohexylphosphine, 2,2'-bis(diphenylphosphino)-1,1'-binaphthalene, 2-dicyclohexylphosphino-2',6'-dimethoxybiphenyl and the like, and the like.

Examples of the solvent to be used for the reaction include ether solvents such as 1,4-dioxane, tetrahydrofuran, diethyl ether, 1,2-dimethoxyethane, cyclopentyl methyl ether and the like; alcohol solvents such as methanol, ethanol, 1-propanol, 2-propanol and the like; hydrocarbon solvents such as toluene, xylene, hexane and the like; polar solvents such as N,N-dimethylformamide, N,N-dimethylacetamide, dimethyl sulfoxide, acetonitrile and the like; mixed solvents thereof, and solvents thereof mixed with water.

Compound [2] may be a commercially available product such as 3-isopropylphenylboronic acid, 3-tert-butylphenylboronic acid and the like, or may be obtained by converting a commercially available product as appropriate by a method well known to those of ordinary skill in the art.

Compound [3] may be a commercially available product such as 2,4-dichloro-6-methoxy-1,3,5-triazine, or may be obtained by converting a commercially available product as appropriate by a method well known to those of ordinary skill in the art.

As for the Suzuki coupling reaction, for example, the following review article is known (SUZUKI, A et al. Palladium-Catalyzed Cross-Coupling Reactions of Organoboron Compounds. Chem Rev. 1995, Vol. 95, pages 2457-2483).

(Step A-3)

Compound [6] can be obtained by subjecting compound [4] and boron compound [5] to the Suzuki coupling reaction. For example, compound [6] can be obtained by reacting compound [4] with boron compound [5] under heating in the presence of a base and a palladium catalyst, in a solvent. Where necessary, a ligand may be added.

Examples of the palladium catalyst to be used for the reaction include palladium acetate, tetrakistriphenylphosphine palladium, bis(triphenylphosphine)palladium dichloride, (bis(diphenylphosphino)ferrocene)palladium dichloride-methylene chloride complex and the like.

Examples of the base to be used for the reaction include inorganic bases such as alkali metal salts (e.g., potassium phosphate, sodium carbonate, sodium hydrogencarbonate, potassium carbonate, potassium acetate, sodium acetate, cesium fluoride and the like) and the like, organic bases such as triethylamine and the like.

Examples of the ligand to be used for the reaction include organophosphorous ligands such as triphenylphosphine, tricyclohexylphosphine, 2,2'-bis(diphenylphosphino)-1,1'-binaphthalene, 2-dicyclohexylphosphino-2',6'-dimethoxybiphenyl and the like, and the like.

Examples of the solvent to be used for the reaction include ether solvents such as 1,4-dioxane, tetrahydrofuran, diethyl ether, 1,2-dimethoxyethane, cyclopentyl methyl ether and the like; alcohol solvents such as methanol, ethanol, 1-propanol, 2-propanol and the like; hydrocarbon solvents such as toluene, xylene, hexane and the like; polar solvents such as N,N-dimethylformamide, N,N-dimethylacetamide, dimethyl sulfoxide, acetonitrile and the like; mixed solvents thereof, and solvents thereof mixed with water.

Compound [5] may be a commercially available product such as 2-chloro-5-hydroxymethylphenylboronic acid and the like, or may be obtained by converting a commercially available product as appropriate by a method well known to those of ordinary skill in the art.

(Step A-4)

Compound [7] can be obtained by converting the hydroxy group of compound [6] into an amino group by azidation and reduction. For example, the corresponding azide can be obtained by reacting compound [6] with an azidating agent in the presence of a base, in a solvent, and compound [7] can be obtained by reacting the obtained azide with a phosphine, and then hydrolyzing the resulting compound under heating in water.

Compound [7] is preferably obtained as an inorganic acid salt or an organic acid salt according to a method known per se.

Examples of the azidating agent to be used for the reaction include diphenylphosphorylazide, bis(p-nitrophenyl)azidophosphonate and the like.

Examples of the solvent to be used for the reaction include tetrahydrofuran, toluene, N,N-dimethylformamide and the like.

Examples of the base to be used for the azidation include 1,8-diazabicyclo[5.4.0]undec-7-ene.

Examples of the phosphine include triphenylphosphine, tributylphosphine and the like.

Examples of the acid to be used for the salt formation of compound [7] include hydrochloric acid.

(Step A-5)

Compound [9] can be obtained by subjecting compound [7] and compound [8] to an amide bond forming reaction. For example, compound [9] can be obtained by reacting compound [7] with compound [8] in the presence of a condensing agent and an additive, in a solvent. Where necessary, a base may be added.

Examples of the condensing agent to be used for the reaction include dicyclohexylcarbodiimide (DCC), 1-ethyl-3-(3-dimethylaminopropyl)carbodiimide hydrochloride (WSC HCl), diisopropylcarbodiimide, 1,1'-carbonyldiimidazole (CDI), 0-(7-azabenzotriazol-1-yl)-N,N,N',N'-tetramethyluronium hexafluorophosphate (HATU), (benzotriazol-1-yloxy)tripyrrolidinophosphonium hexafluorophosphate (PyBOP) or diphenylphosphorylazide and the like.

Examples of the additive to be used for the reaction include 1-hydroxybenzotriazole (HOBt), 1-hydroxy-7-azabenzotriazole (HOAt), N-hydroxysuccinimide (HOSu), 4-dimethylaminopyridine and the like.

Examples of the base to be used for the reaction include organic bases such as pyridine, triethylamine and the like.

Examples of the solvent to be used for the reaction include ether solvents such as 1,4-dioxane, tetrahydrofuran, diethyl ether, 1,2-dimethoxyethane, cyclopentyl methyl ether and the like; hydrocarbon solvents such as toluene, hexane, xylene and the like; halogen solvents such as dichloromethane, chloroform and the like; polar solvents such as N,N-dimethylformamide, N,N-dimethylacetamide, dimethyl sulfoxide, acetonitrile, pyridine and the like. These may be used singly or as a mixture of two or more kinds thereof.

Compound [8] may be a commercially available product such as 3,3,3-trifluoromethyl-2,2-dimethylpropionic acid, 1-trifluoromethylcyclopentanecarboxylic acid, or may be obtained by converting a commercially available product as appropriate by a method well known to those of ordinary skill in the art.

(Step A-6)

Compound [I-a] can be obtained by converting the alkoxy group of compound [9] into a hydroxy group by hydrolysis. For example, when $R^7$ is $C_{1-6}$ alkyl, compound [I-a] can be obtained by reacting compound [9] in the presence of a base in a solvent, at room temperature to under heating, and then neutralizing the obtained solution.

Examples of the base to be used for the reaction include lithium hydroxide, sodium hydroxide, potassium hydroxide, sodium methoxide and the like.

Examples of the solvent to be used for the reaction include mixed solvents of water and alcohol solvents such as methanol, ethanol, 1-propanol, 2-propanol and the like; and mixed solvents of the above-metioned mixed solvents and ether solvents such as 1,4-dioxane, tetrahydrofuran, diethyl ether, 1,2-dimethoxyethane, cyclopentyl methyl ether and the like.

[Production Method B]

Compound [I-b] can be obtained according to Production Method B.

[Production Method B]

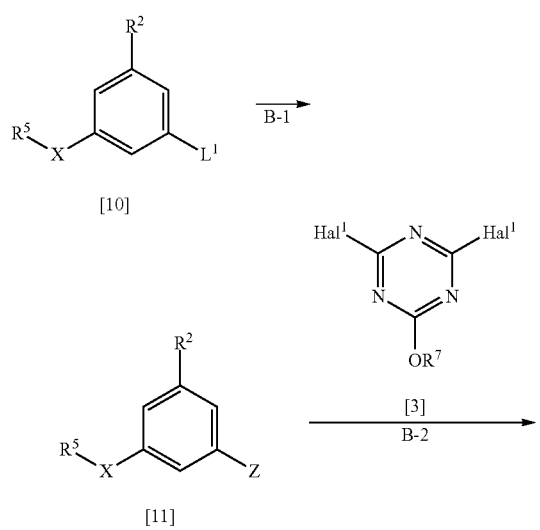

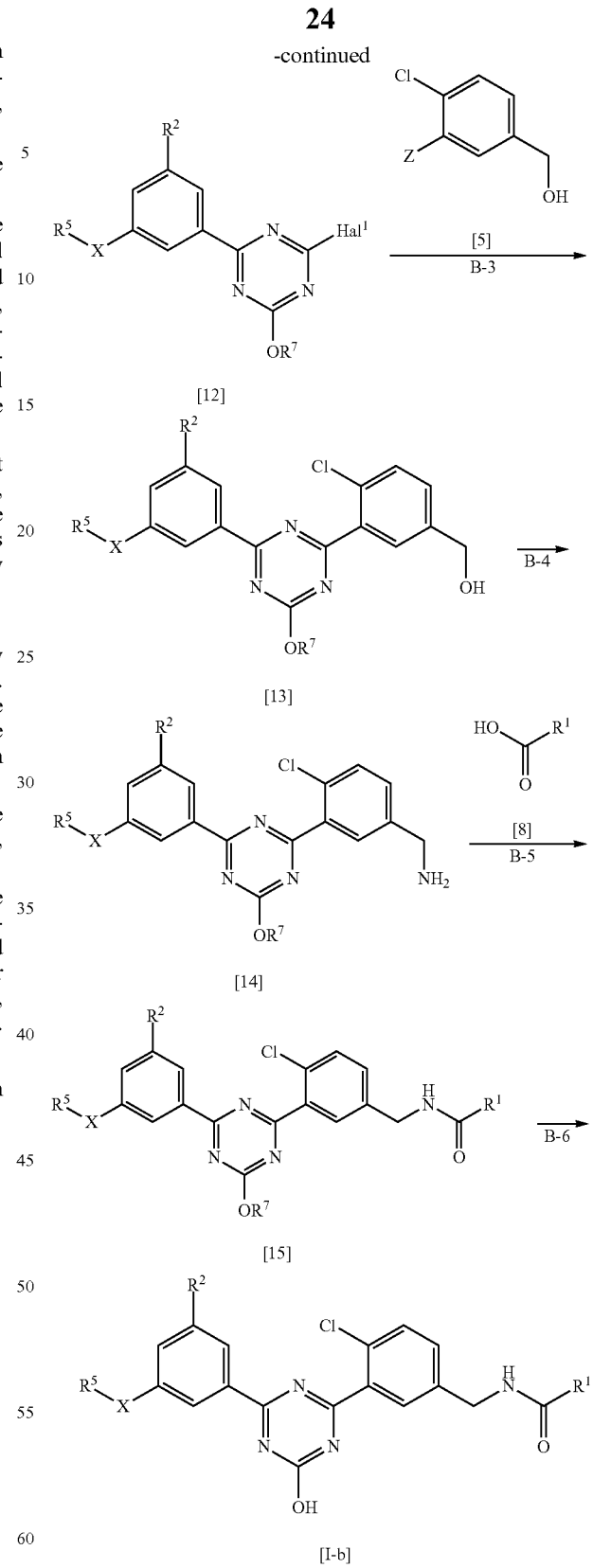

wherein $R^1$, $R^2$, $R^5$ and X are as defined in the formula [I-b], and $L^1$, $Hal^1$, Z and $R^7$ are as defined in Production Method A.

(Step B-1)

Compound [11] can be obtained by subjecting compound [10] to a boronation in the same manner as in Step A-1 of Production Method A.

Compound [10] may be a commercially available product such as 3-bromophenyl ethyl ether, or may be obtained by converting a commercially available product as appropriate by a method well known to those of ordinary skill in the art.

(Step B-2)

Compound [12] can be obtained by subjecting compound [11] and compound [3] to the Suzuki coupling reaction in the same manner as in Step A-2 of Production Method A.

(Step B-3)

Compound [13] can be obtained by subjecting compound [12] and boron compound [5] to the Suzuki coupling reaction in the same manner as in Step A-3 of Production Method A.

(Step B-4)

Compound [14] can be obtained by converting the hydroxy group of compound [13] into an amino group by azidation and reduction in the same manner as in Step A-4 of Production Method A.

(Step B-5)

Compound [15] can be obtained by subjecting compound [14] and compound [8] to an amidation reaction in the same manner as in Step A-5 of Production Method A.

(Step B-6)

Compound [I-b] can be obtained by converting the alkoxy group of compound [15] into a hydroxy group by hydrolysis in the same manner as in Step A-6 of Production Method A.

[Production Method C]

Compound [I-c] can be obtained according to Production Method C.

[Production Method C]

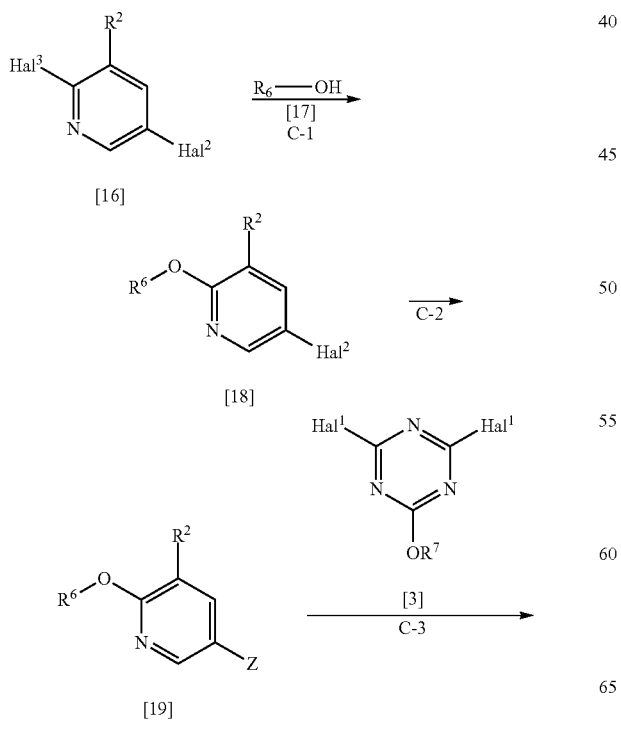

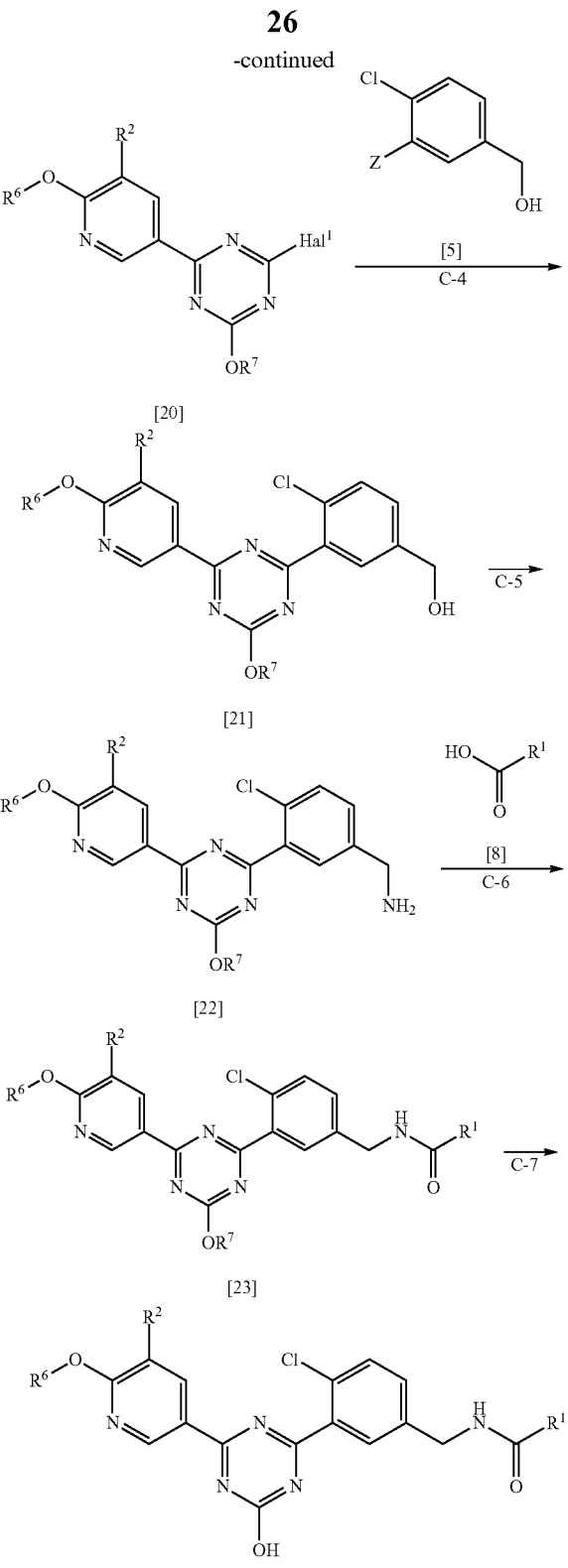

wherein $Hal^2$ is bromo or iodo;

$Hal^3$ is fluoro, chloro or bromo;

$R^1$, $R^2$ and $R^6$ are as defined in the formula [I-c], and $R^7$, Z, $Hal^1$ are as defined in Production Method A.

(Step C-1)

Compound [18] can be obtained by subjecting compound [16] and compound [17] to an aromatic nucleophilic substitution reaction. For example, compound [18] can be obtained by reacting compound [16] with compound [17] in the presence of a base and an additive, in a solvent.

Compound [16] may be a commercially available product such as 5-bromo-2-chloropyridine, or may be obtained by converting a commercially available product as appropriate by a method well known to those of ordinary skill in the art.

Compound [17] may be a commercially available product such as n-hexanol, or may be obtained by converting a commercially available product as appropriate by a method well known to those of ordinary skill in the art.

Examples of the solvent to be used for the reaction include ether solvents such as 1,4-dioxane, tetrahydrofuran, diethyl ether, 1,2-dimethoxyethane, cyclopentyl methyl ether and the like; hydrocarbon solvents such as toluene, xylene and the like; polar solvents such as N,N-dimethylformamide, N,N-dimethylacetamide, N-methyl-2-pyrrolidone, dimethyl sulfoxide, acetonitrile, pyridine and the like.

Examples of the base to be used for the reaction include sodium hydride, lithium hydroxide, sodium hydroxide, potassium hydroxide, sodium tert-butoxide, potassium tert-butoxide, potassium phosphate, sodium carbonate, sodium hydrogencarbonate, potassium carbonate, sodium and the like.

Examples of the additive to be used for the reaction include tetra-n-butylammonium bromide, 18-crown-6, copper iodide and the like.

(Step C-2)

Compound [19] can be obtained by subjecting compound [18] to a boronation in the same manner as in Step A-1 of Production Method A.

(Step C-3)

Compound [20] can be obtained by subjecting compound [19] and compound [3] to the Suzuki coupling reaction in the same manner as in Step A-2 of Production Method A.

(Step C-4)

Compound [21] can be obtained by subjecting compound [20] and boron compound [5] to the Suzuki coupling reaction in the same manner as in Step A-3 of Production Method A.

(Step C-5)

Compound [22] can be obtained by converting the hydroxy group of compound [21] into an amino group by azidation and reduction in the same manner as in Step A-4 of Production Method A.

(Step C-6)

Compound [23] can be obtained by subjecting compound [22] and compound [8] to an amidation reaction in the same manner as in Step A-5 of Production Method A.

(Step C-7)

Compound [I-c] can be obtained by converting the alkoxy group of compound [23] into a hydroxy group by hydrolysis in the same manner as in Step A-6 of Production Method A.

EXAMPLES

The present invention is explained in more detail in the following by referring to Examples and Experimental Examples, which are not to be construed as limitative.

The abbreviations in the Examples are as follows.

WSC HCl: 1-ethyl-3-(3-dimethylaminopropyl)carbodiimide hydrochloride
HOBt H$_2$O: 1-hydroxy-1H-benzotriazole1 hydrate
DMSO: dimethyl sulfoxide
M: mol/L
N: normal

[Production Example 1]: Synthesis of N-{4-chloro-3-[4-(4-chloro-3-isopropylphenyl)-6-hydroxy-1,3,5-triazin-2-yl]benzyl}-3,3,3-trifluoro-2,2-dimethylpropionamide (Example No. 48)

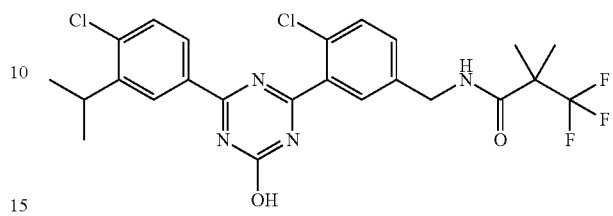

(1) 2-(4-chloro-3-isopropylphenyl)-5,5-dimethyl-1,3,2-dioxaborinane

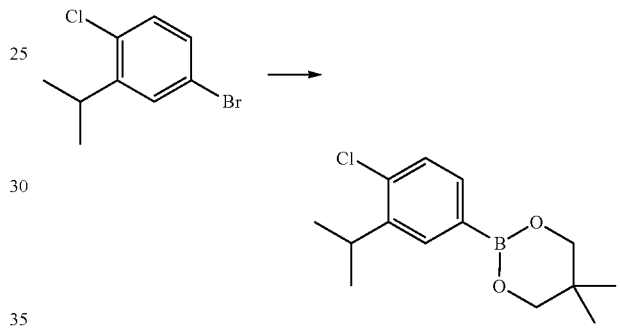

A suspension of 4-bromo-1-chloro-2-isopropylbenzene (0.50 g), 5,5,5',5'-tetramethyl-2,2'-bi-1,3,2-dioxaborinane (0.77 g), [1,1'-bis(diphenylphosphino)ferrocene]palladium(II) dichloride dichloromethane adduct (0.087 g) and potassium acetate (0.63 g) in 1,2-dimethoxyethane (5.0 ml) was stirred at 85° C. for 16 hr under argon atmosphere. To the reaction mixture was added ethyl acetate (10 ml) at room temperature. The reaction mixture was filtered through Celite with ethyl acetate. The filtrate was concentrated under reduced pressure, and the residue was purified by silica gel chromatography (eluent: n-hexane/ethyl acetate) to give the title compound (0.53 g, yield 93%).

$^1$H-NMR (CDCl$_3$) δ: 1.02 (6H, s), 1.27 (6H, d, J=6.9 Hz), 3.35-3.46 (1H, m), 3.76 (4H, s), 7.31 (1H, d, J=7.9 Hz), 7.53 (1H, dd, J=7.9, 1.5 Hz), 7.72 (1H, d, J=1.5 Hz).

(2) 2-chloro-4-(4-chloro-3-isopropylphenyl)-6-methoxy-1,3,5-triazine

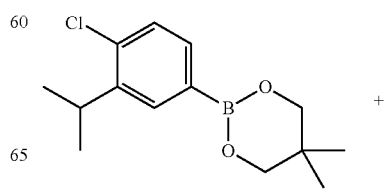

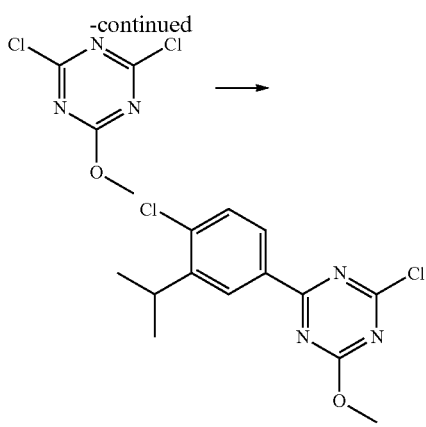

A suspension of 2-(4-chloro-3-isopropylphenyl)-5,5-dimethyl-1,3,2-dioxaborinane (obtained in the above-mentioned (1), 0.53 g), 2,4-dichloro-6-methoxy-1,3,5-triazine (1.1 g), tetrakis(triphenylphosphine)palladium (0) (0.23 g) and tripotassium phosphate (2.1 g) in 1,2-dimethoxyethane (8.6 ml) and distilled water (3.2 ml) was stirred at 85° C. for 2.5 hr under argon atmosphere. To the reaction mixture were added water and ethyl acetate at room temperature, the mixture was separated, and the organic layer was washed with saturated brine. The organic layer was dried over sodium sulfate, filtered to remove the sodium sulfate, and concentrated under reduced pressure. The residue was purified by silica gel chromatography (eluent: n-hexane/ethyl acetate) to give a crude product (0.36 g) containing the title compound.

$^1$H-NMR (CDCl$_3$) δ: 1.32 (6H, d, J=6.7 Hz), 3.41-3.51 (1H, m), 4.17 (3H, s), 7.47 (1H, d, J=8.3 Hz), 8.25 (1H, dd, J=8.3, 2.3 Hz), 8.43 (1H, d, J=2.3 Hz).

(3) {4-chloro-3-[4-(4-chloro-3-isopropylphenyl)-6-methoxy-1,3,5-triazin-2-yl]phenyl}methanol

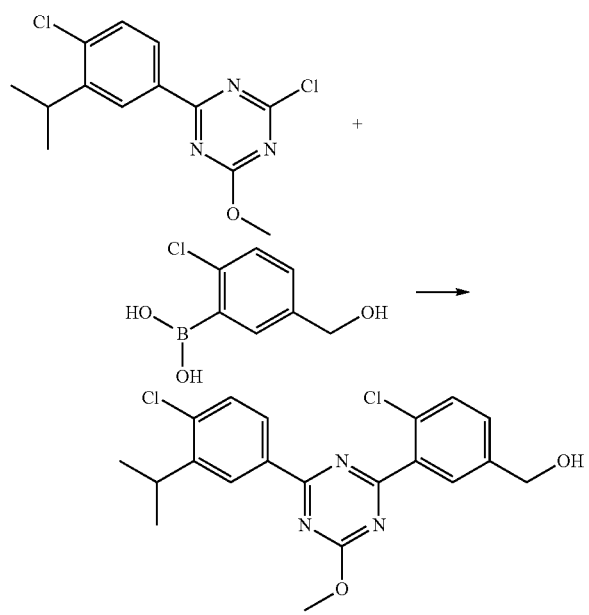

A suspension of the crude product (obtained in the above-mentioned (2), 0.36 g) containing 2-chloro-4-(4-chloro-3-isopropylphenyl)-6-methoxy-1,3,5-triazine, 2-chloro-5-hydroxymethylphenylboronic acid (0.27 g), [1,1'-bis(diphenylphosphino)ferrocene]palladium(II) dichloride dichloromethane adduct (0.050 g) and tripotassium phosphate (0.78 g) in acetonitrile (3.6 ml) and distilled water (1.8 ml) was stirred at 85° C. for 1.5 hr under argon atmosphere. To the reaction mixture were added water and ethyl acetate at room temperature, and the mixture was separated. Then, the organic layer was washed successively with water and saturated brine, dried over sodium sulfate, filtered to remove the sodium sulfate, and concentrated under reduced pressure. The residue was purified by silica gel chromatography (eluent: n-hexane/ethyl acetate) to give the title compound (0.29 g, yield 35% (2 steps)).

$^1$H-NMR (CDCl$_3$) δ: 1.34 (6H, d, J=6.7 Hz), 1.76 (1H, t, J=6.0 Hz), 3.42-3.53 (1H, m), 4.22 (3H, s), 4.78 (2H, d, J=6.0 Hz), 7.46-7.50 (2H, m), 7.55 (1H, d, J=8.3 Hz), 8.05 (1H, d, J=1.8 Hz), 8.35 (1H, dd, J=8.3, 2.3 Hz), 8.58 (1H, d, J=2.3 Hz).

(4) 4-chloro-3-[4-(4-chloro-3-isopropylphenyl)-6-methoxy-1,3,5-triazin-2-yl]benzylamine hydrochloride

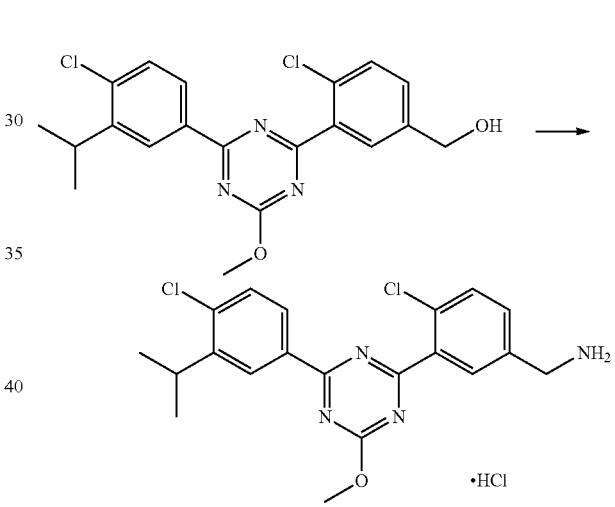

To a solution of {4-chloro-3-[4-(4-chloro-3-isopropylphenyl)-6-methoxy-1,3,5-triazin-2-yl]phenyl}methanol 5 (obtained in the above-mentioned (3), 0.29 g) in toluene (1.2 ml) were added diphenylphosphorylazide (0.18 ml) and 1,8-diazabicyclo[5.4.0]-7-undecene (0.13 ml) under ice cooling under argon atmosphere. The reaction mixture was stirred at room temperature for 15 hr. To the reaction mixture were added saturated aqueous sodium bicarbonate solution (0.35 ml) and distilled water (0.35 ml) at room temperature, and the mixture was stirred for 1 min. The aqueous layer was removed from the reaction mixture, distilled water (0.70 ml) was added thereto, and the mixture was stirred for 1 min. The aqueous layer was removed from the reaction mixture, and distilled water (0.70 ml) was added thereto. The reaction mixture was stirred for 1 min, and the aqueous layer was removed. To the reaction mixture were added triphenylphosphine (0.24 g) and distilled water (0.029 ml) at room temperature. The reaction mixture was stirred at 64° C. for 1 hr. To the reaction mixture were added acetonitrile (1.2 ml) and conc. hydrochloric acid (0.075 ml) under ice cooling, and the mixture was stirred for 30 min. The solid was collected by filtration from the suspension, and dried under reduced pressure to give the title compound (0.27 g, yield 87%).

¹H-NMR (DMSO-d₆) δ: 1.30 (6H, d, J=6.9 Hz), 3.36-3.44 (1H, m), 4.16 (2H, s), 4.17 (3H, s), 7.67 (1H, d, J=8.3 Hz), 7.71 (1H, dd, J=8.3, 2.1 Hz), 7.76 (1H, d, J=8.3 Hz), 8.17 (1H, d, J=2.1 Hz), 8.29 (3H, br s), 8.34 (1H, dd, J=8.3, 2.1 Hz), 8.52 (1H, d, J=2.1 Hz).

(5) N-{4-chloro-3-[4-(4-chloro-3-isopropylphenyl)-6-methoxy-1,3,5-triazin-2-yl]benzyl}-3,3,3-trifluoro-2,2-dimethylpropionamide

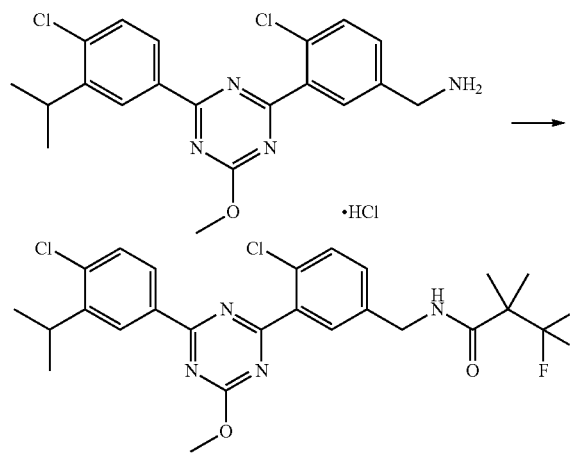

To a solution of 4-chloro-3-[4-(4-chloro-3-isopropylphenyl)-6-methoxy-1,3,5-triazin-2-yl]benzylamine hydrochloride (obtained in the above-mentioned (4), 0.080 g), 3,3,3-trifluoro-2,2-dimethylpropionic acid (0.042 g), HOBt H₂O (0.042 g) and WSC HCl (0.052 g) in N,N-dimethylformamide (1.0 ml) was added triethylamine (0.076 ml) at room temperature under argon atmosphere, and the mixture was stirred for 16 hr. To the reaction mixture were added saturated aqueous sodium bicarbonate solution and ethyl acetate, the mixture was separated, and the organic layer was washed with saturated brine. The organic layer was dried over sodium sulfate, filtered to remove the sodium sulfate, and concentrated under reduced pressure. The residue was purified by silica gel chromatography (eluent: n-hexane/ethyl acetate) to give the title compound (0.089 g, yield 90%).

¹H-NMR (CDCl₃) δ: 1.33 (6H, d, J=6.7 Hz), 1.44 (6H, s), 3.43-3.52 (1H, m), 4.21 (3H, s), 4.55 (2H, d, J=5.8 Hz), 6.23 (1H, br s), 7.36 (1H, dd, J=8.3, 2.3 Hz), 7.48 (1H, d, J=8.3 Hz), 7.53 (1H, d, J=8.3 Hz), 7.94 (1H, d, J=2.3 Hz), 8.34 (1H, dd, J=8.3, 2.2 Hz), 8.57 (1H, d, J=2.2 Hz).

(6) N-{4-chloro-3-[4-(4-chloro-3-isopropylphenyl)-6-hydroxy-1,3,5-triazin-2-yl]benzyl}-3,3,3-trifluoro-2,2-dimethylpropionamide

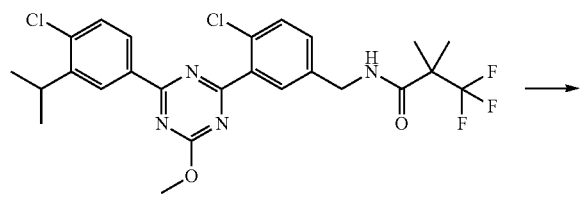

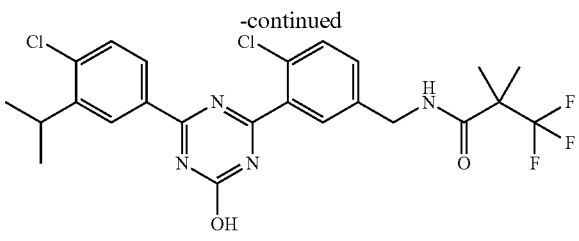

To a solution of N-{4-chloro-3-[4-(4-chloro-3-isopropylphenyl)-6-methoxy-1,3,5-triazin-2-yl]benzyl}-3,3,3-trifluoro-2,2-dimethylpropionamide (obtained in the above-mentioned (5), 0.089 g) in methanol (1.4 ml) was added 4M aqueous sodium hydroxide solution (0.25 ml) at room temperature under argon atmosphere, and the mixture was stirred at 65° C. for 2.5 hr. To the reaction mixture were added 2N hydrochloric acid (0.49 ml) and water at room temperature, and the mixture was stirred. The precipitated solid was collected by filtration, washed with water, and dried under reduced pressure to give the title compound (0.075 g, yield 86%).

[Production Example 2]: Synthesis of N-(4-chloro-3-{4-hydroxy-6-[6-((R)-1-methylbutoxy)pyridin-3-yl]-1,3,5-triazin-2-yl}benzyl)-3,3,3-trifluoro-2,2-dimethylpropionamide (Example No. 25)

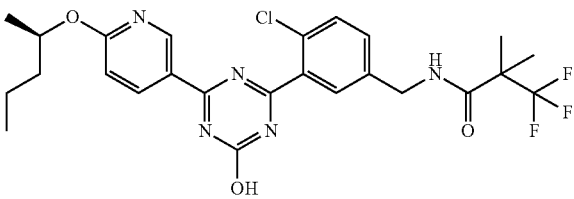 [SMILES: CCC[C@@H](C)Oc1ccc(-c2nc(O)nc(-c3cc(CNC(=O)C(C)(C)C(F)(F)F)ccc3Cl)n2)cn1]

(1) 5-bromo-2-((R)-1-methylbutoxy)pyridine

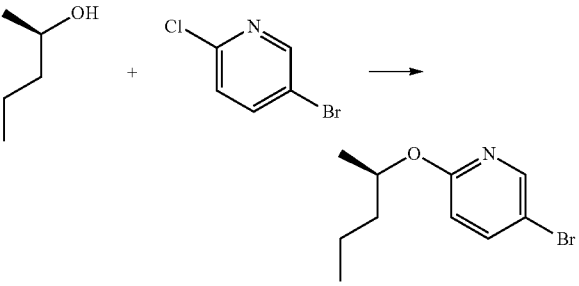

To a solution of 5-bromo-2-chloropyridine (1.0 g) and (R)-pentan-2-ol (0.69 g) in tetrahydrofuran (10 ml) was added sodium hydride (0.31 g, 60 wt % oil dispersion) at room temperature under argon atmosphere, and the mixture was stirred for 10 min, and then at 80° C. for 1 hr. To the reaction mixture were added saturated aqueous ammonium chloride solution and ethyl acetate at room temperature, the mixture was separated, and the organic layer was washed with saturated brine. The organic layer was dried over sodium sulfate, filtered to remove the sodium sulfate, and concentrated under reduced pressure. The residue was purified by silica gel chromatography (eluent: n-hexane/ethyl acetate) to give the title compound (1.3 g, quant.).

¹H-NMR (CDCl₃) δ: 0.92 (3H, t, J=7.3 Hz), 1.29 (3H, d, J=6.2 Hz), 1.33-1.48 (2H, m), 1.50-1.59 (1H, m), 1.66-1.75 (1H, m), 5.10-5.18 (1H, m), 6.59 (1H, d, J=8.8 Hz), 7.60 (1H, dd, J=8.8, 2.4 Hz), 8.16 (1H, d, J=2.4 Hz).

(2) 2-chloro-4-methoxy-6-[6-((R)-1-methylbutoxy)pyridin-3-yl]-1,3,5-triazine

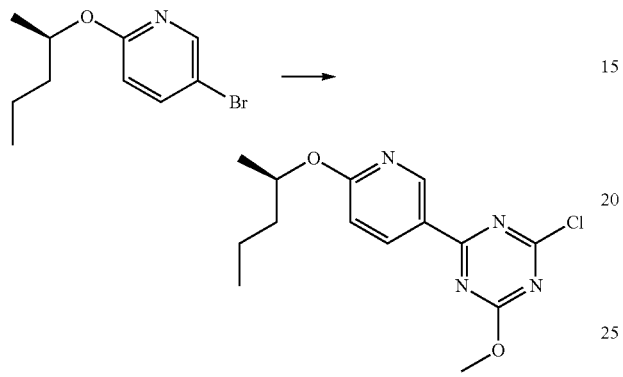

To a solution of 5-bromo-2-((R)-1-methylbutoxy)pyridine (obtained in the above-mentioned (1), 1.3 g) in a mixed solvent of toluene (8.5 ml) and tetrahydrofuran (2.0 ml) was added dropwise n-butyllithium (1.6 M n-hexane solution, 4.4 ml) at −78° C. under argon atmosphere. The mixture was stirred for 15 min, and triisopropyl borate (1.6 ml) was added thereto in two parts. The mixture was allowed to warm to room temperature, and stirred for 30 min. To the reaction mixture was added 10% aqueous citric acid solution, and the mixture was stirred for 10 min. To the reaction mixture was added ethyl acetate, and the mixture was separated. Then, the organic layer was washed successively with water and saturated brine, dried over sodium sulfate, filtered to remove the sodium sulfate, and concentrated under reduced pressure. To a solution of the obtained residue in a mixed solvent of 1,2-dimethoxyethane (28 ml) and distilled water (14 ml) were added 2,4-dichloro-6-methoxy-1,3,5-triazine (2.8 g), [1,1'-bis(diphenylphosphino)ferrocene]palladium(II) dichloride dichloromethane adduct (0.21 g) and tripotassium phosphate (3.9 g), and the mixture was stirred at 90° C. for 1.5 hr. To the reaction mixture were added water and ethyl acetate at room temperature, the mixture was separated, and the organic layer was washed with water and saturated brine. The organic layer was dried over sodium sulfate, filtered to remove the sodium sulfate, and concentrated under reduced pressure. The residue was purified by silica gel chromatography (eluent: n-hexane/ethyl acetate) to give a crude product (1.1 g, yield ca. 60%) containing the title compound.

¹H-NMR (CDCl₃) δ: 0.94 (3H, t, J=7.4 Hz), 1.35 (3H, d, J=6.2 Hz), 1.38-1.50 (2H, m), 1.53-1.64 (1H, m), 1.72-1.81 (1H, m), 4.15 (3H, s), 5.31-5.40 (1H, m), 6.76 (1H, d, J=8.8 Hz), 8.54 (1H, dd, J=8.8, 2.1 Hz), 9.27 (1H, d, J=2.1 Hz).

(3) (4-chloro-3-{4-methoxy-6-[6-((R)-1-methylbutoxy)pyridin-3-yl]-1,3,5-triazin-2-yl}phenyl)methanol A suspension of the crude product (obtained in the above-mentioned (2), 1.1 g) containing 2-chloro-4-methoxy-6-[6-((R)-1-methylbutoxy)pyridin-3-yl]-1,3,5-triazine, 2-chloro-5-hydroxymethylphenylboronic acid (0.76 g), [1,1'-bis(diphenylphosphino)ferrocene]palladium(II) dichloride dichloromethane adduct (0.14 g) and tripotassium phosphate (2.2 g) in acetonitrile (11 ml) and distilled water (6.0 ml) was stirred at 80° C. for 1.5 hr under argon atmosphere. To the reaction mixture were added water and ethyl acetate at room temperature, the mixture was separated, and the organic layer was washed with saturated brine. The organic layer was dried over sodium sulfate, filtered to remove the sodium sulfate, and concentrated under reduced pressure. The residue was purified by silica gel chromatography (eluent: n-hexane/ethyl acetate) to give the title compound (0.89 g, yield 64%).

¹H-NMR (CDCl₃) δ: 0.94 (3H, t, J=7.3 Hz), 1.35 (3H, d, J=6.2 Hz), 1.39-1.50 (2H, m), 1.57-1.64 (1H, m), 1.73-1.81 (2H, m), 4.19 (3H, s), 4.77 (2H, d, J=6.0 Hz), 5.31-5.40 (1H, m), 6.78 (1H, d, J=8.8 Hz), 7.47 (1H, dd, J=8.2, 2.2 Hz), 7.54 (1H, d, J=8.2 Hz), 8.03 (1H, d, J=2.2 Hz), 8.66 (1H, dd, J=8.9, 2.1 Hz), 9.39 (1H, d, J=2.1 Hz).

(4) N-(4-chloro-3-{4-methoxy-6-[6-((R)-1-methylbutoxy)pyridin-3-yl]-1,3,5-triazin-2-yl}benzyl)-3,3,3-trifluoro-2,2-dimethylpropionamide

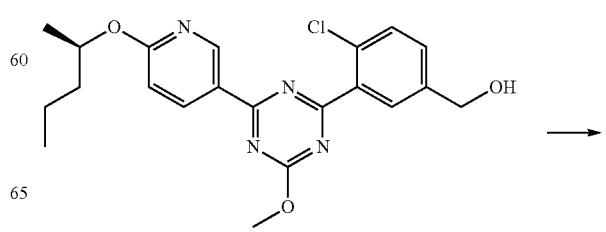

-continued

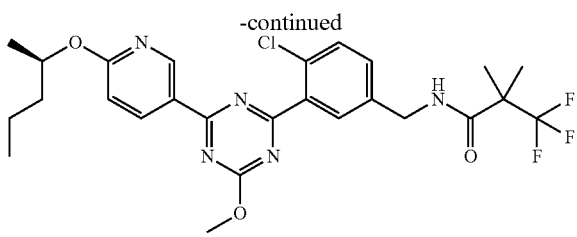

To a solution of (4-chloro-3-{4-methoxy-6-[6-((R)-1-methylbutoxy)pyridin-3-yl]-1,3,5-triazin-2-yl}phenyl)methanol (obtained in the above-mentioned (3), 0.16 g) in tetrahydrofuran (1.6 ml) was added diphenylphosphorylazide (0.12 ml) at room temperature under argon atmosphere. To the reaction mixture was added 1,8-diazabicyclo[5.4.0]-7-undecene (0.080 ml) under ice cooling, and the mixture was stirred for 15 min. The reaction mixture was stirred at 60° C. for 20 min. To the reaction mixture were added triphenylphosphine (0.22 g) and distilled water (0.080 ml) at room temperature, and the mixture was stirred at 60° C. for 1 hr. To the reaction mixture were added N,N-dimethylformamide (1.6 ml), 3,3,3-trifluoro-2,2-dimethylpropionic acid N,N-dimethylformamide solution (1.9M, 0.30 ml), HOBt H$_2$O (0.12 g) and WSC HCl (0.15 g) at room temperature, and the mixture was stirred for 15 min. The reaction mixture was left standing at room temperature for 15 hr. To the reaction mixture were added water and ethyl acetate, and the mixture was separated. Then, the organic layer was washed successively with water and saturated brine, dried over sodium sulfate, filtered to remove the sodium sulfate, and concentrated under reduced pressure. The residue was purified by preparative thin layer chromatography (eluent: n-hexane/ethyl acetate) to give the title compound (0.19 g, yield 91%).

$^1$H-NMR (CDCl$_3$) δ: 0.95 (3H, t, J=7.3 Hz), 1.35 (3H, d, J=6.2 Hz), 1.39-1.51 (2H, m), 1.55-1.64 (1H, m), 1.73-1.82 (1H, m), 4.19 (3H, s), 4.54 (2H, d, J=5.8 Hz), 5.32-5.40 (1H, m), 6.22 (1H, br), 6.78 (1H, d, J=8.8 Hz), 7.35 (1H, dd, J=8.3, 2.3 Hz), 7.52 (1H, d, J=8.3 Hz), 7.93 (1H, d, J=2.3 Hz), 8.65 (1H, dd, J=8.8, 2.4 Hz), 9.38 (1H, d, J=2.4 Hz).

(5) N-(4-chloro-3-{4-hydroxy-6-[6-((R)-1-methylbutoxy)pyridin-3-yl]-1,3,5-triazin-2-yl}benzyl)-3,3,3-trifluoro-2,2-dimethylpropionamide

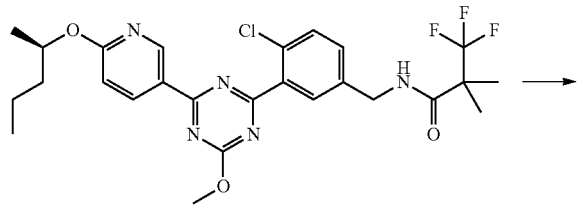

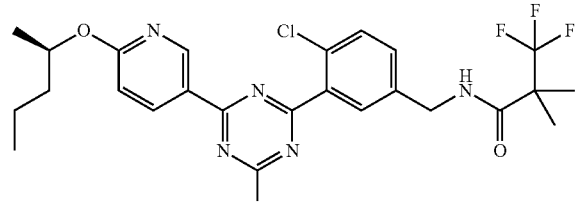

To a solution of N-(4-chloro-3-{4-methoxy-6-[6-((R)-1-methylbutoxy)pyridin-3-yl]-1,3,5-triazin-2-yl}benzyl)-3,3,3-trifluoro-2,2-dimethylpropionamide (obtained in the above-mentioned (4), 0.19 g) in methanol (2.0 ml) was added 4M aqueous sodium hydroxide solution (0.35 ml) at room temperature under argon atmosphere, and the mixture was stirred at 65° C. for 1.5 hr. To the reaction mixture were added 2N hydrochloric acid (0.70 ml) and water at room temperature, and the mixture was stirred. The precipitated solid was collected by filtration, washed with water, and dried under reduced pressure to give the title compound (0.14 g, yield 77%).

[Production Example 3]: Synthesis of N-(4-chloro-3-{4-hydroxy-6-[3-(1-methylcyclopropyl)phenyl]-1,3,5-triazin-2-yl}benzyl)-3,3,3-trifluoro-2,2-dimethylpropionamide (Example No. 49)

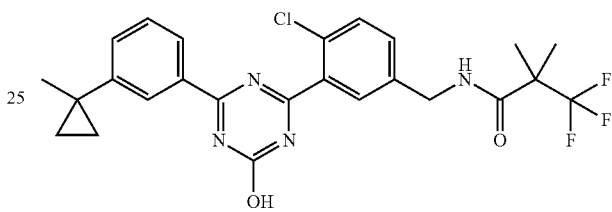

(1) 5,5-dimethyl-2-[3-(1-methylcyclopropyl)phenyl]-1,3,2-dioxaborinane

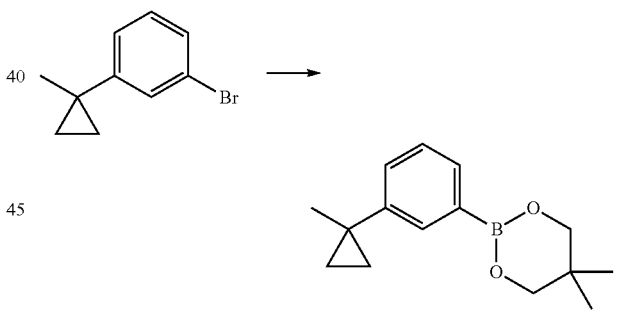

A suspension of 1-bromo-3-(1-methylcyclopropyl)benzene (0.50 g), 5,5,5',5'-tetramethyl-2,2'-bi-1,3,2-dioxaborinane (0.85 g), [1,1'-bis(diphenylphosphino)ferrocene]palladium(II) dichloride dichloromethane adduct (0.096 g) and potassium acetate (0.70 g) in 1,2-dimethoxyethane (5.0 ml) was stirred at 85° C. for 15 hr under argon atmosphere. To the reaction mixture was added ethyl acetate (10 ml) at room temperature. The reaction mixture was filtered through Celite with ethyl acetate. The filtrate was concentrated under reduced pressure, and the residue was purified by silica gel chromatography (eluent: n-hexane/ethyl acetate) to give the title compound (0.56 g, yield 95%).

$^1$H-NMR (CDCl$_3$) δ: 0.0.68-0.71 (2H, m), 0.86-0.89 (2H, m), 1.02 (6H, s), 1.41 (3H, s), 3.77 (4H, s), 7.27 (1H, td, J=7.5, 0.5 Hz), 7.32-7.35 (1H, m), 7.60 (1H, dt, J=7.5, 1.3 Hz), 7.70-7.72 (1H, m).

(2) 2-chloro-4-methoxy-6-[3-(1-methylcyclopropyl)phenyl]-1,3,5-triazine

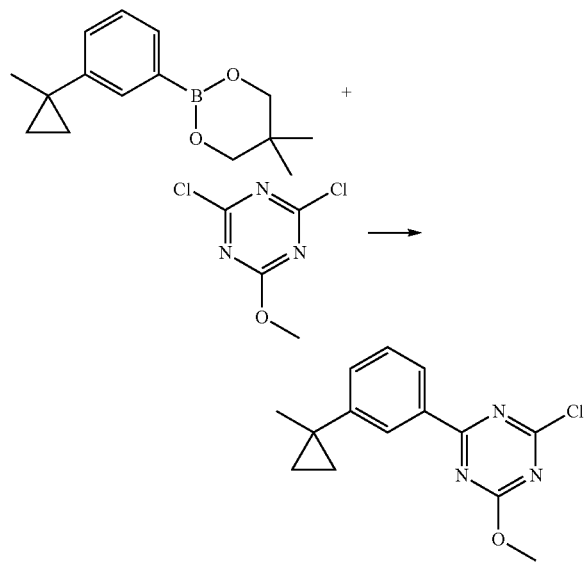

A suspension of 5,5-dimethyl-2-[3-(1-methylcyclopropyl)phenyl]-1,3,2-dioxaborinane (obtained in the above-mentioned (1), 0.56 g), 2,4-dichloro-6-methoxy-1,3,5-triazine (1.1 g), tetrakis(triphenylphosphine)palladium (0) (0.26 g) and tripotassium phosphate (2.4 g) in 1,2-dimethoxyethane (9.8 ml) and distilled water (3.7 ml) was stirred at 85° C. for 2.5 hr under argon atmosphere. To the teaction mixture were added water and ethyl acetate at room temperature, the mixture was separated, and the organic layer was washed with saturated brine. The organic layer was dried over sodium sulfate, filtered to remove the sodium sulfate, and concentrated under reduced pressure. The residue was purified by silica gel chromatography (eluent: n-hexane/ethyl acetate) to give a crude product (0.47 g) containing the title compound.

$^1$H-NMR (CDCl$_3$) δ: 0.77-0.81 (2H, m), 0.91-0.95 (2H, m), 1.46 (3H, s), 4.17 (3H, s), 7.41 (1H, t, J=7.7 Hz), 7.51 (1H, dt, J=7.7, 1.6 Hz), 8.29 (1H, dt, J=7.7, 1.6 Hz), 8.38 (1H, t, J=1.6 Hz).

(3) (4-chloro-3-{4-methoxy-6-[3-(1-methylcyclopropyl)phenyl]-1,3,5-triazin-2-yl}phenyl)methanol

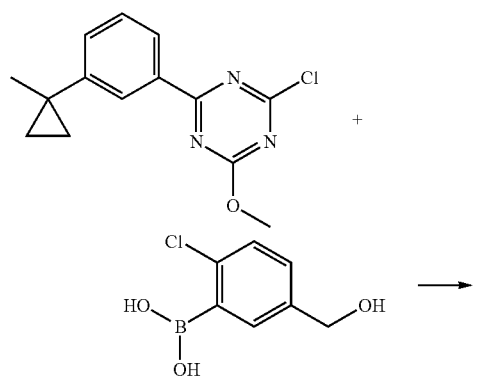

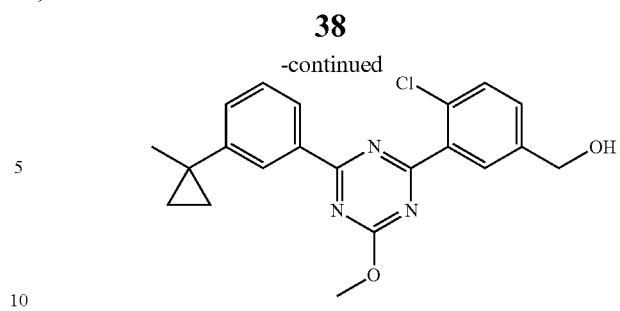

A suspension of the crude product (obtained in the above-mentioned (2), 0.47 g) containing 2-chloro-4-methoxy-6-[3-(1-methylcyclopropyl)phenyl]-1,3,5-triazine, 2-chloro-5-hydroxymethylphenylboronic acid (0.38 g), [1,1'-bis(diphenylphosphino)ferrocene]palladium(II) dichloride dichloromethane adduct (0.069 g) and tripotassium phosphate (1.1 g) in acetonitrile (4.7 ml) and distilled water (2.3 ml) was stirred at 85° C. for 1.5 hr under argon atmosphere. To the reaction mixture were added water and ethyl acetate at room temperature, the mixture was separated, and the organic layer was washed with saturated brine. The organic layer was dried over sodium sulfate, filtered to remove the sodium sulfate, and concentrated under reduced pressure. The residue was purified by silica gel chromatography (eluent: n-hexane/ethyl acetate) to give the title compound (0.42 g, yield 48% (2 steps)).

$^1$H-NMR (CDCl$_3$) δ: 0.77-0.81 (2H, m), 0.93-0.97 (2H, m), 1.47 (3H, s), 1.80 (1H, t, J=6.0 Hz), 4.22 (3H, s), 4.78 (2H, d, J=6.0 Hz), 7.42 (1H, td, J=7.7, 0.5 Hz), 7.46-7.50 (2H, m), 7.54 (1H, d, J=8.3 Hz), 8.03 (1H, d, J=2.3 Hz), 8.40 (1H, dt, J=7.7, 1.6 Hz), 8.50 (1H, t, J=1.6 Hz).

(4) 4-chloro-3-{4-methoxy-6-[3-(1-methylcyclopropyl)phenyl]-1,3,5-triazin-2-yl}benzylamine hydrochloride

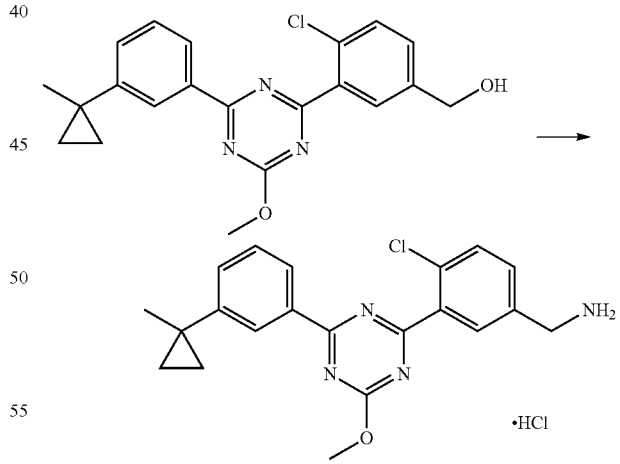

To a solution of (4-chloro-3-{4-methoxy-6-[3-(1-methylcyclopropyl)phenyl]-1,3,5-triazin-2-yl}phenyl)methanol (obtained in the above-mentioned (3), 0.42 g) in toluene (1.9 ml) were added diphenylphosphorylazide (0.29 ml) and 1,8-diazabicyclo[5.4.0]-7-undecene (0.20 ml) under ice cooling under argon atmosphere. The reaction mixture was stirred at room temperature for 15 hr. To the reaction mixture were added saturated aqueous sodium bicarbonate solution (0.50 ml) and distilled water (0.50 ml) at room temperature,

(5) N-(4-chloro-3-{4-methoxy-6-[3-(1-methylcyclopropyl)phenyl]-1,3,5-triazin-2-yl}benzyl)-3,3,3-trifluoro-2,2-dimethylpropionamide

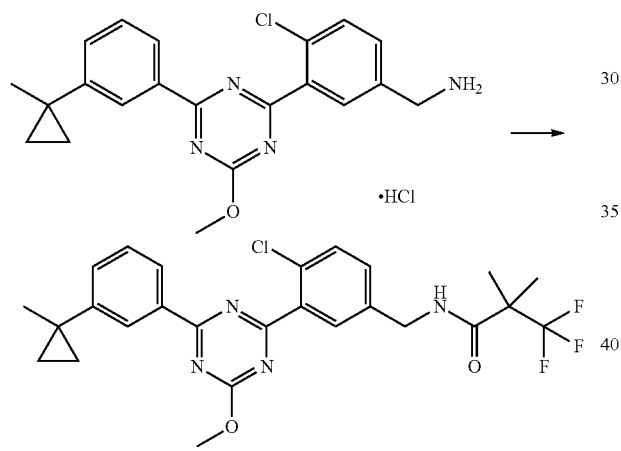

To a solution of 4-chloro-3-{4-methoxy-6-[3-(1-methylcyclopropyl)phenyl]-1,3,5-triazin-2-yl}benzylamine hydrochloride (obtained in the above-mentioned (4), 0.080 g), 3,3,3-trifluoro-2,2-dimethylpropionic acid (0.045 g), HOBt H₂O (0.044 g) and WSC HCl (0.055 g) in N,N-dimethylformamide (1.0 ml) was added triethylamine (0.080 ml) at room temperature under argon atmosphere, and the mixture was stirredfor 16 hr. To the reaction mixture were added saturated aqueous sodium bicarbonate solution and ethyl acetate, the mixture was separated, and the organic layer was washed with saturated brine. The organic layer was dried over sodium sulfate, filtered to remove the sodium sulfate, and concentrated under reduced pressure. The is residue was purified by silica gel chromatography (eluent: n-hexane/ ethyl acetate) to give the title compound (0.093 g, yield 93%).

$^1$H-NMR (CDCl$_3$) δ: 0.77-0.81 (2H, m), 0.93-0.96 (2H, m), 1.44 (6H, s), 1.47 (3H, s), 4.21 (3H, s), 4.55 (2H, d, J=5.8 Hz), 6.18-6.26 (1H, m), 7.35 (1H, dd, J=8.3, 2.3 Hz), 7.42 (1H, t, J=7.7 Hz), 7.49 (1H, dt, J=7.7, 1.6 Hz), 7.53 (1H, d, J=8.3 Hz), 7.93 (1H, d, J=2.3 Hz), 8.39 (1H, dt, J=7.7, 1.6 Hz), 8.49 (1H, t, J=1.6 Hz).

(6) N-(4-chloro-3-{4-hydroxy-6-[3-(1-methylcyclopropyl)phenyl]-1,3,5-triazin-2-yl}benzyl)-3,3,3-trifluoro-2,2-dimethylpropionamide

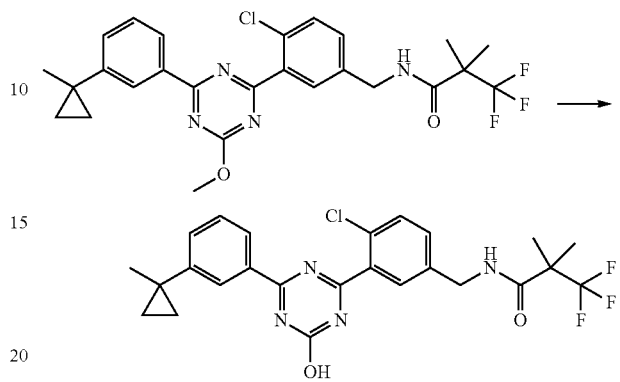

To a solution of N-(4-chloro-3-{4-methoxy-6-[3-(1-methylcyclopropyl)phenyl]-1,3,5-triazin-2-yl}benzyl)-3,3,3-trifluoro-2,2-dimethylpropionamide (obtained in the above-mentioned (5), 0.093 g) in methanol (1.5 ml) was added 4M aqueous sodium hydroxide solution (0.27 ml) at room temperature under argon atmosphere, and the mixture was stirred at 65° C. for 2.5 hr. To the reaction mixture were added 2N hydrochloric acid (0.54 ml) and water at room temperature, and the mixture was stirred. The precipitated solid was collected by filtration, washed with water, and dried under reduced pressure to give the title compound (0.086 g, yield 94%).

[Production Example 4]: Synthesis of 1-trifluoromethylcyclopentanecarboxylic acid 4-chloro-3-[4-hydroxy-6-(3-isopropylphenyl)-1,3,5-triazin-2-yl] benzylamide Example No. 52

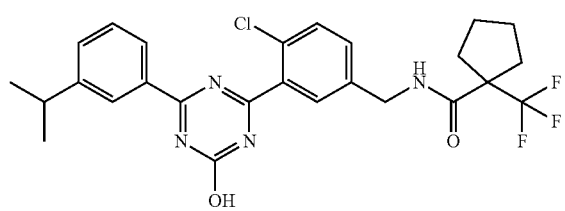 [SMILES: CC(C)c1cccc(-c2nc(O)nc(-c3cc(CNC(=O)C4(C(F)(F)F)CCCC4)ccc3Cl)n2)c1]

(1) 2-chloro-4-(3-isopropylphenyl)-6-methoxy-1,3, 5-triazine

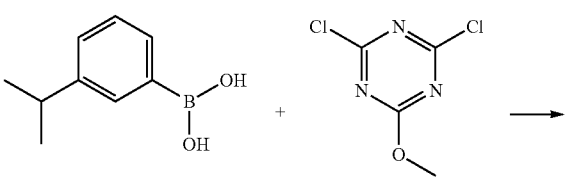

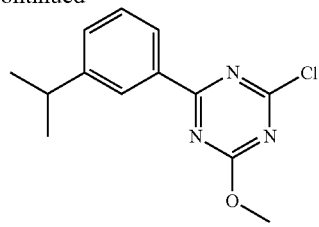

A suspension of 3-isopropylphenylboronic acid (6.1 g), 2,4-dichloro-6-methoxy-1,3,5-triazine (10 g), tetrakis(triphenylphosphine)palladium (0) (1.7 g) and sodium carbonate (12 g) in toluene (60 ml) and distilled water (60 ml) was stirred at 80° C. for 3 hr under argon atmosphere. The reaction mixture was filtered at room temperature with a mixed solvent of n-hexane:ethyl acetate=1:1 and water. To the filtrate was added a mixed solvent of n-hexane:ethyl acetate=1:1, the mixture was separated, and the organic layer was washed with saturated brine. The organic layer was dried over sodium sulfate, and filtered to remove the sodium sulfate. The filtrate was concentrated under reduced pressure to give a mixture (11 g) containing the title compound.

(2) {4-chloro-3-[4-(3-isopropylphenyl)-6-methoxy-1,3,5-triazin-2-yl]phenyl}methanol

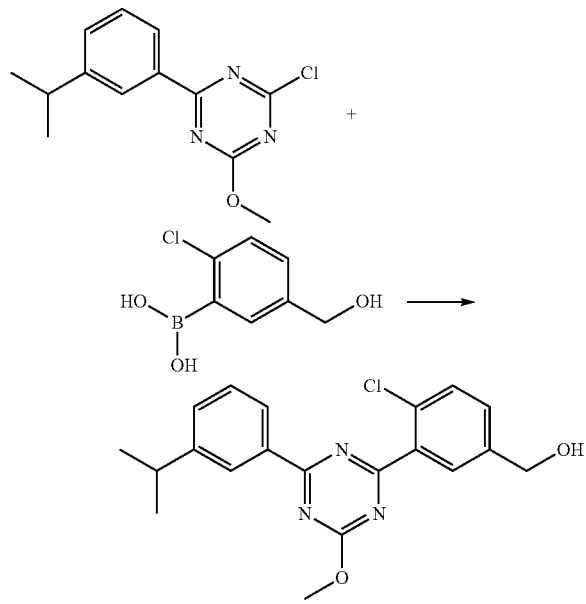

A suspension of the mixture (obtained in the above-mentioned (1), 14 g) containing 2-chloro-4-(3-isopropylphenyl)-6-methoxy-1,3,5-triazine, 2-chloro-5-hydroxymethylphenylboronic acid (12 g), [1,1'-bis(diphenylphosphino)ferrocene]palladium(II) dichloride dichloromethane adduct (1.3 g) and tripotassium phosphate (23 g) in acetonitrile (98 ml) and distilled water (42 ml) was stirred at 80° C. for 3 hr under argon atmosphere. To the reaction mixture was added saturated brine and a mixed solvent of n-hexane:ethyl acetate=1:1 at room temperature, the mixture was separated, and the organic layer was washed with saturated brine. The organic layer was dried over sodium sulfate, filtered to remove the sodium sulfate, and concentrated under reduced pressure. The residue was purified by silica gel chromatography (eluent: n-hexane/ethyl acetate, and chloroform/ethyl acetate) to give the title compound (9.2 g, yield ca. 47% (2 steps)).

$^1$H-NMR (CDCl$_3$) δ: 1.32 (6H, d, J=6.9 Hz), 2.04 (1H, t, J=6.0 Hz), 2.98-3.08 (1H, m), 4.21 (3H, s), 4.75 (2H, d, J=5.6 Hz), 7.41-7.48 (3H, m), 7.53 (1H, d, J=8.1 Hz), 8.01 (1H, d, J=2.4 Hz), 8.40-8.44 (1H, m), 8.46-8.47 (1H, m).

(3) 4-chloro-3-[4-(3-isopropylphenyl)-6-methoxy-1,3,5-triazin-2-yl]benzylamine hydrochloride

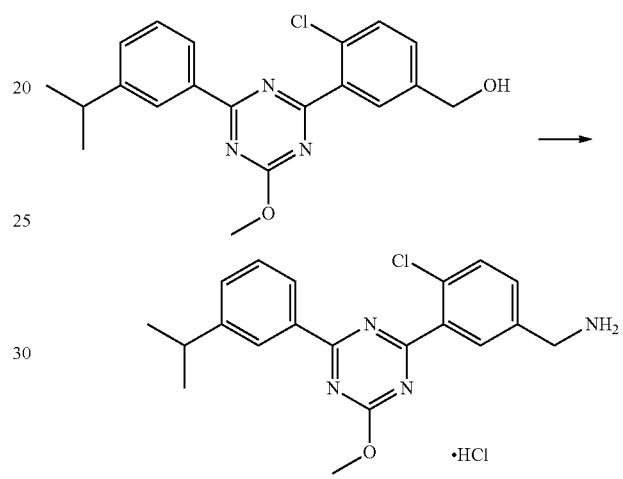

To a solution of {4-chloro-3-[4-(3-isopropylphenyl)-6-methoxy-1,3,5-triazin-2-yl]phenyl}methanol (obtained in the above-mentioned (2), 9.2 g) in toluene (37 ml) were added diphenylphosphorylazide (6.4 ml) and 1,8-diazabicyclo[5.4.0]-7-undecene (4.5 ml) under ice cooling under argon atmosphere. The reaction mixture was stirred at room temperature for 15 hr. To the reaction mixture were added saturated aqueous sodium bicarbonate solution (18 ml) and distilled water (18 ml) at room temperature, and the mixture was stirred for 1 min. The aqueous layer was removed from the reaction mixture, distilled water (36 ml) was added thereto, and the mixture was stirred for 1 min. The aqueous layer was removed from the reaction mixture, and distilled water (36 ml) was added thereto. The reaction mixture was stirred for 1 min, and the aqueous layer was removed. To the reaction mixture was added triphenylphosphine (8.5 g) under ice cooling, and the mixture was stirred for 15 min. The reaction mixture was stirred at room temperature for 15 min, and distilled water (0.92 ml) was added thereto. The reaction mixture was stirred at 60° C. for 1 hr. To the reaction mixture were added acetonitrile (37 ml) and conc. hydrochloric acid (2.6 ml) at room temperature, and the mixture was stirred for 1 hr. The solid was collected by filtration from the suspension, and dried under reduced pressure to give the title compound (8.4 g, yield 83%).

$^1$H-NMR (DMSO-d$_6$) δ: 1.27 (6H, d, J=6.9 Hz), 3.00-3.09 (1H, m), 4.15 (2H, br s), 4.16 (3H, s), 7.54 (1H, t, J=7.7 Hz), 7.58-7.60 (1H, m), 7.72-7.76 (2H, m), 8.16 (1H, br s), 8.35 (1H, dt, J=7.7, 1.6 Hz), 8.39 (1H, br s), 8.48 (3H, br s).

(4) 1-trifluoromethylcyclopentanecarboxylic acid 4-chloro-3-[4-(3-isopropylphenyl)-6-methoxy-1,3,5-triazin-2-yl]benzylamide

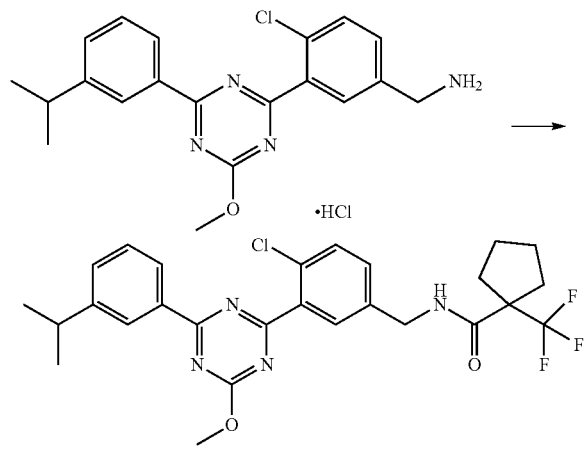

To a solution of 4-chloro-3-[4-(3-isopropylphenyl)-6-methoxy-1,3,5-triazin-2-yl]benzylamine hydrochloride (obtained in the above-mentioned (3), 0.080 g), 1-(trifluoromethyl)cyclopentanecarboxylic acid (0.047 g), HOBt H₂O (0.045 g) and WSC HCl (0.057 g) in N,N-dimethylformamide (0.70 ml) was added triethylamine (0.082 ml) at room temperature under argon atmosphere, and the mixture was stirred for 18 hr. To the reaction mixture were added water and a mixed solvent of n-hexane:ethyl acetate=1:1, the mixture was separated, and the organic layer was washed with saturated brine. The organic layer was dried over sodium sulfate, filtered to remove the sodium sulfate, and concentrated under reduced pressure. The residue was purified by silica gel chromatography (eluent: n-hexane/ethyl acetate) to give the title compound (0.094 g, yield 90%).

¹H-NMR (CDCl₃) δ: 1.32 (6H, d, J=6.9 Hz), 1.71-1.75 (4H, m), 1.96-2.06 (2H, m), 2.28-2.35 (2H, m), 2.99-3.08 (1H, m), 4.21 (3H, s), 4.56 (2H, d, J=5.6 Hz), 6.23 (1H, br s), 7.35 (1H, dd, J=8.1, 2.4 Hz), 7.42-7.49 (2H, m), 7.52 (1H, d, J=8.5 Hz), 7.93 (1H, d, J=2.4 Hz), 8.40-8.43 (1H, m), 8.46 (1H, br s).

(5) 1-trifluoromethylcyclopentanecarboxylic acid 4-chloro-3-[4-hydroxy-6-(3-isopropylphenyl)-1,3,5-triazin-2-yl]benzylamide

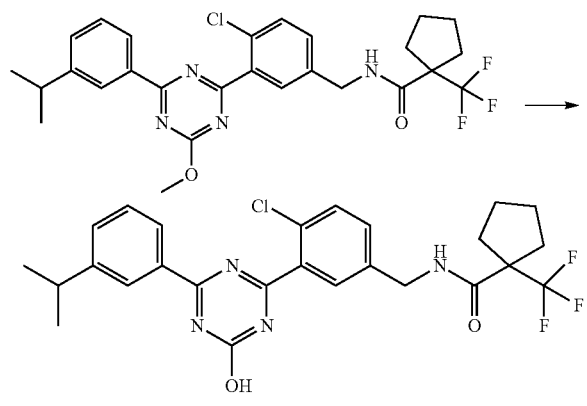

To a solution of 1-trifluoromethylcyclopentanecarboxylic acid 4-chloro-3-[4-(3-isopropylphenyl)-6-methoxy-1,3,5-triazin-2-yl]benzylamide (obtained in the above-mentioned (4), 0.093 g) in methanol (0.80 ml) was added 4M aqueous sodium hydroxide solution (0.13 ml) at room temperature under argon atmosphere, and the mixture was stirred at 60° C. for 3 hr. To the reaction mixture were added 2N hydrochloric acid (0.26 ml) and water at room temperature, and the mixture was stirred. The precipitated solid was collected by filtration, washed with water, and dried under reduced pressure to give the title compound (0.083 g, yield 92%)

[Production Example 5]: Synthesis of 1-fluoromethylcyclopentanecarboxylic acid

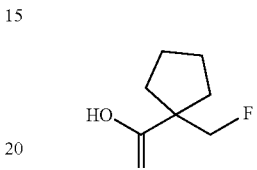

(1) benzyl 1-hydroxymethylcyclopentanecarboxylate

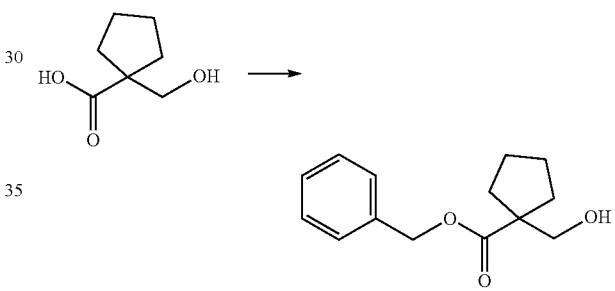

To a solution of 1-hydroxymethylcyclopentanecarboxylic acid (1.1 g) in N,N-dimethylformamide (5.0 ml) was added benzyl bromide (0.94 ml) at room temperature under argon atmosphere. To the reaction mixture was added potassium carbonate (1.3 g) under ice cooling, and the mixture was stirred at room temperature for 3 hr. The reaction mixture was left standing for 20 hr. To the reaction mixture were added water and ethyl acetate, the mixture was separated, and the organic layer was washed with saturated brine. The organic layer was dried over sodium sulfate, and filtered to remove the sodium sulfate. The filtrate was concentrated under reduced pressure to give a mixture (2.0 g) containing the title compound.

¹H-NMR (CDCl₃) δ: 1.60-1.80 (6H, m), 1.95-2.03 (2H, m), 2.45-2.50 (1H, m), 3.59 (2H, d, J=6.9 Hz), 5.16 (2H, s), 7.30-7.39 (5H, m).

(2) benzyl 1-trifluoromethanesulfonyloxymethylcyclopentanecarboxylate

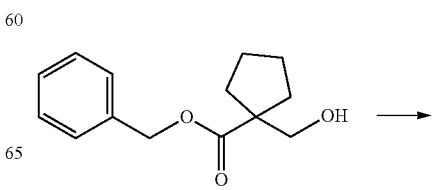

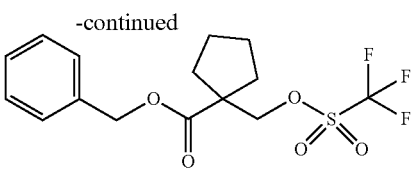

To a solution of the mixture (obtained in the above-mentioned (1), 0.70 g) containing benzyl 1-hydroxymethylcyclopentanecarboxylate in chloroform (3.5 ml) were added 2,6-lutidine (0.47 ml) and trifluoromethanesulfonic anhydride (0.50 ml) under ice cooling under argon atmosphere. The reaction mixture was stirred at room temperature for 10 min. To the reaction mixture were added water, 10% aqueous citric acid solution and chloroform at room temperature, and the mixture was separated. The organic layer was washed with 2% aqueous citric acid solution, dried over sodium sulfate, and filtered to remove the sodium sulfate. The filtrate was concentrated under reduced pressure to give a mixture (1.0 g) containing the title compound.

$^1$H-NMR (CDCl$_3$) δ: 1.64-1.88 (6H, m), 2.05-2.23 (2H, m), 4.58 (2H, s), 5.17 (2H, s), 7.29-7.40 (5H, m).

(3) benzyl 1-fluoromethylcyclopentanecarboxylate

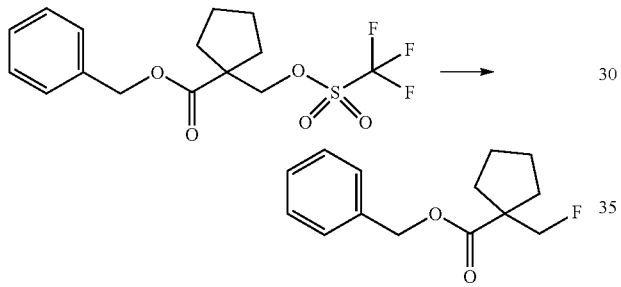

To a solution of the mixture (obtained in the above-mentioned (2), 1.1 g) containing benzyl 1-trifluoromethanesulfonyloxymethylcyclopentanecarboxylate in tetrahydrofuran (5.0 ml) was added tetrabutylammonium fluoride (ca. 1 mol/L tetrahydrofuran solution, 3.0 ml) under ice cooling under argon atmosphere. The reaction mixture was left standing for 63 hr, water and ethyl acetate were added thereto, and the mixture was separated. The organic layer was washed successively with water and saturated brine, dried over sodium sulfate, and filtered to remove the sodium sulfate. The filtrate was concentrated under reduced pressure, and the obtained residue was purified by silica gel chromatography (eluent: n-hexane/ethyl acetate) to give the title compound (0.39 g, yield 62% (3 steps)).

$^1$H-NMR (CDCl$_3$) δ: 1.60-1.82 (6H, m), 2.06-2.16 (2H, m), 4.47 (2H, d, J=47.4 Hz), 5.17 (2H, s), 7.28-7.40 (5H, m).

(4) 1-fluoromethylcyclopentanecarboxylic acid

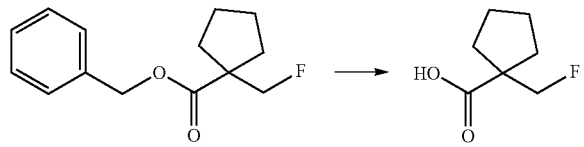 [SMILES: O=C(OCc1ccccc1)C1(CF)CCCC1 ; O=C(O)C1(CF)CCCC1]

To a solution of benzyl 1-10 fluoromethylcyclopentanecarboxylate (obtained in the above-mentioned (3), 0.39 g) in tetrahydrofuran (4.0 ml) was added ASCA-2 (activated carbon-supported 4.5% palladium-0.5% platinum catalyst (manufactured by N.E. Chemcat Corporation, see Finechemical, Oct. 1, 2002, pages 5-14), 0.12 g) at room temperature under nitrogen atmosphere. The mixture was stirred for 5 hr under hydrogen (1 atm). ASCA-2 (0.20 g) was added thereto under nitrogen atmosphere. The mixture was stirred for 15 hr under hydrogen (1 atm). The reaction mixture was filtered through Celite with tetrahydrofuran under nitrogen atmosphere. The filtrate was concentrated under reduced pressure to give a mixture (0.35 g) containing the title compound.

$^1$H-NMR (CDCl$_3$) δ: 1.62-1.81 (6H, m), 2.07-2.14 (2H, m), 4.46 (2H, d, J=47.2 Hz).

[Production Example 6]: Synthesis of 1-difluoromethylcyclopentanecarboxylic acid

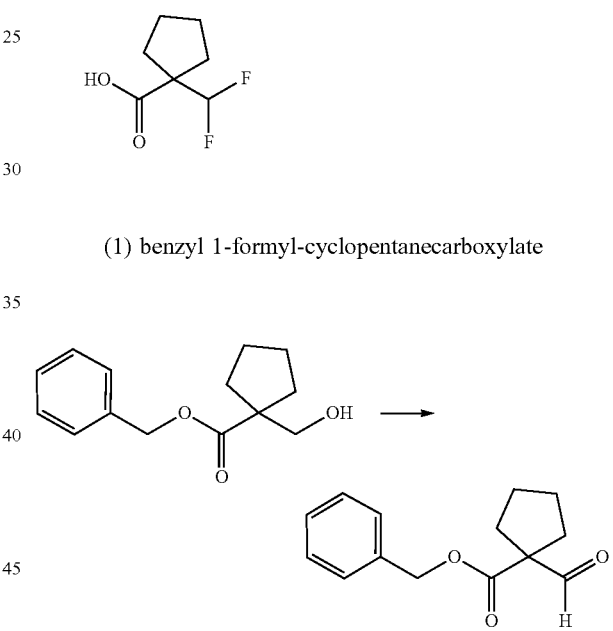

(1) benzyl 1-formyl-cyclopentanecarboxylate

To a solution of the mixture (obtained in (1) of Production Example 5, 0.70 g) containing benzyl 1-hydroxymethylcyclopentanecarboxylate in a mixed solvent of chloroform (3.5 ml) and dimethyl sulfoxide (7.0 ml) was added triethylamine (1.5 ml) under argon atmosphere. To the reaction mixture was added sulfur trioxide-pyridine complex (1.3 g) under ice cooling. The reaction mixture was stirred at room temperature for 1 hr, water and ethyl acetate were added thereto, and the mixture was separated. The organic layer was washed successively with 2% aqueous citric acid solution, ca. 2% aqueous sodium hypochlorite solution and saturated brine, dried over sodium sulfate, and filtered to remove the sodium sulfate. The filtrate was concentrated under reduced pressure, and the obtained residue was purified by silica gel chromatography 5 (eluent: n-hexane/ethyl acetate) to give the title compound (0.58 g, yield ca. 93%).

$^1$H-NMR (CDCl$_3$) δ: 1.57-1.79 (4H, m), 2.05-2.20 (4H, m), 5.19 (2H, s), 7.30-7.41 (5H, m), 9.68 (1H, s).

(2) benzyl 1-difluoromethylcyclopentanecarboxylate

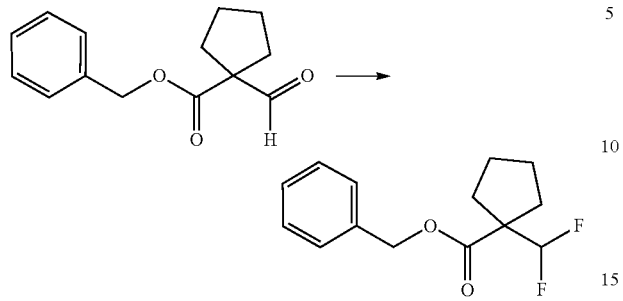

To a solution of benzyl 1-formyl-cyclopentanecarboxylate (obtained in the above-mentioned (1), 0.10 g) in tetrahydrofuran (1.0 ml) was added bis(2-methoxyethyl)aminosulfur trifluoride (0.32 ml) at room temperature under argon atmosphere. The reaction mixture was stirred for 14 hr, poured into water, and the mixture was extracted with ethyl acetate. The organic layer was washed with saturated brine, dried over sodium sulfate, and filtered to remove the sodium sulfate. The filtrate was concentrated under reduced pressure, and the obtained residue was purified by silica gel chromatography (eluent: n-hexane/ethyl acetate) to give the title compound (0.094 g, yield 86%).

$^1$H-NMR (CDCl$_3$) δ: 1.64-1.79 (4H, m), 1.87-2.13 (4H, m), 5.17 (2H, s), 6.14 (1H, t, J=56.8 Hz), 7.29-7.41 (5H, m).

(3) 1-difluoromethylcyclopentanecarboxylic acid

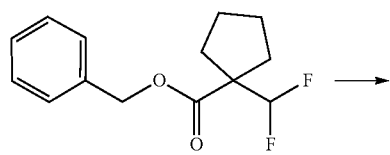

To a solution of benzyl 1-difluoromethylcyclopentanecarboxylate (obtained in the above-mentioned (2), 0.094 g) in tetrahydrofuran (1.0 ml) was added ASCA-2 (0.094 g) at room temperature under nitrogen atmosphere. The mixture was stirred for 4 hr under hydrogen (1 atm). The reaction mixture was filtered through Celite with tetrahydrofuran under nitrogen atmosphere. The filtrate was concentrated under reduced pressure to give a mixture (0.046 g, yield ca. 75%) containing the title compound.

$^1$H-NMR (CDCl$_3$) δ: 1.65-1.79 (4H, m), 1.92-2.01 (2H, m), 2.04-2.18 (2H, m), 6.13 (1H, t, J=56.5 Hz).

[Production Example 7]: Synthesis of 2-ethyl-2-methoxybutyric acid

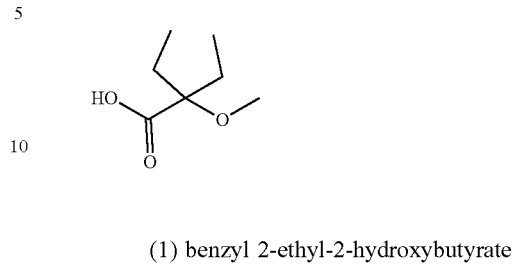

(1) benzyl 2-ethyl-2-hydroxybutyrate

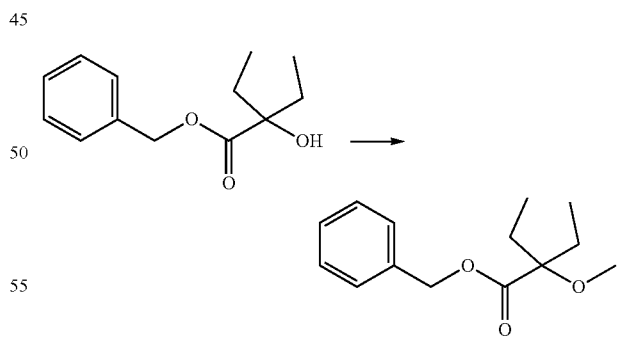

To a solution of 2-ethyl-2-hydroxybutyric acid (1.0 g) in a mixed solvent of tetrahydrofuran (5.0 ml) and toluene (5.0 ml) was added triphenylphosphine (3.4 g) under argon atmosphere. To the reaction mixture were added benzyl alcohol (0.78 ml) and bis(2-methoxyethyl) azodicarboxylate (2.1 g) under ice cooling. The reaction mixture was stirred at room temperature for 1 hr. To the reaction mixture were added ice water and a mixed solvent of n-hexane:ethyl acetate=1:1, the mixture was separated, and the organic layer was washed with water. The organic layer was dried over sodium sulfate, filtered to remove the sodium sulfate, and concentrated under reduced pressure. The residue was purified by silica gel chromatography (eluent: n-hexane/ethyl acetate) to give the title compound (1.6 g, yield 93%).

$^1$H-NMR (CDCl$_3$) δ: 0.82 (6H, t, J=7.5 Hz), 1.62-1.84 (4H, m), 3.16 (1H, s), 5.21 (2H, s), 7.32-7.40 (5H, m).

(2) benzyl 2-ethyl-2-methoxybutyrate

To a solution of benzyl 2-ethyl-2-hydroxybutyrate (obtained in the above-mentioned (1), 1.6 g) in N,N-dimethylformamide (11 ml) were added iodomethane (0.48 ml) and sodium hydride (0.31 g, 60 wt % oil dispersion) under ice cooling under argon atmosphere. The reaction mixture was stirred at room temperature for 1 hr. To the reaction mixture were added ice water and a mixed solvent of n-hexane:ethyl acetate=1:1, the mixture was separated, and the organic layer was washed with water. The organic layer was dried over sodium sulfate, filtered to remove the sodium sulfate, and concentrated under reduced pressure. The residue was purified by silica gel chromatography (eluent: n-hexane/ethyl acetate) to give the title compound (1.4 g, yield 81%).

$^1$H-NMR (CDCl$_3$) δ: 0.81 (6H, t, J=7.5 Hz), 1.80 (4H, q, J=7.5 Hz), 3.22 (3H, s), 5.19 (2H, s), 7.29-7.38 (5H, m).

(3) 2-ethyl-2-methoxybutyric acid

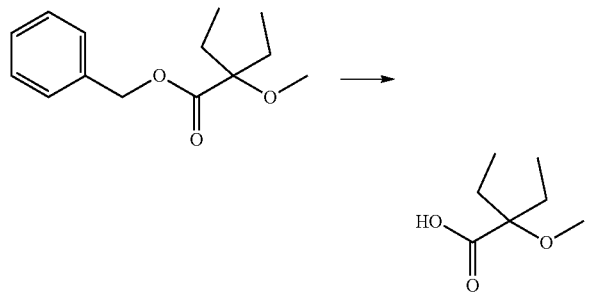

To a solution of benzyl 2-ethyl-2-methoxybutyrate (obtained in the above-mentioned (2), 1.4 g) in tetrahydrofuran (10 ml) was added ASCA-2 (0.14 g) at room temperature under nitrogen atmosphere. The mixture was stirred for 4 hr under hydrogen (1 atm). The reaction mixture was filtered through Celite with tetrahydrofuran under nitrogen atmosphere. The filtrate was concentrated under reduced pressure to give a mixture (0.83 g) containing the title compound.

$^1$H-NMR (CDCl$_3$) δ: 0.85 (6H, t, J=7.5 Hz), 1.72-1.89 (4H, m), 3.29 (3H, s).

[Production Example 8]: Synthesis of 2-ethyl-N-(4-chloro-3-{4-hydroxy-6-[6-((R)-1-methylbutoxy)pyridin-3-yl]-1,3,5-triazin-2-yl}benzyl)-2-methoxybutanamide (Example No. 79)

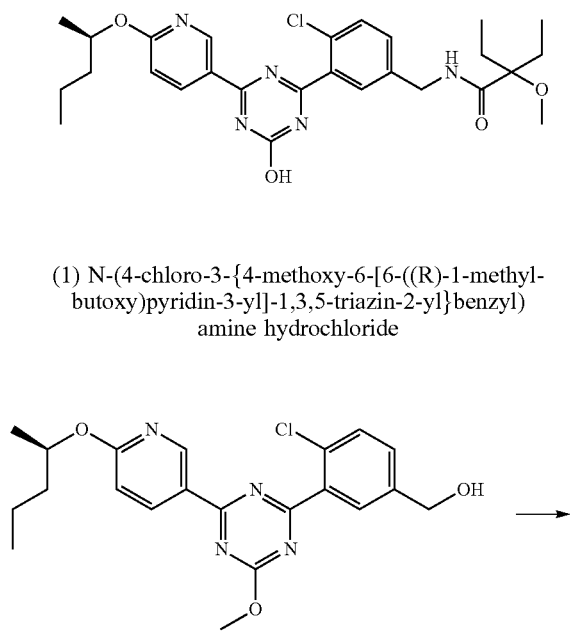

(1) N-(4-chloro-3-{4-methoxy-6-[6-((R)-1-methylbutoxy)pyridin-3-yl]-1,3,5-triazin-2-yl}benzyl) amine hydrochloride

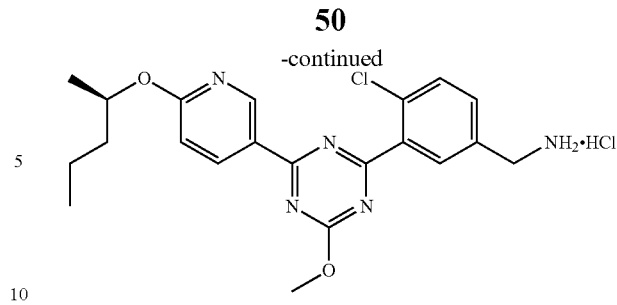

To a solution of (4-chloro-3-{4-methoxy-6-[6-((R)-1-methylbutoxy)pyridin-3-yl]-1,3,5-triazin-2-yl}phenyl) methanol (obtained in (3) of Production Example 2, 84.0 g) in 1,2-dimethoxyethane (420 ml) was added dropwise diphenylphosphorylazide (52.4 ml) under ice cooling under argon atmosphere. To the reaction mixture was added dropwise 1,8-diazabicyclo[5.4.0]-7-undecene (36.3 ml) under ice cooling. The mixture was allowed to warm to room temperature, and stirred for 15 hr. To the reaction mixture were added toluene (210 ml) and 5% aqueous sodium hydrogencarbonate solution (84 ml) at room temperature, and the mixture was stirred for 10 min. The aqueous layer was removed from the reaction mixture, to the organic layer was added distilled water (168 ml), and the mixture was stirred for 10 min. The aqueous layer was removed from the reaction mixture, and a solution of triphenylphosphine (69.0 g) in 1,2-dimethoxyethane (220 ml) was added dropwise thereto over 30 min under water cooling. The mixture was stirred for 2 hr, the internal temperature was raised to 61° C. (bath temperature: 70° C.), and the mixture was stirred for 1 hr. To the reaction mixture was added dropwise conc. hydrochloric acid (18.6 ml) under ice cooling. The reaction mixture was stirred at room temperature for about 1 hr. The precipitated solid was collected by filtration, washed with 1,2-dimethoxyethane, and dried under reduced pressure to give the title compound (77.6 g, yield 85%). The title compound was used in the next step without purification.

(2) N-(4-chloro-3-{4-methoxy-6-[6-((R)-1-methylbutoxy)pyridin-3-yl]-1,3,5-triazin-2-yl}benzyl)-2-ethyl-2-methoxybutanamide

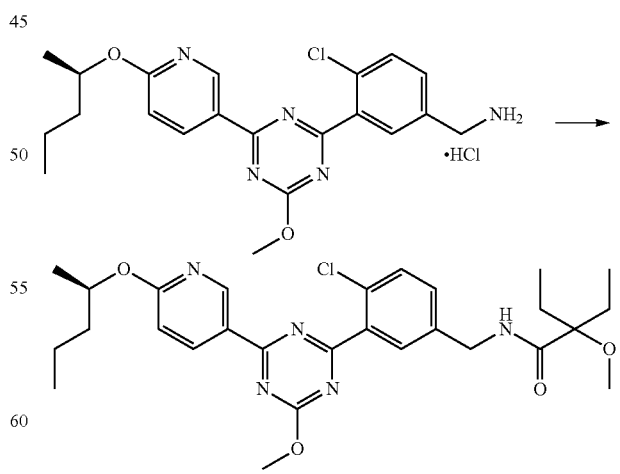

To a suspension of N-(4-chloro-3-{4-methoxy-6-[6-((R)-1-methylbutoxy)pyridin-3-yl]-1,3,5-triazin-2-yl}benzyl) amine hydrochloride (obtained in the above-mentioned (1), 3.5 g) in N,N-dimethylformamide (21 ml) were added 2-ethyl-2-methoxybutyric acid (1.32 g), diisopropylethylamine (1.62 ml), HOBt H₂O (0.60 g) and WSC HCl (1.78 g) at room temperature under argon atmosphere, and the mixture was stirred for 16 hr. To the reaction mixture were added distilled water (7.0 ml) and a mixed solvent (35 ml) of ethyl acetate/n-hexane=1/1 under ice cooling, and the mixture was separated. The obtained aqueous layer was extracted with a mixed solvent (10 ml) of ethyl acetate/n-hexane=1/1. The organic layers were combined, and washed successively with distilled water (twice), saturated aqueous sodium bicarbonate solution (once) and saturated brine (once). The organic layer was dried over sodium sulfate, filtered to remove the sodium sulfate, and concentrated under reduced pressure. The residue was purified by silica gel chromatography (eluent: n-hexane/ethyl acetate) to give the title compound (4.1 g, yield 97%).

¹H-NMR (CDCl₃) δ: 0.77 (6H, t, J=7.4 Hz), 0.94 (3H, t, J=7.4 Hz), 1.35 (3H, d, J=6.2 Hz), 1.39-1.50 (2H, m), 1.57-1.90 (6H, m), 3.19 (3H, s), 4.18 (3H, s), 4.52 (2H, d, J=6.0 Hz), 5.32-5.40 (1H, m), 6.77 (1H, d, J=8.8 Hz), 7.28 (1H, m), 7.40 (1H, dd, J=8.2, 2.2 Hz), 7.50 (1H, d, J=8.2 Hz), 7.96 (1H, d, J=2.2 Hz), 8.65 (1H, dd, J=8.8, 2.5 Hz), 9.38 (1H, m).

(3) 2-ethyl-N-(4-chloro-3-{4-hydroxy-6-[6-((R)-1-methylbutoxy)pyridin-3-yl]-1,3,5-triazin-2-yl}benzyl)-2-methoxybutanamide

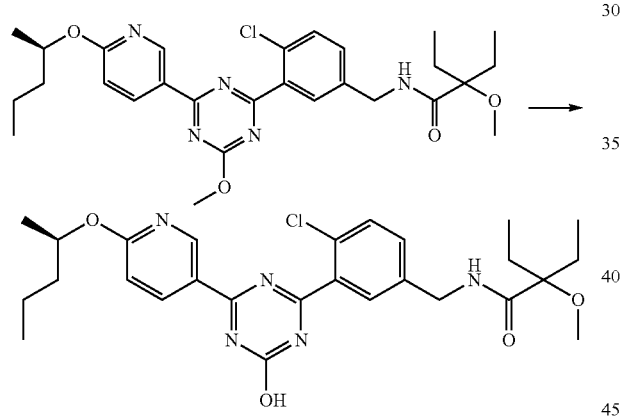

To a solution of N-(4-chloro-3-{4-methoxy-6-[6-((R)-1-methylbutoxy)pyridin-3-yl]-1,3,5-triazin-2-yl}benzyl)-2-ethyl-2-methoxybutanamide (obtained in the above-mentioned (2), 4.1 g) in a mixed solvent of methanol (16 ml) and THF (8 ml) was added 4M aqueous sodium hydroxide solution (7.77 ml) at room temperature under argon atmosphere, and the mixture was stirred for 19 hr. To the reaction mixture were added 2N hydrochloric acid (15.5 ml) and ethyl acetate (20 ml) under ice cooling, and the mixture was stirred. The mixture was separated, and the aqueous layer was extracted with ethyl acetate (16 ml). The organic layers were combined, and washed successively with distilled water (twice) and saturated brine (once). The organic layer was dried over sodium sulfate, filtered to remove the sodium sulfate, and concentrated under reduced pressure to give the title compound (4.06 g, 99%). A solution of the title compound (3.4 g) in ethyl acetate (6.8 ml) was stirred at 80° C., and n-heptane (32 ml) was added thereto. The suspension was stirred at 80° C. for 3 hr, and then at room temperature for 4 hr. The obtained solid was collected by filtration, and dried to give a crystal (3.2 g) of the title compound.

¹H-NMR (DMSO-d₆) δ: 0.66 (6H, t, J=7.4 Hz), 0.89 (3H, t, J=7.3 Hz), 1.29 (3H, d, J=6.2 Hz), 1.33-1.45 (2H, m), 1.54-1.75 (6H, m), 3.14 (3H, s), 4.34 (2H, d, J=6.4 Hz), 5.27-5.35 (1H, m), 6.91 (1H, d, J=8.8 Hz), 7.45-7.53 (1H, m), 7.56-7.76 (2H, m), 8.36 (1H, t, J=6.4 Hz), 8.48 (1H, dd, J=8.8, 2.3 Hz), 9.08 (1H, d, J=2.3 Hz), 13.28 (1H, br s).

A suspension of the title compound (1.0 g) in distilled water (20 ml) and acetonitrile (2.0 ml) was stirred at room temperature for 18 hr. To the suspension was added a mixed solvent (10 ml) of distilled water/acetonitrile (10/1), and the mixture was stirred at room temperature for 5 days. The obtained solid was collected by filtration and dried at room temperature to give a crystal (1.0 g) of monohydrate of the title compound. The obtained crystal was deduced to be a monohydrate from the following measurements. The crystal, which deems to have a crystalline form identical to the crystal obtained above from powder X-ray diffraction spectrum, showed a rapid decrease of about 3.2% in weight under increase in temperature from room temperature to 50° C. by thermo gravimetric-differential thermal analysis (TG/DTA) measurement, and showed a rapid decrease of about 3.3% in weight under decrease in 5 relative humidity from 20% to 5% by moisture adsorption-desorption measurement at 25° C. These results supported that the measured crystal was a monohydrate.

[Production Example 9]: Synthesis of 1-trifluoromethylcyclohexanecarboxylic acid 4-chloro-3-[4-hydroxy-6-(3-isopropylphenyl)-1,3,5-triazin-2-yl]benzylamide (Example No. 71)

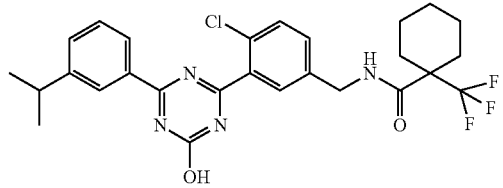 [SMILES: CC(C)c1cccc(-c2nc(O)nc(-c3cc(CNC(=O)C4(C(F)(F)F)CCCCC4)ccc3Cl)n2)c1]

(1) 1-trifluoromethylcyclohexanecarboxylic acid 4-chloro-3-[4-(3-isopropylphenyl)-6-methoxy-1,3,5-triazin-2-yl]benzylamide

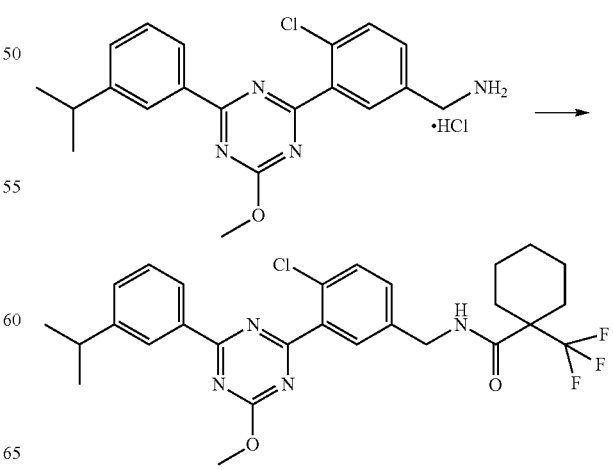

To a suspension of 4-chloro-3-[4-(3-isopropylphenyl)-6-methoxy-1,3,5-triazin-2-yl]benzylamine hydrochloride (obtained in (3) of Production Example 4, 6.00 g) in N,N-dimethylformamide (60 ml) were added 1-(trifluoromethyl)cyclohexane-1-carboxylic acid (4.35 g), triethylamine (6.19 ml), HOBt H$_2$O (3.40 g) and WSC HCl (4.25 g) at room temperature under argon atmosphere, and the mixture was stirred for 15 hr. To the reaction mixture were added saturated aqueous sodium bicarbonate solution (60 ml) and ethyl acetate (100 ml) under ice cooling, and the mixture was separated. The obtained organic layer was washed with saturated brine (three times). The organic layer was dried over sodium sulfate, filtered to remove the sodium sulfate, and concentrated under reduced pressure. The residue was purified by silica gel chromatography (eluent: n-hexane/ethyl acetate) to give the title compound (7.65 g, yield 94%).

$^1$H-NMR (CDCl$_3$) δ: 1.14-1.27 (1H, m), 1.32 (6H, d, J=6.9 Hz), 1.34-1.47 (2H, m), 1.57-1.77 (5H, m), 2.19-2.27 (2H, m), 2.98-3.09 (1H, m), 4.21 (3H, s), 4.60 (2H, d, J=5.8 Hz), 6.19-6.27 (1H, m), 7.37 (1H, dd, J=8.3, 2.3 Hz), 7.42-7.49 (2H, m), 7.53 (1H, d, J=8.3 Hz), 7.95 (1H, d, J=2.3 Hz), 8.40-8.43 (1H, m), 8.45-8.47 (1H, m).

(2) 1-trifluoromethylcyclohexanecarboxylic acid 4-chloro-3-[4-hydroxy-6-(3-isopropylphenyl)-1,3,5-triazin-2-yl]benzylamide

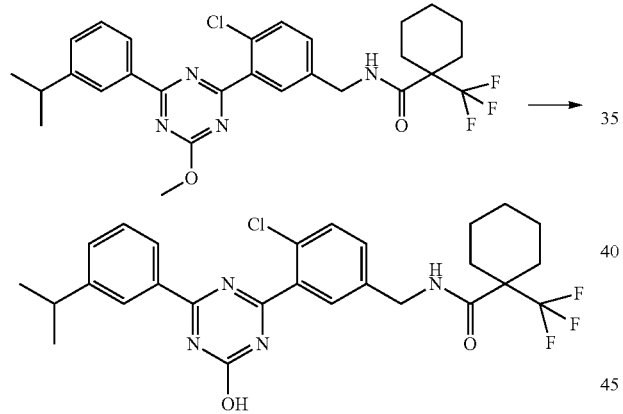

To a solution of 1-trifluoromethylcyclohexanecarboxylic acid 4-chloro-3-[4-(3-isopropylphenyl)-6-methoxy-1,3,5-triazin-2-yl]benzylamide (obtained in the above-mentioned (1), 7.55 g) in methanol (69 ml) was added 4M aqueous sodium hydroxide solution (13.8 ml) at room temperature under argon atmosphere, and the mixture was stirred at 64° C. for 2 hr. To the reaction mixture were added 2N hydrochloric acid (27.6 ml) and water (100 ml) at room temperature, and the mixture was stirred for 3 hr. The precipitated solid was collected by filtration, washed with water, and dried under reduced pressure to give the title compound (7.05 g, yield 95%). To a suspension of the title compound (1.0 g) in acetone (2.0 ml) was added n-hexane (8.0 ml) at room temperature, and the mixture was stirred at 60° C. for 20 hr. The obtained solid was collected by filtration, and dried to give a crystal (0.813 g) of the title compound.

$^1$H-NMR (DMSO-d$_6$) δ: 1.08-1.26 (3H, m), 1.25 (6H, d, J=8.0 Hz), 1.41-1.64 (5H, m), 2.35 (2H, d, J=12.5 Hz), 2.96-3.03 (1H, m), 4.42 (2H, d, J=5.9 Hz), 7.42-7.51 (2H, m), 7.56 (1H, d, J=7.7 Hz), 7.62 (1H, d, J=8.5 Hz), 7.67 (1H, br s), 8.15 (1H, d, J=7.7 Hz), 8.22 (1H, br s), 8.78 (1H, t, J=5.9 Hz).

[Production Example 10]: Synthesis of 1-trifluoromethylcyclohexanecarboxylic acid 3-[4-(3-tert-butylphenyl)-6-hydroxy-1,3,5-triazin-2-yl]-4-chlorobenzylamide (Example No. 107)

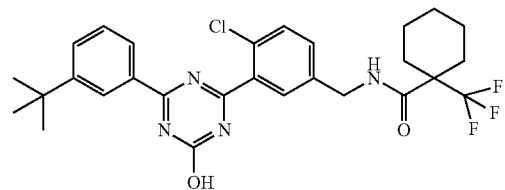 [SMILES: CC(C)(C)c1cccc(-c2nc(O)nc(-c3cc(CNC(=O)C4(C(F)(F)F)CCCCC4)ccc3Cl)n2)c1]

(1) 3-[4-(3-tert-butylphenyl)-6-methoxy-1,3,5-triazin-2-yl]-4-chlorobenzylamine hydrochloride

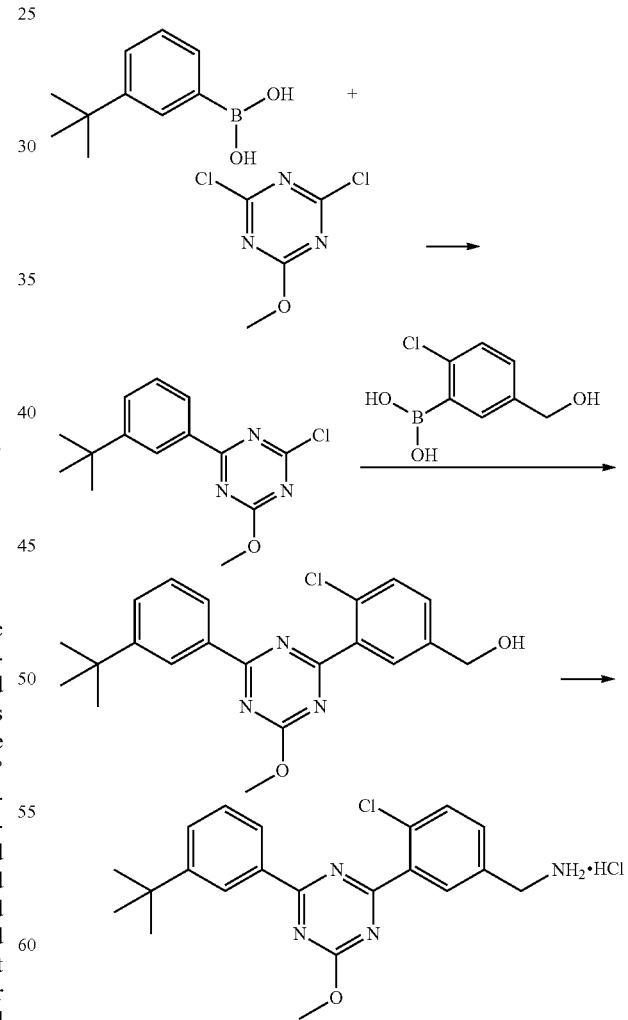

A suspension of 3-tert-butylphenylboronic acid (6.6 g), 2,4-dichloro-6-methoxy-1,3,5-triazine (10.0 g), tetrakis(triphenylphosphine)palladium (0) (0.86 g) and sodium carbonate (11.8 g) in toluene (66 ml) and distilled water (66 ml) was stirred at 80° C. for 4 hr under argon atmosphere. To the reaction mixture were added a mixed solvent of n-hexane: ethyl acetate=1:1 and water at room temperature, and the mixture was separated. The organic layer was washed with saturated brine, dried over sodium sulfate, and filtered to remove the sodium sulfate. The filtrate was concentrated under reduced pressure, and acetonitrile (70 ml) and distilled water (30 ml) were added thereto. To the suspension were added 2-chloro-5-hydroxymethylphenylboronic acid (8.3 g), [1,1'-bis(diphenylphosphino)ferrocene]palladium(II) dichloride dichloromethane adduct (0.91 g) and tripotassium phosphate (15.7 g), and the mixture was stirred at 80° C. for 3 hr. To the reaction mixture were added saturated brine and a mixed solvent of n-hexane:ethyl acetate=1:1 at room temperature, and the mixture was separated. The organic layer was washed with saturated brine, dried over sodium sulfate, filtered to remove the sodium sulfate, and concentrated under reduced pressure. The residue was purified by silica gel chromatography (eluent: n-hexane/ethyl acetate), and the fraction was concentrated under reduced pressure. To the obtained residue was added toluene (57 ml) under argon atmosphere. To the solution were added diphenylphosphorylazide (8.0 ml) and 1,8-diazabicyclo[5.4.0]-7-undecene (5.5 ml) under ice cooling. The reaction mixture was stirred at room temperature for 18 hr. To the reaction mixture were added saturated aqueous sodium bicarbonate solution (15 ml) and distilled water (15 ml) at room temperature, and the mixture was stirred for 1 min. The aqueous layer was removed from the reaction mixture, distilled water (30 ml) was added thereto, and the mixture was stirred for 1 min. The aqueous layer was removed from the reaction mixture, and distilled water (30 ml) was added thereto. The reaction mixture was stirred for 1 min, and the aqueous layer was removed. To the reaction mixture was added triphenylphosphine (10.7 g) under ice cooling, and the mixture was stirred for 5 min. The reaction mixture was stirred at room temperature for 30 min, and distilled water (2.8 ml) was added thereto. The reaction mixture was stirred for 30 min, and then at 60° C. for 1 hr. To the reaction mixture were added acetonitrile (57 ml) and conc. hydrochloric acid (3.3 ml) at room temperature, and the mixture was stirred for 1 hr. The solid was collected by filtration from the suspension, and dried under reduced pressure to give the title compound (11.3 g, yield 73% (3 steps)). The title compound was used in the next step without purification.

(2) 1-trifluoromethylcyclohexanecarboxylic acid 3-[4-(3-tert-butylphenyl)-6-methoxy-1,3,5-triazin-2-yl]-4-chlorobenzylamide

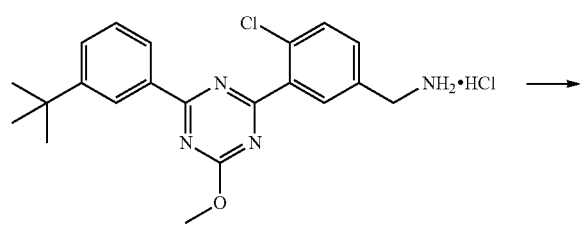

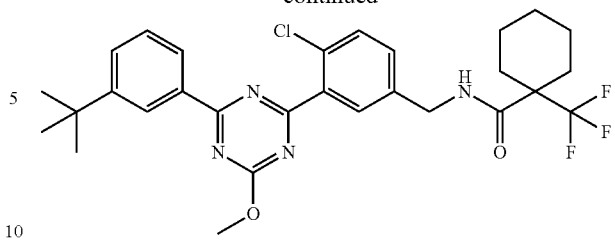

To a solution of 3-[4-(3-tert-butylphenyl)-6-methoxy-1,3,5-triazin-2-yl]-4-chlorobenzylamine hydrochloride (obtained in the above-mentioned (1), 5.0 g), 1-(trifluoromethyl)cyclohexanecarboxylic acid (3.50 g), HOBt H$_2$O (2.74 g) and WSC HCl (3.43 g) in N,N-dimethylformamide (50 ml) was added triethylamine (4.99 ml) at room temperature under argon atmosphere, and the mixture was stirred for 18 hr. To the reaction mixture were added saturated aqueous sodium bicarbonate solution (50 ml) and ethyl acetate (80 ml), the mixture was separated, and the organic layer was washed with saturated brine. The organic layer was dried over sodium sulfate, filtered to remove the sodium sulfate, and concentrated under reduced pressure. The residue was purified by silica gel chromatography (eluent: n-hexane/ethyl acetate) to give the title compound (6.31 g, yield 94%).

$^1$H-NMR (CDCl$_3$) δ: 1.14-1.26 (1H, m), 1.34-1.47 (2H, m), 1.40 (9H, s), 1.55-1.76 (5H, m), 2.19-2.26 (2H, m), 4.21 (3H, s), 4.60 (2H, d, J=5.8 Hz), 6.17-6.27 (1H, m), 7.37 (1H, dd, J=8.3, 2.3 Hz), 7.45 (1H, t, J=7.7 Hz), 7.53 (1H, d, J=8.3 Hz), 7.62-7.65 (1H, m), 7.97 (1H, d, J=2.3 Hz), 8.39-8.43 (1H, m), 8.66 (1H, t, J=1.8 Hz).

(3) 1-trifluoromethylcyclohexanecarboxylic acid 3-[4-(3-tert-butylphenyl)-6-hydroxy-1,3,5-triazin-2-yl]-4-chlorobenzylamide

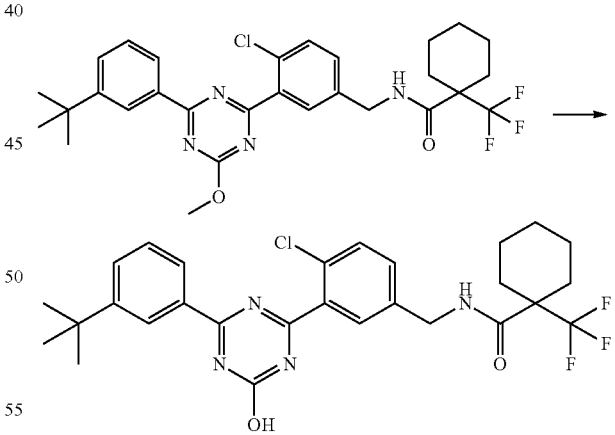

To a solution of 1-trifluoromethylcyclohexanecarboxylic acid 3-[4-(3-tert-butylphenyl)-6-methoxy-1,3,5-triazin-2-yl]-4-chlorobenzylamide (obtained in the above-mentioned (2), 6.21 g) in methanol (55 ml) was added 4M aqueous sodium hydroxide solution (11.1 ml) at room temperature under argon atmosphere, and the mixture was stirred at 64° C. for 2 hr. To the reaction mixture were added dropwise 2N hydrochloric acid (22.1 ml) and water (80 ml) under ice cooling, and the mixture was stirred at room temperature for 3 hr. The precipitated solid was collected by filtration, washed with water, and dried under reduced pressure to give the title compound (5.84 g, yield 96%). To a solution of the title compound (1.0 g) in ethanol (4.0 ml) was slowly added n-hexane (40 ml) at room temperature. The obtained solid was collected by filtration, and dried to give a crystal (0.78 g) of the title compound.

¹H-NMR (DMSO-d₆) δ: 1.11-1.63 (8H, m), 1.34 (9H, s), 2.35 (2H, d, J=13.7 Hz), 4.42 (2H, d, J=6.0 Hz), 7.42-7.50 (2H, m), 7.60 (1H, d, J=8.5 Hz), 7.66-7.72 (2H, m), 8.15 (1H, d, J=8.1 Hz), 8.38 (1H, br s), 8.78 (1H, t, J=5.8 Hz), 13.36 (1H, br s).

[Production Example 11]: Synthesis of (R)—N-{3-[4-(3-tert-butylphenyl)-6-hydroxy-1,3,5-triazin-2-yl]-4-chlorobenzyl}-3,3,3-trifluoro-2-methoxy-2-methylpropionamide (Example No. 66)

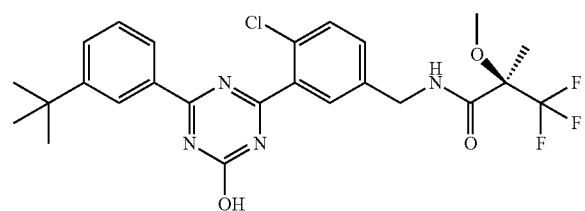 [SMILES: CO[C@](C)(C(=O)NCc1ccc(Cl)c(-c2nc(O)nc(-c3cccc(C(C)(C)C)c3)n2)c1)C(F)(F)F]

(1) benzyl (R)-3,3,3-trifluoro-2-hydroxy-2-methylpropionate

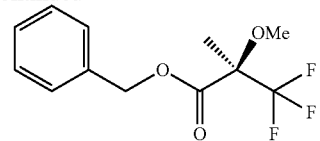

To a suspension of (R)-3,3,3-trifluoro-2-hydroxy-2-methylpropionic acid (2.2 g, 14 mmol) and potassium carbonate (2.3 g, 16 mmol) in N,N-dimethylformamide (30 ml) was added benzyl bromide (1.8 ml, 15 mmol) at room temperature under argon atmosphere, and the mixture was stirred for 4 hr. To the is reaction mixture were added water and ethyl acetate, the mixture was separated, and the organic layer was washed with saturated brine. The organic layer was dried over sodium sulfate, filtered to remove the sodium sulfate, and concentrated under reduced pressure. The residue was purified by silica gel column chromatography (eluent: n-hexane/ethyl acetate=6/1) to give the title compound (3.0 g, yield 90%).

¹H-NMR (CDCl₃) δ: 1.60 (3H, s), 3.78 (1H, s), 5.31 (2H, s), 7.33-7.42 (5H, m).

(2) benzyl (R)-3,3,3-trifluoro-2-methoxy-2-methylpropionate

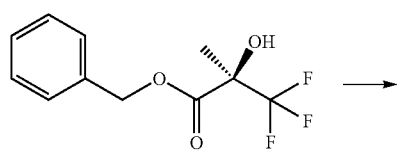

To a solution of benzyl (R)-3,3,3-trifluoro-2-hydroxy-2-methylpropionate (obtained in the above-mentioned (1), 3.4 g, 14 mmol) in N,N-dimethylformamide (40 ml) was added sodium hydride (0.60 g, 60 wt % oil dispersion) under ice cooling under argon atmosphere, and the mixture was stirred for 1 hr. To the reaction mixture was added methyl iodide (1.3 ml, 20 mmol), and the mixture was stirred at room temperature for 2 hr. To the reaction mixture were added saturated aqueous ammonium chloride solution and ethyl acetate, the mixture was separated, and the organic layer was washed with saturated brine. The organic layer was dried over sodium sulfate, filtered to remove the sodium sulfate, and concentrated under reduced pressure. The residue was purified by silica gel column chromatography (eluent: n-hexane/ethyl acetate=15/1) to give the title compound (2.8 g, yield 78%).

¹H-NMR (CDCl₃) δ: 1.59 (3H, s), 3.40 (3H, s), 5.26 (2H, s), 7.31-7.37 (5H, m).

(3) (R)-3,3,3-trifluoro-2-methoxy-2-methylpropionic acid

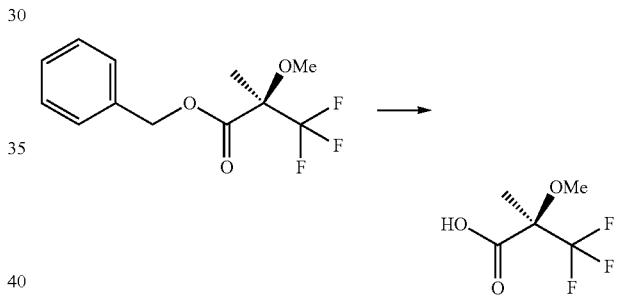

To a solution of benzyl (R)-3,3,3-trifluoro-2-methoxy-2-methylpropionate (obtained in the above-mentioned (2), 2.8 g, 11 mmol) in ethyl acetate (50 ml) was added 10 wt % palladium on carbon (0.23 g) at room temperature under argon atmosphere, and the mixture was stirred for 5 hr under hydrogen atmosphere (1 atm). The reaction mixture was filtered through Celite with ethyl acetate under nitrogen atmosphere. The filtrate was concentrated under reduced pressure to give the title compound (1.4 g, yield 78%).

¹H-NMR (CDCl₃) δ: 1.68 (3H, s), 3.54 (3H, s).

(4) (R)—N-{3-[4-(3-tert-butylphenyl)-6-methoxy-1,3,5-triazin-2-yl]-4-chlorobenzyl}-3,3,3-trifluoro-2-methoxy-2-methylpropionamide

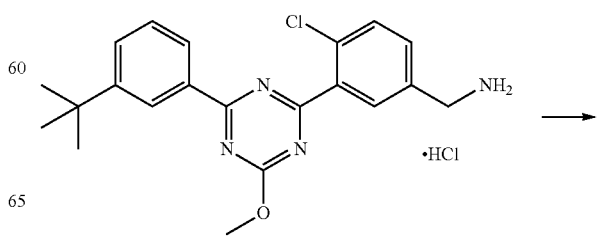

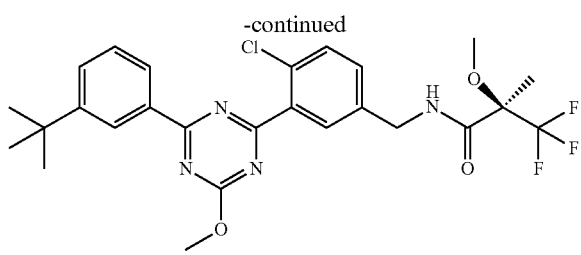

To a solution of 3-[4-(3-tert-butylphenyl)-6-methoxy-1,3,5-triazin-2-yl]-4-chlorobenzylamine hydrochloride (obtained in (1) of Production Example 10, 5.2 g), (R)-3,3,3-trifluoro-2-methoxy-2-methylpropionic acid (obtained in the above-mentioned (3), 3.2 g), HOBt H$_2$O (2.85 g) and WSC HCl (3.56 g) in N,N-dimethylformamide (52 ml) was added triethylamine (5.18 ml) at room temperature under argon atmosphere, and the mixture was stirred for 16 hr. To the reaction mixture were added saturated aqueous sodium bicarbonate solution (50 ml) and ethyl acetate (80 ml), and the mixture was separated. The organic layer was washed with saturated brine, dried over sodium sulfate, filtered to remove the sodium sulfate, and concentrated under reduced pressure. The residue was purified by silica gel chromatography (eluent: n-hexane/ethyl acetate) to give the title compound (6.55 g, yield 98%).

$^1$H-NMR (CDCl$_3$) δ: 1.40 (9H, s), 1.65-1.67 (3H, m), 3.44-3.45 (3H, m), 4.21 (3H, s), 4.47-4.63 (2H, m), 7.10-7.19 (1H, m), 7.37 (1H, dd, J=8.3, 2.3 Hz), 7.45 (1H, t, J=7.7 Hz), 7.53 (1H, d, J=8.3 Hz), 7.62-7.65 (1H, m), 7.96 (1H, d, J=2.3 Hz), 8.39-8.43 (1H, m), 8.66 (1H, t, J=1.8 Hz).

(5) (R)—N-{3-[4-(3-tert-butylphenyl)-6-hydroxy-1,3,5-triazin-2-yl]-4-chlorobenzyl}-3,3,3-trifluoro-2-methoxy-2-methylpropionamide

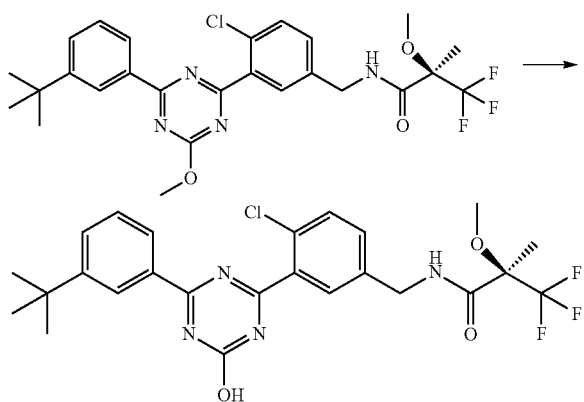

To a solution of (R)—N-{3-[4-(3-tert-butylphenyl)-6-methoxy-1,3,5-triazin-2-yl]-4-chlorobenzyl}-3,3,3-trifluoro-2-methoxy-2-methylpropionamide (obtained in the above-mentioned (4), 6.29 g) in methanol (58 ml) was added 4M aqueous sodium hydroxide solution (11.7 ml) at room temperature under argon atmosphere, and the mixture was stirred at 64° C. for 3 hr. To the reaction mixture were added dropwise 2N hydrochloric acid (23.4 ml) and water (80 ml) under ice cooling, and the mixture was stirred. To the reaction mixture were added ethyl acetate (200 ml) and saturated brine, and the mixture was separated. The organic layer was washed with saturated brine, dried over sodium sulfate, filtered to remove the sodium sulfate, and concentrated under reduced pressure. The residue was purified by silica gel chromatography (eluent: n-hexane/ethyl acetate) to give the title compound (ca. 6.4 g). To a solution of the title compound (6.15 g) in a mixed solvent of ethyl acetate (50 ml) and n-hexane (50 ml) was added dropwise n-hexane (100 ml) over 20 min at room temperature. The suspension was stirred at room temperature for 1.5 hr, and n-hexane (100 ml) was added dropwise thereto over 20 min. The suspension was stirred at room temperature for 16 hr. The obtained solid was collected by filtration, and dried to give a crystal (5.51 g, yield 90%) of the title compound.

$^1$H-NMR (DMSO-d$_6$) δ: 1.34 (9H, s), 1.54 (3H, s), 3.36 (3H, s), 4.33-4.45 (2H, m), 7.46 (1H, d, J=8.3 Hz), 7.50 (1H, t, J=7.9 Hz), 7.61 (1H, d, J=8.3 Hz), 7.67-7.72 (1H, m), 7.72 (1H, d, J=7.9 Hz), 8.16 (1H, d, J=7.9 Hz), 8.38 (1H, s), 9.02 (1H, t, J=6.2 Hz), 13.34 (1H, br s).

[Production Example 12]: Synthesis of N-{4-chloro-3-[4-(6-hexyloxypyridin-3-yl)-6-hydroxy-1,3,5-triazin-2-yl]benzyl}-2-methoxy-2-methylpropionamide (Example No. 81)

(1) 5-bromo-2-hexyloxypyridine

To a solution of 5-bromo-2-chloropyridine (15 g) and n-hexanol (11.7 ml) in N,N-dimethylformamide (60 ml) was added potassium tert-butoxide (13.1 g) under ice cooling under argon atmosphere, and the mixture was stirred for 30 min. The reaction mixture was stirred at room temperature for 1.5 hr. To the reaction mixture were added saturated aqueous ammonium chloride solution and ethyl acetate, and the mixture was separated. The aqueous layer was extracted with a mixed solvent of n-hexane:ethyl acetate=1:1. The organic layers were combined, and washed with water and saturated brine. The organic layer was dried over sodium sulfate, filtered to remove the sodium sulfate, and concentrated under reduced pressure. The residue was purified by silica gel chromatography (eluent: n-hexane/ethyl acetate) to give the title compound (18.8 g, 94%).

$^1$H-NMR (CDCl$_3$) δ: 0.88-0.92 (3H, m), 1.29-1.37 (4H, m), 1.39-1.47 (2H, m), 1.71-1.79 (2H, m), 4.24 (2H, t, J=6.7 Hz), 6.64 (1H, dd, J=8.7, 0.6 Hz), 7.62 (1H, dd, J=8.7, 2.6 Hz), 8.17 (1H, dd, J=2.6, 0.6 Hz).

(2) [6-(hexyloxy)pyridin-3-yl]boronic acid

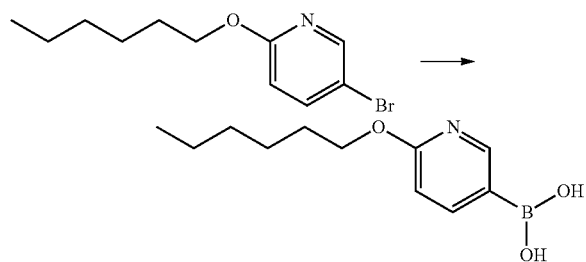

To a solution of 5-bromo-2-hexyloxypyridine (obtained in the above-mentioned (1), 18.8 g) in a mixed solvent of toluene (124 ml) tetrahydrofuran (30 ml) and triisopropyl borate (21.7 ml) was added dropwise n-butyllithium (1.55 M n-hexane solution, 61.2 ml) at −73° C. under argon atmosphere. The reaction mixture was stirred for 10 min, allowed to warm to room temperature, and stirred for 1.5 hr. To the reaction mixture was added dropwise 17% aqueous citric acid solution (168 g) under ice cooling. The reaction mixture was stirred at room temperature for 30 min. To the reaction mixture was added n-hexane (124 ml), and the mixture was separated. The organic layer was washed with water (30 ml, twice). The aqueous layers were combined, 4N aqueous sodium hydroxide solution (73 ml) was added thereto, and the mixture was stirred (pH #7). The obtained solid was collected by filtration, washed with water, and dried under reduced pressure to give a mixture (18.1 g) containing the title compound.

$^1$H-NMR (DMSO-$d_6$) δ: 0.87 (3H, t, J=6.7 Hz), 1.25-1.33 (4H, m), 1.35-1.45 (2H, m), 1.65-1.73 (2H, m), 4.25 (2H, t, J=6.7 Hz), 6.73 (1H, d, J=8.2 Hz), 7.98 (1H, dd, J=8.2, 1.8 Hz), 8.08 (2H, s), 8.49 (1H, br).

(3) 2-chloro-4-(6-hexyloxypyridin-3-yl)-6-methoxy-1,3,5-triazine

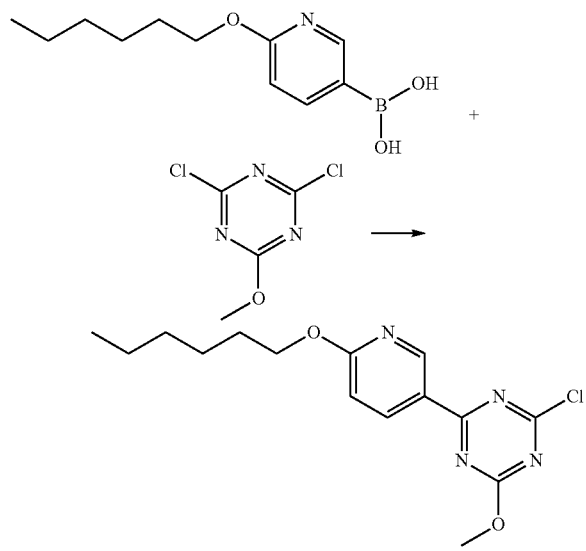

To a suspension of the mixture (obtained in the above-mentioned (2), 9.07 g) containing [6-(hexyloxy)pyridin-3-yl]boronic acid, 2,4-dichloro-6-methoxy-1,3,5-triazine (13.1 g), [1,1'-bis(diphenylphosphino)ferrocene]palladium (II) dichloride dichloromethane adduct (0.745 g) and potassium phosphate (23.2 g) in 1,2-dimethoxyethane (131 ml) was added distilled water (65.6 ml) at room temperature under argon atmosphere. The mixture was stirred at 90° C. for 2 hr. The reaction mixture was separated at room temperature, and the aqueous layer was extracted with ethyl acetate. The organic layers were combined, and washed with saturated brine. The organic layer was dried over sodium sulfate, filtered to remove the sodium sulfate, and concentrated under reduced pressure. The residue was purified by silica gel chromatography (eluent: n-hexane/ethyl acetate) to give the title compound (8.37 g, 71%).

$^1$H-NMR (CDCl$_3$) δ: 0.91 (3H, t, J=7.2 Hz), 1.30-1.39 (4H, m), 1.43-1.51 (2H, m), 1.76-1.83 (2H, m), 4.15 (3H, s), 4.40 (2H, t, J=6.7 Hz), 6.81 (1H, dd, J=8.8, 0.7 Hz), 8.56 (1H, dd, J=8.8, 2.4 Hz), 9.28 (1H, dd, J=2.4, 0.7 Hz).

(4) {4-chloro-3-[4-(6-hexyloxypyridin-3-yl)-6-methoxy-1,3,5-15 triazin-2-yl]phenyl}methanol

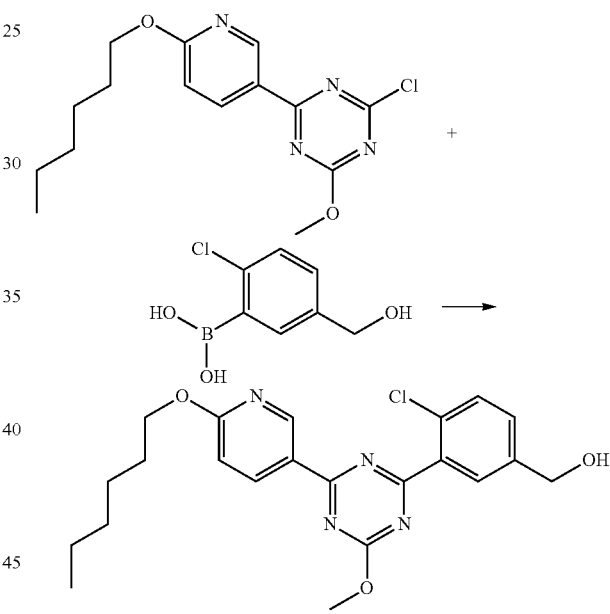

A suspension of 2-chloro-4-(6-hexyloxypyridin-3-yl)-6-methoxy-1,3,5-triazine (obtained in the above-mentioned (3), 8.37 g), 2-chloro-5-hydroxymethylphenylboronic acid (5.79 g), [1,1'-bis(diphenylphosphino)ferrocene]palladium (II) dichloride dichloromethane adduct (0.529 g) and tripotassium phosphate (8.25 g) in acetonitrile (59 ml) and distilled water (25 ml) was stirred at 90° C. for 1.5 hr under argon atmosphere. The reaction mixture was separated at room temperature. The obtained aqueous layer was extracted with ethyl acetate. The organic layers were combined, and washed with saturated brine. The organic layer was dried over sodium sulfate, filtered to remove the sodium sulfate, and concentrated under reduced pressure. The residue was purified by silica gel chromatography (eluent: n-hexane/ethyl acetate), and the fraction was concentrated under reduced pressure. To the residue was added a mixed solvent of n-hexane:ethyl acetate=1:1 (20 ml) at room temperature, and the mixture was stirred for 1 hr. To the suspension was added n-hexane (80 ml) at room temperature, and the mixture was stirred for 30 min. The obtained solid was collected by filtration, and dried to give the title compound (7.26 g, yield 65%).

$^1$H-NMR (CDCl$_3$) δ: 0.89-0.93 (3H, m), 1.31-1.40 (4H, m), 1.43-1.52 (2H, m), 1.77-1.84 (3H, m), 4.19 (3H, s), 4.40 (2H, t, J=6.7 Hz), 4.77 (2H, d, J=5.4 Hz), 6.83 (1H, dd, J=8.7, 0.6 Hz), 7.47 (1H, dd, J=8.2, 2.2 Hz), 7.54 (1H, d, J=8.2 Hz), 8.03 (1H, d, J=2.2 Hz), 8.67 (1H, dd, J=8.7, 2.3 Hz), 9.40 (1H, dd, J=2.3, 0.6 Hz).

(5) N-{4-chloro-3-[4-(6-hexyloxypyridin-3-yl)-6-methoxy-1,3,5-triazin-2-yl]benzyl}-2-methoxy-2-methylpropionamide

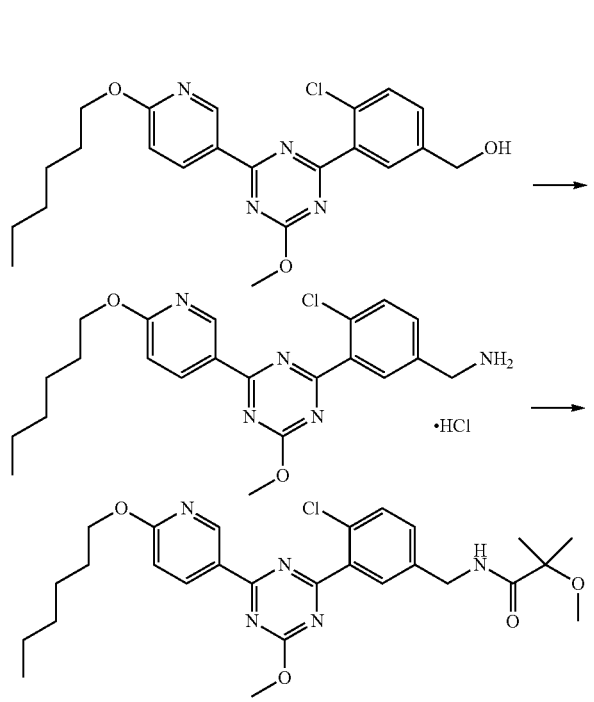

To a solution of {4-chloro-3-[4-(6-hexyloxypyridin-3-yl)-6-methoxy-1,3,5-triazin-2-yl]phenyl}methanol (obtained in the above-mentioned (4), 7.16 g) in toluene (36 ml) and THF (7 ml) were added diphenylphosphorylazide (4.32 ml) and 1,8-diazabicyclo[5.4.0]-7-undecene (3.0 ml) under ice cooling under argon atmosphere. The reaction mixture was stirred for 30 min, and then at room temperature for 14 hr. The reaction mixture was stirred at 60° C. for 1 hr. To the reaction mixture were added triphenylphosphine (5.69 g) and water (1.43 ml) at room temperature, and the mixture was stirred for 5 min. The reaction mixture was stirred at 60° C. for 3 hr, and concentrated under reduced pressure at room temperature. To the residue was added toluene, and the mixture was again concentrated under reduced pressure. To a solution of the residue in N,N-dimethylformamide (21 ml) were added 2-methoxy-2-methylpropionic acid (2.17 g), HOBt H$_2$O (3.07 g) and WSC HCl (4.80 g) at room temperature, and the mixture was stirred for 18 hr. To the reaction mixture were added water and ethyl acetate, the mixture was separated, and the organic layer was washed with water and saturated brine. The organic layer was dried over sodium sulfate, filtered to remove the sodium sulfate, and concentrated under reduced pressure. The residue was purified by silica gel chromatography (eluent: n-hexane/ethyl acetate) to give the title compound (8.28 g, yield 94%).

$^1$H-NMR (CDCl$_3$) δ: 0.91 (3H, t, J=6.9 Hz), 1.32-1.38 (4H, m), 1.41 (6H, s), 1.43-1.51 (2H, m), 1.77-1.84 (2H, m), 3.27 (3H, s), 4.19 (3H, s), 4.40 (2H, t, J=6.7 Hz), 4.50 (2H, d, J=6.0 Hz), 6.82 (1H, d, J=-8.8 Hz), 7.08-7.11 (1H, m), 7.37 (1H, dd, J=8.2, 2.0 Hz), 7.50 (1H, d, J=8.2 Hz), 7.95 (1H, d, J=2.0 Hz), 8.67 (1H, dd, J=8.8, 2.2 Hz), 9.39 (1H, d, J=2.2 Hz).

(6) N-{4-chloro-3-[4-(6-hexyloxypyridin-3-yl)-6-hydroxy-1,3,5-triazin-2-yl]benzyl}-2-methoxy-2-methylpropionamide

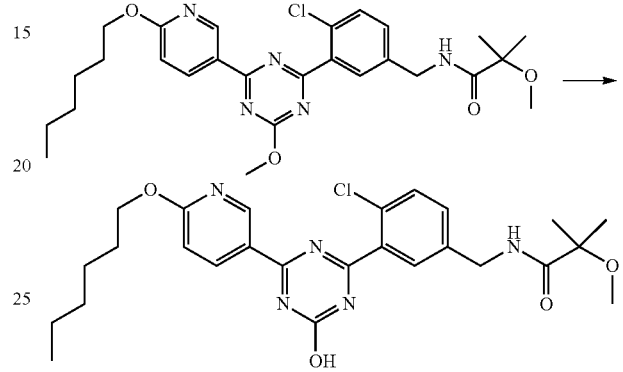

To a solution of N-{4-chloro-3-[4-(6-hexyloxypyridin-3-yl)-6-methoxy-1,3,5-triazin-2-yl]benzyl}-2-methoxy-2-methylpropionamide (obtained in the above-mentioned (5), 0.11 g) in methanol (1.0 ml) was added 4M aqueous sodium hydroxide solution (0.21 ml) at room temperature under argon atmosphere, and the mixture was stirred at 65° C. for 2 hr. To the reaction mixture were added 1N hydrochloric acid (0.84 ml) and water, at room temperature, and the mixture was stirred. The precipitated solid was collected by filtration, washed with water, and dried under reduced pressure to give the title compound (0.091 g, yield 84%).

$^1$H-NMR (DMSO-d$_6$) δ: 0.88 (3H, t, J=6.9 Hz), 1.27 (6H, s), 1.28-1.35 (4H, m), 1.37-1.48 (2H, m), 1.68-1.75 (2H, m), 3.15 (3H, s), 4.30 (4H, t, J=6.9 Hz), 6.81 (1H, d, J=8.4 Hz), 7.25 (1H, d, J=8.1 Hz), 7.40 (1H, d, J=8.1 Hz), 7.54 (1H, s), 8.39-8.45 (2H, m), 8.99 (1H, s).

[Production Example 13]: Synthesis of 5-bromo-2-((R)-1-methylbutoxy)pyridine

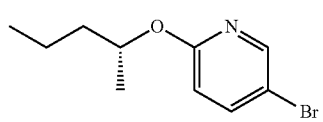

(1) (R)-1-methylbutyl n-octanoate

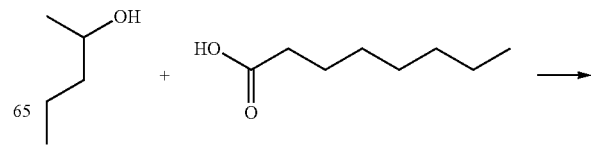

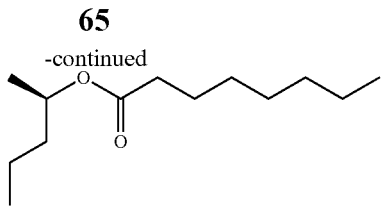

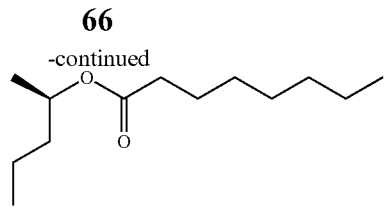

2-Pentanol (927 g), n-octanoic acid (910 g), molecular sieve 4 Å (464 g) and Novozyme 435 (9.27 g) were mixed, and the mixture was stirred at the internal temperature 41° C. (bath temperature: 45° C.) for 7.5 hr. To the reaction mixture was added Celite (232 g) at room temperature, and the mixture was stirred for 1 hr. The reaction mixture was filtered through Celite with toluene. The filtrate was concentrated under reduced pressure, to the obtained residue was added toluene (1000 mL), and the mixture was concentrated under reduced pressure. To the obtained residue was added toluene (1000 mL), and the mixture was concentrated under reduced pressure. To the obtained residue was added toluene (1000 mL), and the mixture was concentrated under reduced pressure to give a residue (1.15 kg) containing the title compound (795 g, yield 35%) and n-octanoic acid (309 g). This was directly used for the next reaction.

(2) (R)-pentan-2-ol

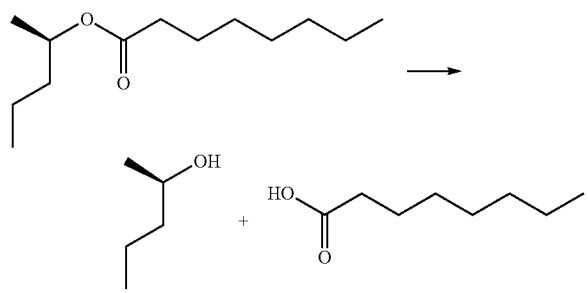

To the residue (obtained in the above-mentioned (1), 1.15 kg) containing (R)-1-methylbutyl n-octanoate (795 g) was added 4 M aqueous sodium hydroxide solution (2.39 L) at room temperature (the internal temperature was raised to 39° C.). The reaction mixture was stirred at the internal temperature 41° C. (bath temperature: 70° C.) for 1 hr, and then at internal temperature 75° C. (bath temperature: 95° C.) for 16.5 hr. conc. Hydrochloric acid (797 mL) was added dropwise thereto under ice cooling. Toluene (200 mL) was added thereto, the mixture was separated, and the aqueous layer was extracted with toluene (200 mL, once). The organic layer was washed with saturated brine (twice), and dried over sodium sulfate. The obtained solution was filtered through Celite, and the filtrate was concentrated under reduced pressure to give a residue (1.76 kg) containing the title compound (297 g, yield 91%) and n-octanoic acid (876 g). This was directly used for the next reaction.

(3) (R)-1-methylbutyl n-octanoate

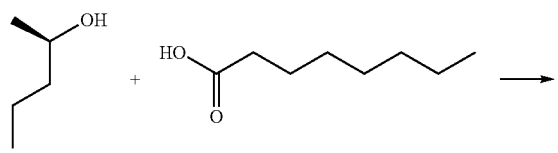

To the residue (obtained in the above-mentioned (2), 1.76 kg) containing (R)-pentan-2-ol (297 g) and n-octanoic acid (876 g) were added molecular sieve 4 Å (149 g) and Novozyme 435 (2.97 g), and the mixture was stirred at the internal temperature 40° C. (bath temperature: 45° C.) for 7 hr. Novozyme 435 (2.97 g) was added thereto, and the mixture was stirred for additional 2 hr. Celite (50 g) was added thereto, and the mixture was allowed to cool to room temperature, and filtered through Celite with toluene. The filtrate was concentrated under reduced pressure, to the obtained residue was added toluene (700 mL), and the mixture was concentrated under reduced pressure. To the obtained residue was added toluene (500 mL), and the mixture was concentrated under reduced pressure. To the obtained residue was added toluene (500 mL), and the mixture was concentrated under reduced pressure to give a residue (1.09 kg) containing the title compound (612 g, yield 85%) and n-octanoic acid (449 g). This was directly used for the next reaction.

(4) (R)-pentan-2-ol

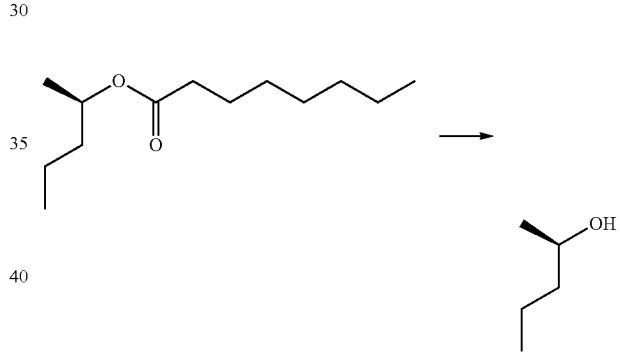

To the residue (obtained in the above-mentioned (3), 1.09 kg) containing (R)-1-methylbutyl octanoate (612 g) was added 4 M aqueous sodium hydroxide solution (2.20 L) at room temperature (the internal temperature was raised to 41° C.). The reaction mixture was stirred at the internal temperature 70° C. (bath temperature: 95° C.) for 16 hr. The mixture was allowed to cool to at room temperature, and conc. hydrochloric acid (530 mL) was added dropwise thereto under ice cooling. The reaction mixture was distilled at the internal temperature 98° C. (bath temperature: 158° C.) under normal pressure to give a mixture (ca. 600 mL) containing the title compound and water. The mixture was separated by standing, and the aqueous layer was extracted with diisopropyl ether (20 mL, once). The organic layers were combined, and washed successively with 1% aqueous sodium hydrogencarbonate solution (44 mL) and saturated brine (ca. 40 mL). The organic layer was dried over magnesium sulfate (20 g), and filtered through Celite with diisopropyl ether. The filtrate was carefully concentrated under reduced pressure to give a toluene solution (272 g) containing the title compound (186 g, yield 74%).

$^1$H-NMR (CDCl$_3$) δ: 0.90-0.96 (3H, m), 1.19 (3H, d, J=6.2 Hz), 1.28-1.52 (4H, m), 3.77-3.86 (1H, m).

(5) 5-bromo-2-((R)-1-methylbutoxy)pyridine

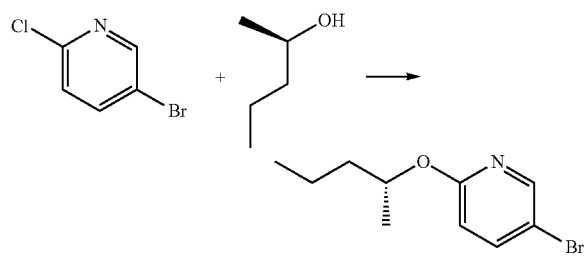

To a solution of 5-bromo-2-chloropyridine (22 g) and (R)-pentan-2-ol (obtained in the above-mentioned (4), 12.1 g) in N,N-dimethylformamide (88 ml) was added potassium tert-butoxide (16.7 g) under ice cooling under argon atmosphere, and the mixture was stirred for 30 min. The reaction mixture was stirred at room temperature for 3 hr. To the reaction mixture was added potassium tert-butoxide (1.67 g) under ice cooling, and the mixture was stirred at room temperature for 30 min. To the reaction mixture were added saturated aqueous ammonium chloride solution and ethyl acetate, and the mixture was separated. The aqueous layer was extracted with a mixed solvent of n-hexane:ethyl acetate=1:1. The organic layers were combined, and washed with water and saturated brine. The organic layer was dried over sodium sulfate, filtered to remove the sodium sulfate, and concentrated under reduced pressure. A part of the residue was purified by silica gel chromatography (eluent: n-hexane/ethyl acetate) to give the title compound.

$^1$H-NMR (CDCl$_3$) δ: 0.92 (3H, t, J=7.3 Hz), 1.29 (3H, d, J=6.2 Hz), 1.33-1.48 (2H, m), 1.50-1.59 (1H, m), 1.66-1.75 (1H, m), 5.10-5.18 (1H, m), 6.59 (1H, d, J=8.8 Hz), 7.60 (1H, dd, J=8.8, 2.4 Hz), 8.16 (1H, d, J=2.4 Hz).

When analyzing using chiral column, the retention time of the obtained title compound was about 10 min, and the optical purity thereof was 99.0% ee or more. The analysis condition using chiral column was as follows.

measurement equipment; HPLC system Shimadzu Corporation high-performance liquid chromatogram Prominence column; Daicel CHIRALCEL AS 0.46 cmcp×15 cm (10 μm) column temperature; 25° C.

mobile phase; n-hexane flow rate; 1 mL/5206 detection; UV (220 nM)

The compounds of Examples Nos. 1-145 were obtained according to the above-mentioned production method. The structures and MS data and MNR data of the compounds of Examples are shown in Table 1-1 to Table 1-19. In the tables, Notes 1 and 2 are as follows.

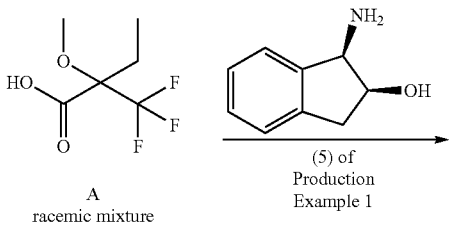

A
racemic mixture (5) of Production Example 1

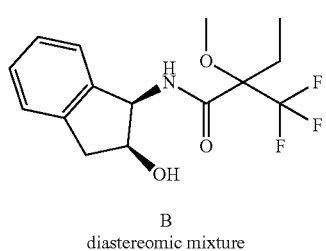

B
diastereomic mixture silica gel column chromatography

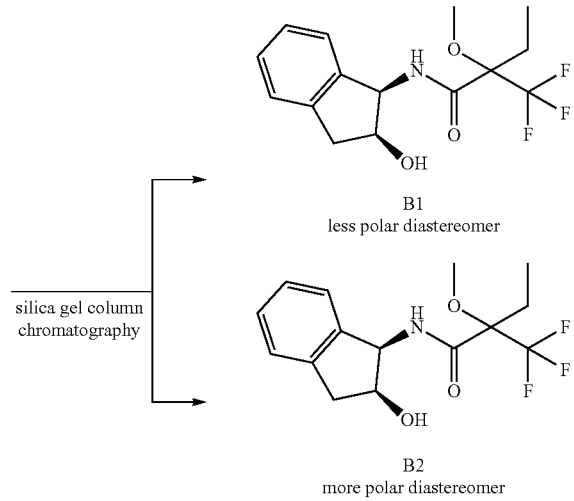

B1
less polar diastereomer

B2
more polar diastereomer

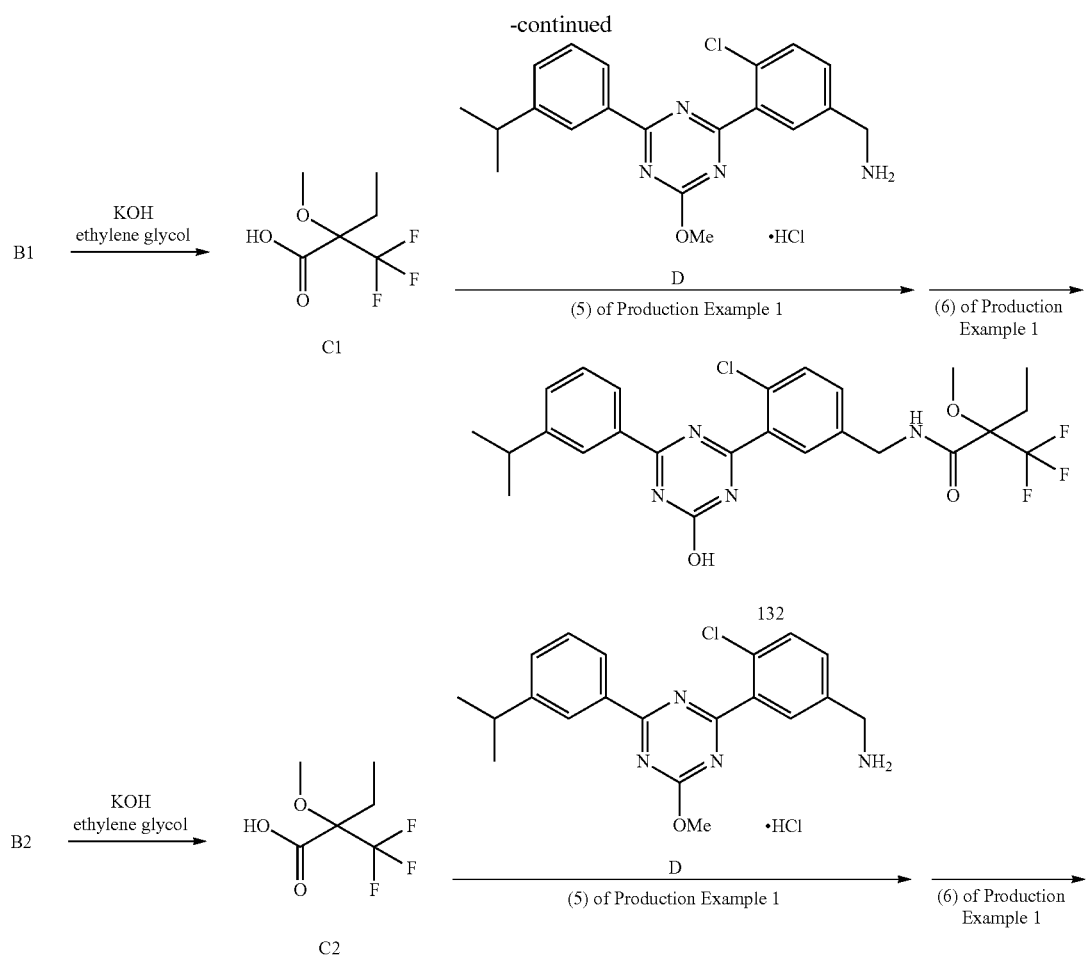

Racemic mixture A was obtained using hydroxy-2-trifluoromethylbutyric acid instead of 2-ethyl-2-hydroxybutyric acid in the same manner as in (1), (2) and (3) of Production Example 7.

Diastereomic mixture B was obtained by amidation using racemic mixture A and (1R,2S)-(+)-1-amino-2-indanol in the same manner as in (5) of Production Example 1.

Diastereomic mixture B was purified by silica gel column chromatography (Merck TLC Silica gel 60G F254 25 Glass-plates, eluent: n-hexane/ethyl acetate=1/2) to give compound B1 (less polar diastereomer) and compound B2 (more polar diastereomer).

Compound C1 was obtained by hydrolyzing compound B1 (single diastereomer) with KOH under heating in ethylene glycol.

The compound of Example 132 was obtained by amidation using compound C1 and compound D in the same manner as in (5) of Production Example 1, and then hydrolysis in the same manner as in (6) of Production Example 1.

Compound C2 was obtained by hydrolyzing compound B2 (single diastereomer) in the same manner as in the hydrolysis of compound B1. The compound of Example 134 was obtained by amidation using compound C2 and compound D in the same manner as in (5) of Production Example 1, and then hydrolysis in the same manner as in (6) of Production Example 1.

The compounds of Examples 132 and 134 are each single diastereomer, and the absolute steric configurations on a carbon of the amide are not determined. In the tables, "Note 1" for the compounds of Examples 132, 133, 138, 139, 143 and 145 means that the compounds were obtained using less polar diastereomer B1, and "Note 2" for the compounds of Examples 134, 135, 136, 137, 142 and 144 that the compounds were obtained using more polar diastereomer B2.

TABLE 1-1

| Ex. No. | Structure | MS (M + H) | MS (M − H) | NMR | Note |
|---|---|---|---|---|---|
| 1 | | 509 | 507 | 1H-NMR (DMSO-D6) δ: 1.00 (3H, t, J = 7.4 Hz), 1.38 (6H, s), 1.71-1.81 (2H, m), 4.01 (2H, t, J = 6.5 Hz), 4.37 (2H, d, J = 5.8 Hz), 7.23 (1H, d, J = 7.9 Hz), 7.37-7.51 (2H, m), 7.55-7.73 (2H, m), 7.86 (1H, s), 7.93 (1H, d, J = 6.0 Hz), 8.65 (1H, t, J = 5.9 Hz), 13.34 (1H, br s). | |
| 2 | | 510 | 508 | 1H-NMR (DMSO-D6) δ: 0.98 (3H, t, J = 7.4 Hz), 1.38 (6H, s), 1.71-1.81 (2H, m), 4.32 (2H, t, J = 6.7 Hz), 4.37 (2H, d, J = 5.9 Hz), 6.97 (1H, d, J = 9.0 Hz), 7.38-7.49 (1H, m), 7.56-7.76 (2H, m), 8.51 (1H, dd, J = 8.9, 2.3 Hz), 8.64 (1H, t, J = 5.9 Hz), 9.10 (1H, d, J = 2.3 Hz), 13.31 (1H, br s). | |
| 3 | | 523 | 521 | 1H-NMR (DMSO-D6) δ: 0.93 (3H, t, J = 7.4 Hz), 1.37 (6H, s), 1.42-1.49 (2H, m), 1.68-175 (2H, m), 4.03 (2H, t, J = 6.5 Hz), 4.36 (2H, d, J = 5.8 Hz), 7.22 (1H, d, J = 7.9 Hz), 7.38-7.50 (2H, m), 7.55-7.71 (2H, m), 7.84 (1H, s), 7.91 (1H, d, J = 7.4 Hz), 8.63 (1H, t, J = 5.8 Hz), 13.32 (1H, br s). | |
| 4 | | 551 | 549 | 1H-NMR (DMSO-D6) δ: 1.03 (3H, t, J = 7.4 Hz), 1.22 (6H, d, J = 6.9 Hz), 1.38 (6H, s), 1.75-1.84 (2H, m), 3.23-3.32 (1H, m), 4.06 (2H, t, J = 6.2 Hz), 4.37 (2H, d, J = 5.8 Hz), 7.11 (1H, d, J = 8.3 Hz), 7.37-7.48 (1H, m), 7.54-7.70 (2H, m), 8.18-8.25(2H, m), 8.64 (1H, t, J = 5.8), 13.13 (1H, br s). | |
| 5 | | 507 | 505 | 1H-NMR (DMSO-D6) δ: 0.91 (3H, t, J = 7.3 Hz), 1.27-1.36 (2H, m), 1.38 (6H, s), 1.55-1.63 (2H, m), 2.67 (2H, t, J = 7.6 Hz), 4.37 (2H, d, J = 5.9 Hz), 7.41-7.52 (3H, m), 7.57-7.68 (2H, m), 8.13-8.18 (2H, m), 8.65 (1H, t, J = 5.9 Hz), 13.31 (1H, br s). | |
| 6 | | 453 | 451 | 1H-NMR (DMSO-D6) δ: 0.73 (3H, t, J = 7.5 Hz), 1.08 (6H, s), 1.25 (6H, d, J = 6.9 Hz), 1.50 (2H, q, J = 7.5 Hz), 2.95-3.05 (1H, m), 4.32 (2H, d, J = 6.0 Hz), 7.40-7.70 (5H, m), 8.10-8.25 (3H, m), 13.32 (1H, br s). | |

TABLE 1-1-continued

| Ex. No. | Structure | MS (M + H) | MS (M − H) | NMR | Note |
|---|---|---|---|---|---|
| 7 | | 467 | 465 | 1H-NMR (DMSO-D6) δ: 0.76 (3H, t, J = 7.3 Hz), 1.08-1.16 (2H, m), 1.09 (6H, s), 1.25 (6H, d, J = 7.3 Hz), 1.40-1.47 (2H, m), 2.95-3.05 (1H, m), 4.32 (2H, d, J = 6.0 Hz), 7.40-7.67 (5H, m), 8.11-8.24 (3H, m), 13.33 (1H, br s). | |
| 8 | | 451 | 499 | 1H-NMR (DMSO-D6) δ: 0.51-0.55 (2H, m), 0.87-0.95 (5H, m), 1.25 (6H, d, J = 6.9 Hz), 1.55-1.62 (2H, m), 2.96-3.05 (1H, m), 4.32 (2H, d, J = 6.0 Hz), 7.40-7.70 (5H, m), 8.10-8.25 (3H, m), 13.32 (1H, br s). | |

TABLE 1-2

| Ex. No. | Structure | MS (M + H) | MS (M − H) | NMR | Note |
|---|---|---|---|---|---|
| 9 | | 495 | 493 | 1H-NMR (DMSO-D6) δ: 1.36 (3H, t, J = 7.1 Hz), 1.38 (6H, s), 4.11 (2H, q, J = 6.9 Hz), 4.37 (2H, d, J = 5.9 Hz), 7.23 (1H, d, J = 6.9 Hz), 7.39-7.50 (2H, m), 7.57-7.71 (2H, m), 7.86 (1H, s), 7.89-7.97 (1H, m), 8.65 (1H, t, J = 5.9 Hz), 13.34 (1H, br s). | |
| 10 | | 523 | 521 | 1H-NMR (DMSO-D6) δ: 0.99 (3H, t, J = 7.5 Hz), 1.38 (6H, s), 1.70-1.79 (2H, m), 2.35 (3H, s), 3.99 (2H, t, J = 6.6 Hz), 4.37 (2H, d, J = 6.0 Hz), 7.06 (1H, s), 7.39-7.49 (1H, m), 7.55-7.70 (3H, m), 7.76 (1H, s), 8.65 (1H, t, J = 6.0 Hz), 13.31 (1H, br s). | |
| 11 | | 521 | 519 | 1H-NMR (DMSO-D6) δ: 1.33 (9H, s), 1.38 (6H, s), 2.39 (3H, s), 4.37 (2H, d, J = 6.0 Hz), 7.36-7.74 (4H, m), 7.94-8.01 (1H, m), 8.15-8.21 (1H, m), 8.64 (1H, t, J = 6.0 Hz), 13.30 (1H, br s). | |
| 12 | | 469 | 467 | 1H-NMR (DMSO-D6) δ: 1.09 (6H, s), 1.25 (6H, d, J = 6.9 Hz), 2.97-3.04 (1H, m), 3.17 (3H, s), 3.31 (2H, s), 4.34 (2H, d, J = 6.0 Hz), 7.42-7.51 (2H, m), 7.54-7.66 (3H, m), 8.10-8.18 (2H, m), 8.21 (1H, s), 13.35 (1H, br s). | |

TABLE 1-2-continued

| Ex. No. | Structure | MS (M + H) | MS (M − H) | NMR | Note |
|---|---|---|---|---|---|
| 13 | | 467 | 465 | 1H-NMR (DMSO-D6) δ: 0.68 (2H, q, J = 3.5 Hz), 1.00 (2H, q, J = 3.4 Hz), 1.25 (6H, d, J = 6.9 Hz), 2.97-3.04 (1H, m), 3.25 (3H, s), 3.48 (2H, s), 4.37 (2H, d, J = 6.0 Hz), 7.44-7.51 (2H, m), 7.54-7.70 (3H, m), 8.09-8.24 (3H, m), 13.33 (1H, br s). | |
| 14 | | 524 | 522 | 1H-NMR (DMSO-D6) δ: 0.94 (3H, t, J = 7.4 Hz), 1.38 (6H, s), 1.40-1.48 (2H, m), 1.69-1.76 (2H, m), 4.32-4.40 (4H, m), 6.96 (1H, d, J = 8.7 Hz), 7.40-7.48 (1H, m), 7.57-7.72 (2H, m), 8.50 (1H, dd, J = 8.7, 2.4 Hz), 8.64 (1H, t, J = 5.8 Hz), 9.09 (1H, d, J = 2.4 Hz), 13.31 (1H, brs). | |
| 15 | | 467 | 465 | 1H-NMR (DMSO-D6) δ: 0.71 (6H, t, J = 7.3 Hz), 1.02 (3H, s), 1.25 (6H, d, J = 6.9 Hz), 1.35 (2H, td, J = 14.3, 7.3 Hz), 1.61 (2H, td, J = 14.3, 7.3 Hz), 2.97-3.03 (1H, m), 4.33 (2H, d, J = 6.0 Hz), 7.42-7.71 (5H, m), 8.10-8.24 (3H, m), 13.33 (1H, br s). | |
| 16 | | 479 | 477 | 1H-NMR (DMSO-D6) δ: 1.07 (3H, s), 1.15-1.50 (8H, m), 1.25 (6H, d, J = 6.7 Hz), 1.92-2.00 (2H, m), 2.96-3.03 (1H, m), 4.34 (2H, d, J = 6.0 Hz), 7.42-7.68 (5H, m), 8.14-8.21 (3H, m), 13.32 (1H, br s). | |

TABLE 1-3

| Ex. No. | Structure | MS (M + H) | MS (M − H) | NMR | Note |
|---|---|---|---|---|---|
| 17 | | 469 | 467 | 1H-NMR (DMSO-D6) δ: 1.11 (3H, t, J = 7.1 Hz), 1.25 (6H, d, J = 6.9 Hz), 1.28 (6H, s), 2.96-3.03 (1H, m), 3.35 (2H, q, J = 7.1 Hz), 4.34 (2H, d, J = 6.1 Hz), 7.40-7.72 (5H, m), 8.10-8.24 (2H, m), 8.37 (1H, t, J = 6.1 Hz), 13.32 (1H, br s). | |
| 18 | | 535 | 533 | 1H-NMR (DMSO-D6) δ: 1.24 (12H, d, J = 6.9 Hz), 1.38 (6H, s), 2.92-3.03 (2H, m), 4.38 (2H, d, J = 5.6 Hz), 7.36-7.50 (2H, m), 7.54-7.74 (2H, m), 8.04 (2H, s), 8.65 (1H, t, J = 6.0 Hz), 13.30 (1H, s). | |

TABLE 1-3-continued

| Ex. No. | Structure | MS (M + H) | MS (M − H) | NMR | Note |
|---|---|---|---|---|---|
| 19 | | 538 | 536 | 1H-NMR (DMSO-D6) δ: 1.01 (9H, s), 1.38 (6H, s), 4.07 (2H, s), 4.37 (2H, d, J = 5.8 Hz), 6.96-7.02 (1H, m), 7.40-7.48 (1H, m), 7.53-7.73 (2H, m), 8.51 (1H, dd, J = 8.9, 2.4 Hz), 8.64 (1H, t, J = 5.8 Hz), 9.09 (1H, d, J = 2.1 Hz), 13.32 (1H, br s). | |
| 20 | | 563 | 561 | 1H-NMR (DMSO-D6) δ: 1.34 (18H, s), 1.38 (6H, s), 4.37 (2H, d, J = 6.0 Hz), 7.37-7.50 (1H, m), 7.57-7.77 (3H, m), 8.21 (2H, s), 8.64 (1H, t, J = 6.0 Hz), 13.34 (1H, s). | |
| 21 | | 538 | 536 | 1H-NMR (DMSO-D6) δ: 0.89 (3H, t, J = 7.1 Hz), 1.30-1.43 (4H, m), 1.38 (6H, s), 1.71-1.78 (2H, m), 4.33-4.38 (4H, m), 6.96 (1H, d, J = 8.9 Hz), 7.42-7.47 (1H, m), 7.57-7.71 (2H, m), 8.50 (1H, dd, J = 8.9, 2.2 Hz), 8.65 (1H, t, J = 6.0 Hz), 9.09 (1H, d, J = 2.2 Hz), 13.32 (1H, br s). | |
| 22 | | 495 | 493 | 1H-NMR (DMSO-D6) δ: 1.34 (9H, s), 1.57-1.67 (4H, m), 1.77-1.92 (4H, m), 3.10 (3H, s), 4.35 (2H, d, J = 6.3 Hz), 7.45-7.53 (2H, m), 7.57-7.62 (1H, m), 7.65-7.73 (2H, m), 8.12-8.18 (1H, m), 8.38 (1H, s), 8.58 (1H, t, J = 6.3 Hz), 13.33 (1H, br s). | |
| 23 | | 552 | 550 | 1H-NMR (DMSO-D6) δ: 0.88 (3H, t, J = 7.1 Hz), 1.26-1.34 (4H, m), 1.35-1.45 (2H, m), 1.37 (6H, s), 1.69-1.76 (2H, m), 4.28-4.36 (4H, m), 6.83 (1H, d, J = 8.7 Hz), 7.25 (1H, dd, J = 8.3, 2.2 Hz), 7.44 (1H, d, J = 8.3 Hz), 7.55 (1H, d, J = 2.2 Hz), 8.46 (1H, dd, J = 8.7, 2.1 Hz), 8.59 (1H, t, J = 5.9 Hz), 9.01 (1H, d, J = 2.1 Hz). | |
| 24 | | 509 | 507 | 1H-NMR (DMSO-D6) δ: 1.12-1.29 (1H, m), 1.34 (9H, s), 1.37-1.56 (5H, m), 1.58-1.67 (2H, m), 1.71-1.77 (2H, m), 3.10 (3H, s), 4.33 (2H, d, J = 6.2 Hz), 7.45-7.52 (2H, m), 7.57-7.62 (1H, m), 7.65-7.75 (2H, m), 8.15 (1H, d, J = 7.4 Hz), 8.38 (1H, s), 8.53 (1H, t, J = 6.2 Hz), 13.32 (1H, br s). | |

TABLE 1-4

| Ex. No. | Structure | MS (M + H) | MS (M − H) | NMR | Note |
|---|---|---|---|---|---|
| 25 | | 538 | 536 | 1H-NMR (DMSO-D6) δ: 0.89 (3H, t, J = 7.4 Hz), 1.29 (3H, d, J = 6.2 Hz), 1.33-1.44 (2H, m), 1.38 (6H, s), 1.54-1.74 (2H, m), 4.37 (2H, d, J = 6.0 Hz), 5.27-5.36 (1H, m), 6.91 (1H, d, J = 8.8 Hz), 7.44 (1H, d, J = 6.9 Hz), 7.58-7.71 (2H, m), 8.48 (1H, dd, J = 8.8, 2.4 Hz), 8.63 (1H, t, J = 6.0 Hz), 9.09 (1H, d, J = 2.4 Hz), 13.29 (1H, br s). | |
| 26 | | 482 | 480 | 1H-NMR (DMSO-D6) δ: 1.38 (6H, s), 3.96 (3H, s), 4.37 (2H, d, J = 6.0 Hz), 6.99 (1H, d, J = 8.8 Hz), 7.42-7.47 (1H, m), 7.60-7.69 (2H, m), 8.52 (1H, dd, J = 8.8, 2.2 Hz), 8.63 (1H, t, J = 6.0 Hz), 9.12 (1H, d, J = 2.2 Hz), 13.32 (1H, br s). | |
| 27 | | 496 | 494 | 1H-NMR (DMS0-D6) δ: 1.35 (3H, t, J = 7.0 Hz), 1.38 (6H, s), 4.37 (2H, d, J = 5.8 Hz), 4.42 (2H, q, J = 7.0 Hz), 6.96 (1H, d, J = 8.8 Hz), 7.44 (1H, d, J = 8.1 Hz), 7.61-7.68 (2H, m), 8.50 (1H, dd, J = 8.8, 2.3 Hz), 8.63 (1H, t, J = 5.8 Hz), 9.10 (1H, d, J = 2.3 Hz), 13.30 (1H, br s). | |
| 28 | | 484 | 482 | 1H-NMR (DMSO-D6) δ: 1.15-1.25 (1H, m), 1.37-1.57 (3H, m), 1.59-1.67 (2H, m), 1.70-1.78 (2H, m), 3.10 (3H, s), 3.96 (3H, s), 4.33 (2H, d, J = 6.3, Hz), 6.99 (1H, d, J = 8.8 Hz), 7.44-7.51 (1H, m), 7.56-7.71 (2H, m), 8.51 (2H, dd, J = 8.8, 2.2 Hz), 8.54 (2H, t, J = 6.3 Hz), 9.11 (1H, d, J = 2.2 Hz), 13.30 (1H, br s). | |
| 29 | | 508 | 506 | 1H-NMR (DMSO-D6) δ: 1.51-1.70 (4H, m), 1.85-1.92 (2H, m), 2.31-2.37 (2H, m), 3.96 (3H, s), 4.38 (2H, d, J = 6.0 Hz), 6.99 (1H, d, J = 8.7 Hz), 7.41-7.47 (1H, m), 7.58-7.71 (2H, m), 8.51 (1H, dd, J = 8.7, 2.3 Hz), 8.71 (1H, t, J = 5.9 Hz), 9.12 (1H, d, J = 2.3 Hz), 13.32 (1H, br s). | |

TABLE 1-4-continued

| Ex. No. | Structure | MS (M + H) | MS (M − H) | NMR | Note |
|---|---|---|---|---|---|
| 30 | | 522 | 520 | 1H-NMR (DMSO-D6) δ: 1.09-1.27 (3H, m), 1.41-1.48 (2H, m), 1.51-1.56 (1H, m), 1.60-1.65 (2H, m), 2.32-2.37 (2H, m), 3.96 (3H, s), 4.42 (2H, d, J = 5.9 Hz), 6.99 (1H, d, J = 8.8 Hz), 7.43-7.48 (1H, m), 7.61-7.71 (2H, m), 8.51 (1H, dd, J = 8.8, 2.2 Hz), 8.78 (1H, t, J = 5.9 Hz), 9.12 (1H, d, J = 2.2 Hz), 13.33 (1H, br s). | |
| 31 | | 498 | 496 | 1H-NMR (DMSO-D6) δ: 1.14-1.25 (1H, m), 1.35 (3H, t, J = 7.1 Hz), 1.40-1.57 (5H, m), 1.59-1.67 (2H, m), 1.70-1.78 (2H, m), 3.10 (3H, s), 4.33 (2H, d, J = 6.2 Hz), 4.42 (2H, q, J = 7.0 Hz), 6.95 (1H, d, J = 8.8 Hz), 7.44-7.50 (1H, m), 7.56-7.71 (2H, m), 8.49 (1H, dd, J = 8.8, 2.2 Hz), 8.54 (1H, t, J = 6.2 Hz), 9.09 (1H, d, J = 2.2 Hz), 13.28 (1H, br s). | |
| 32 | | 522 | 520 | 1H-NMR (DMSO-D6) δ: 1.35 (3H, t, J = 7.1 Hz), 1.51-1.69 (4H, m), 1.85-1.92 (2H, m), 2.31-2.38 (2H, m), 4.37-4.45 (4H, m), 6.96 (1H, d, J = 8.8 Hz), 7.43 (1H, d, J = 7.9 Hz), 7.60-7.68 (2H, m), 8.50 (1H, dd, J = 8.8, 2.3 Hz), 8.71 (1H, t, J = 5.9 Hz), 9.10 (1H, d, J = 2.3 Hz), 13.31 (1H, br s). | |

TABLE 1-5

| Ex. No. | Structure | MS (M + H) | MS (M − H) | NMR | Note |
|---|---|---|---|---|---|
| 33 | | 536 | 534 | 1H-NMR (DMSO-D6) δ: 1.09-1.27 (3H, m), 1.35 (3H, t, J = 7.1 Hz), 1.41-1.48 (2H, m), 1.51-1.56 (1H, m), 1.59-1.66 (2H, m), 2.32-2.37 (2H, m), 4.39-4.45 (4H, m), 6.95 (1H, d, J = 8.8 Hz), 7.46 (1H, d, J = 8.1 Hz), 7.60-7.70 (2H, m), 8.50 (1H, dd, J = 8.8, 2.3 Hz), 8.78 (1H, t, J = 5.9 Hz), 9.10 (1H, d, J = 2.3 Hz), 13.32 (1H, br s). | |
| 34 | | 470 | 468 | 1H-NMR (DMSO-D6) δ: 1.60-1.67 (4H, m), 1.78-1.92 (4H, m), 3.10 (3H, s), 3.96 (3H, s), 4.35 (2H, d, J = 6.2 Hz), 6.99 (1H, d, J = 8.8 Hz), 7.48 (1H, d, J = 7.6 Hz), 7.57-7.74 (2H, m), 8.51 (1H, dd, J = 8.8, 2.4 Hz), 8.56 (1H, t, J = 6.2 Hz), 9.11 (1H, d, J = 2.4 Hz), 13.30 (1H, br s). | |

TABLE 1-5-continued

| Ex. No. | Structure | MS (M + H) | MS (M − H) | NMR | Note |
|---|---|---|---|---|---|
| 35 | | 523 | 521 | 1H-NMR (DMSO-D6) δ: 1.20 (6H, d, J = 6.9 Hz), 1.38 (6H, s), 3.24-3.31 (1H, m), 3.90 (3H, s), 4.37 (2H, d, J = 5.8 Hz), 7.08-7.18 (1H, m), 7.37-7.48 (1H, m), 7.53-7.76 (2H, m), 8.21-8.25 (2H, m), 8.63 (1H, t, J = 5.8 Hz), 13.12 (1H, br s). | |
| 36 | | 537 | 535 | 1H-NMR (DMSO-D6) δ: 1.36-1.39 (15H, m), 3.92 (3H, s), 4.37 (2H, d, J = 5.8 Hz), 7.15 (1H, d, J = 8.8 Hz), 7.42 (1H, d, J = 8.1 Hz), 7.60 (1H, d, J = 8.1 Hz), 7.63-7.69 (1H, m), 8.24 (1H, dd, J = 8.8, 1.8 Hz), 8.27-8.31 (1H, m), 8.62 (1H, t, J = 5.8 Hz), 13.14 (1H, br s). | |
| 37 | | 484 | 482 | 1H-NMR (DMSO-D6) δ: 1.35 (3H, t, J = 7.1 Hz), 1.58-1.66 (4H, m), 1.78-1.92 (4H, m), 3.10 (3H, s), 4.35 (2H, d, J = 6.2 Hz), 4.42 (2H, q, J = 7.1 Hz), 6.96 (1H, d, J = 8.8 Hz), 7.48 (1H, d, J = 7.4 Hz), 7.57-7.73 (2H, m), 8.49 (1H, dd, J = 8.8, 2.3 Hz), 8.56 (1H, t, J = 6.2 Hz), 9.09 (1H, d, J = 2.3 Hz), 13.29 (1H, br s). | |
| 38 | | 441 | 439 | 1H-NMR (DMSO-D6) δ: 1.17-1.35 (4H, m), 1.25 (6H, d, J = 6.9 Hz), 2.97-3.04 (1H, m), 4.42 (2H, d, J = 5.9 Hz), 7.47-7.77 (5H, m), 8.13-8.19 (1H, m), 8.22 (1H, s), 9.06 (1H, t, J = 5.9 Hz), 13.32 (1H, br s). | |
| 39 | | 483 | 481 | 1H-NMR (DMSO-D6) δ: 1.19-1.30 (1H m), 1.25 (6H, d, J = 6.7 Hz), 1.40-1.53 (2H, m), 1.58-1.65 (3H, m), 1.70-1.89 (4H, m), 2.95-3.05 (1H, m), 4.35 (2H, d, J = 6.2 Hz), 7.45-7.52 (2H, m), 7.55-7.61(2H, m), 7.66 (1H, s), 8.15 (1H, d, J = 7.6 Hz), 8.22 (1H, s), 8.74-8.78 (1H, m), 13.31 (1H, br s). | |
| 40 | | 510 | 508 | 1H-NMR (DMSO-D6) δ: 1.33 (6H, d, J = 6.0 Hz), 1.38 (6H, s), 4.37 (2H, d, J = 6.0 Hz), 5.32-5.42 (1H, m), 6.90 (1H, d, J = 8.8 Hz), 7.44 (1H, d, J = 8.1 Hz), 7.60-7.69 (2H, m), 8.48 (1H, dd, J = 8.8, 2.3 Hz), 8.63 (1H, t, J = 6.0 Hz), 9.10 (1H, d, J = 2.3 Hz), 13.29 (1H, br s). | |

TABLE 1-6

| Ex. No. | Structure | MS (M + H) | MS (M − H) | NMR | Note |
|---|---|---|---|---|---|
| 41 | | 469 | 467 | 1H-NMR (DMSO-D6) δ: 1.25 (6H, d, J = 6.9 Hz), 1.69-1.80 (4H, m), 1.85-2.15 (4H, m), 2.95-3.05 (1H, m), 4.38 (2H, d, J = 6.2 Hz), 7.48 (2H, t, J = 7.5 Hz), 7.54-7.71 (3H, m), 8.16 (1H, d, J = 6.9 Hz), 8.22 (1H, s), 8.84-8.88 (1H, m), 13.31 (1H, br s). | |
| 42 | | 524 | 522 | 1H-NMR (DMSO-D6) δ: 0.92 (3H, t, J = 7.4 Hz), 1.29 (3H, d, J = 6.2 Hz), 1.38 (6H, s), 1.59-1.77 (2H, m), 4.37 (2H, d, J = 6.0 Hz), 5.18-5.26 (1H, m), 6.92 (1H, d, J = 8.8 Hz), 7.44 (1H, d, J = 8.1 Hz), 7.60-7.70 (2H, m), 8.49 (1H, dd, J = 8.8, 2.3 Hz), 8.63 (1H, t, J = 6.0 Hz), 9.09 (1H, d, J = 2.2 Hz), 13.29 (1H, br s). | |
| 43 | | 521 | 519 | 1H-NMR (DMSO-D6) δ: 0.64 (3H, t, J = 7.4 Hz), 1.30 (6H, s), 1.38 (6H, s), 1.67 (2H, q, J = 7.4 Hz), 4.37 (2H, d, J = 6.0 Hz), 7.43 (1H, d, J = 8.3 Hz), 7.50 (1H, t, J = 7.6 Hz), 7.61 (1H, d, J = 8.3 Hz), 7.63-7.69 (2H, m), 8.16 (1H, d, J = 7.6 Hz), 8.33 (1H, s), 8.63 (1H, t, J = 6.0 Hz), 13.33 (1H, br s). | |
| 44 | | 523 | 521 | 1H-NMR (DMSO-D6) δ: 1.38 (6H, s), 1.50 (6H, s), 3.01 (3H, s), 4.37 (2H, d, J = 6.0 Hz), 7.44 (1H, d, J = 8.3 Hz), 7.54 (1H, t, J = 7.9 Hz), 7.61 (1H, d, J = 8.3 Hz), 7.64-7.68 (1H, m), 7.68 (1H, d, J = 7.9 Hz), 8.24 (1H, d, J = 7.9 Hz), 8.38 (1H, s), 8.63 (1H, t, J = 6.0 Hz), 13.36 (1H, br s). | |
| 45 | | 536 | 534 | 1H-NMR (DMSO-D6) δ: 0.98 (3H, t, J = 7.5 Hz), 1.51-1.69 (4H, m), 1.71-1.80 (2H, m), 1.85-1.92 (2H, m), 2.31-2.37 (2H, m), 4.32 (2H, t, J = 6.7 Hz), 4.38 (2H, d, J = 6.0 Hz), 6.97 (1H, d, J = 8.8 Hz), 7.43 (1H, d, J = 8.3 Hz), 7.58-7.69 (2H, m), 8.50 (1H, dd, J = 8.8, 2.2 Hz), 8.71 (1H, t, J = 6.0 Hz), 9.09 (1H, d, J = 2.2 Hz), 13.30 (1H, br s). | |

TABLE 1-6-continued

| Ex. No. | Structure | MS (M + H) | MS (M − H) | NMR | Note |
|---|---|---|---|---|---|
| 46 | (structure) | 550 | 548 | 1H-NMR (DMSO-D6) δ: 0.98 (3H, t, J = 7.4 Hz), 1.08-1.27 (4H, m), 1.39-1.50 (2H, m), 1.51-1.56 (1H, m), 1.59-1.67 (2H, m), 1.71-1.80 (2H, m), 2.33-2.36 (2H, m), 4.32 (2H, t, J = 6.6 Hz), 4.42 (2H, d, J = 6.0 Hz), 6.97 (1H, d, J = 8.8 Hz), 7.46 (1H, d, J = 8.6 Hz), 7.60-7.69 (2H, m), 8.50 (1H, dd, J = 8.8, 2.2 Hz), 8.78 (1H, t, J = 6.0 Hz), 9.09 (1H, d, J = 2.2 Hz), 13.32 (1H, br s). | |
| 47 | (structure) | 498 | 496 | 1H-NMR (DMSO-D6) δ: 0.74 (3H, t, J = 7.2 Hz), 0.98 (3H, t, J = 7.4 Hz), 1.03-1.20 (4H, m), 1.08 (6H, s), 1.42-1.47 (2H, m), 1.71-1.81 (2H, m), 4.30-4.34 (4H, m), 6.97 (1H, d, J = 8.8 Hz), 7.45 (1H, d, J = 8.1 Hz), 7.57-7.66 (2H, m), 8.14 (1H, t, J = 6.0 Hz), 8.50 (1H, dd, J = 8.8, 2.2 Hz), 9.09 (1H, d, J = 2.2 Hz), 13.31 (1H, br s). | |
| 48 | (structure) | 527 | 525 | 1H-NMR (DMSO-D6) δ: 1.27 (6H, d, J = 6.9 Hz), 1.38 (6H, s), 3.34-3.42 (1H, m), 4.37 (2H, d, J = 6.0 Hz), 7.44 (1H, d, J = 8.3 Hz), 7.61 (1H, d, J = 8.3 Hz), 7.61 (1H, d, J = 8.1 Hz), 7.64-7.67 (1H, m), 8.16 (1H, dd, J = 8.1, 1.6 Hz), 8.35 (1H, d, J = 1.8 Hz), 8.63 (1H, t, J = 6.0 Hz), 13.40 (1H, br s). | |

TABLE 1-7

| Ex. No. | Structure | MS (M + H) | MS (M − H) | NMR | Note |
|---|---|---|---|---|---|
| 49 | (structure) | 505 | 503 | 1H-NMR (DMSO-D6) δ: 0.79-0.93 (4H, m), 1.38 (6H, s), 1.43 (3H, s), 4.37 (2H, d, J = 5.8 Hz), 7.42-7.49 (2H, m), 7.52 (1H, d, J = 7.6 Hz), 7.61 (1H, d, J = 8.3 Hz), 7.64-7.68 (1H, m), 8.13 (1H, d, J = 7.6 Hz), 8.20 (1H, s), 8.63 (1H, t, J = 5.8 Hz), 13.33 (1H, br s). | |
| 50 | (structure) | 508 | 506 | 1H-NMR (DMSO-D6) δ: 0.71-0.76 (2H, m), 0.78-0.85 (2H, m), 1.38 (6H, s), 4.32-4.36 (1H, m), 4.37 (2H, d, J = 6.0 Hz), 7.04 (1H, d, J = 8.8 Hz), 7.44 (1H, d, J = 8.1 Hz), 7.59-7.68 (2H, m), 8.54 (1H, dd, J = 8.8, 2.3 Hz), 8.63 (1H, t, J = 6.0 Hz), 9.13 (1H, d, J = 2.3 Hz), 13.33 (1H, br s). | |

TABLE 1-7-continued

| Ex. No. | Structure | MS (M + H) | MS (M − H) | NMR | Note |
|---|---|---|---|---|---|
| 51 | | 484 | 482 | 1H-NMR (DMSO-D6) δ: 0.75 (3H, t, J = 7.2 Hz), 1.02-1.18 (4H, m), 1.08 (6H, s), 1.35 (3H, t, J = 7.1 Hz), 1.42-1.46 (2H, m), 4.31 (2H, d, J = 6.0 Hz), 4.42 (2H, q, J = 7.0 Hz), 6.96 (1H, d, J = 8.8 Hz), 7.43-7.48 (1H, m), 7.58-7.67 (2H, m), 8.14 (1H, t, J = 6.0 Hz), 8.50 (1H, dd, J = 8.8, 2.1 Hz), 9.10 (1H, d, J = 2.1 Hz), 13.31 (1H, br s). | |
| 52 | | 519 | 517 | 1H-NMR (DMSO-D6) δ: 1.25 (6H, d, J = 6.9 Hz), 1.50-1.70 (4H, m), 1.83-1.92 (2H, m), 2.30-2.38 (2H, m), 2.97-3.04 (1H, m), 4.39 (2H, d, J = 5.7 Hz), 7.39-7.70 (5H, m), 8.11-8.24 (2H, m), 8.72 (1H, t, J = 5.7 Hz), 13.32 (1H, br s). | |
| 53 | | 507 | 505 | 1H-NMR (DMSO-D6) δ: 1.23 (6H, d, J = 6.7 Hz), 1.38 (6H, s), 2.40 (3H, s), 3.14-3.22 (1H, m), 4.37 (2H, d, J = 6.0 Hz), 7.32 (1H, d, J = 8.1 Hz), 7.43 (1H, d, J = 8.3 Hz), 7.60 (1H, d, J = 8.3 Hz), 7.64-7.68 (1H, m), 8.06 (1H, dd, J = 8.1, 1.5 Hz), 8.25 (1H, d, J = 1.5 Hz), 8.63 (1H, t, J = 6.0 Hz), 13.24 (1H, br s). | |
| 54 | | 521 | 519 | 1H-NMR (DMSO-D6) δ: 1.38 (6H, s), 1.42 (9H, s), 2.59 (3H, s), 4.37 (2H, d, J = 6.0 Hz), 7.31 (1H, d, J = 7.9 Hz), 7.43 (1H, d, J = 8.3 Hz), 7.60 (1H, d, J = 8.3 Hz), 7.63-7.69 (1H, m), 8.06 (1H, d, J = 7.9 Hz), 8.37 (1H, s), 8.62 (1H, t, J = 6.0 Hz), 13.26 (1H, br s). | |
| 55 | | 553 | 551 | 1H-NMR (DMSO-D6) δ: 1.27 (6H, d, J = 6.9 Hz), 1.50-1.70 (4H, m), 1.83-1.92 (2H, m), 2.29-2.38 (2H, m), 3.34-3.41 (1H, m), 4.38 (2H, d, J = 6.0 Hz), 7.42 (1H, d, J = 8.3 Hz), 7.60 (1H, d, J = 8.3 Hz), 7.61 (1H, d, J = 8.1 Hz), 7.62-7.65 (1H, m), 8.16 (1H, dd, J = 8.1, 1.8 Hz), 8.35 (1H, d, J = 1.8 Hz), 8.70 (1H, t, J = 6.0 Hz), 13.41 (1H, br s). | |

TABLE 1-7-continued

| Ex. No. | Structure | MS (M + H) | MS (M − H) | NMR | Note |
|---|---|---|---|---|---|
| 56 | | 543 | 541 | 1H-NMR (DMSO-D6) δ: 1.27 (6H, d, J = 6.7 Hz), 1.54 (3H, s), 3.34-3.42 (1H, m), 3.36 (3H, s), 4.32-4.44 (2H, m), 7.46 (1H, d, J = 8.3 Hz), 7.61 (1H, d, J = 8.3 Hz), 7.61 (1H, d, J = 8.3 Hz), 7.66-7.69 (1H, m), 8.16 (1H, dd, J = 8.3, 2.1 Hz), 8.35 (1H, d, J = 2.1 Hz), 9.02 (1H, t, J = 6.0 Hz), 13.40 (1H, br s). | |

TABLE 1-8

| Ex. No. | Structure | MS (M + H) | MS (M − H) | NMR | Note |
|---|---|---|---|---|---|
| 57 | | 529 | 527 | 1H-NMR (DMSO-D6) δ: 1.13-1.25 (1H, m), 1.27 (6H, d, J = 6.7 Hz), 1.36-1.67 (7H, m), 1.69-1.77 (2H, m), 3.10 (3H, s), 3.33-3.41 (1H, m), 4.32 (2H, d, J = 6.0 Hz), 7.45 (1H, d, J = 8.3 Hz), 7.58 (1H, d, J = 8.3 Hz), 7.59 (1H, d, J = 8.3 Hz), 7.64-7.67 (1H, m), 8.14 (1H, dd, J = 8.3, 1.8 Hz), 8.34 (1H, d, J = 1.8 Hz), 8.52 (1H, t, J = 6.0 Hz), 13.40 (1H, br s). | |
| 58 | | 524 | 522 | 1H-NMR (DMSO-D6) δ: 1.22 (6H, d, J = 6.7 Hz), 1.38 (6H, s), 3.10-3.21 (1H, m), 4.00 (3H, s), 4.37 (2H, d, J = 6.0 Hz), 7.40-7.49 (1H, m), 7.57-7.75 (2H, m), 8.39 (1H, s), 8.63 (1H, t, J = 6.0 Hz), 8.97 (1H, d, J = 2.3 Hz), 13.29 (1H, br s). | |
| 59 | | 522 | 520 | 1H-NMR (DMSO-D6) δ: 1.38 (6H, s), 1.60-1.73 (1H, m), 1.77-1.84 (1H, m), 2.04-2.15 (2H, m), 2.40-2.47 (2H, m), 4.37 (2H, d, J = 6.0 Hz), 5.20-5.28 (1H, m), 6.94 (1H, d, J = 8.8 Hz), 7.44 (1H, d, J = 8.1 Hz), 7.57-7.70 (2H, m), 8.50 (1H, dd, J = 8.8, 2.2 Hz), 8.63 (1H, t, J = 5.9 Hz), 9.07 (1H, d, J = 2.2 Hz), 13.30 (1H, br s). | |

TABLE 1-8-continued

| Ex. No. | Structure | MS (M + H) | MS (M − H) | NMR | Note |
|---|---|---|---|---|---|
| 60 | | 562 | 560 | 1H-NMR (DMSO-D6) δ: 1.07-1.28 (3H, m), 1.40-1.55 (3H, m), 1.59-1.73 (3H, m), 1.76-1.85 (1H, m), 2.04-2.15 (2H, m), 2.32-2.37 (2H, m), 2.39-2.47 (2H, m), 4.42 (2H, d, J = 5.8 Hz), 5.20-5.27 (1H, m), 6.94 (1H, d, J = 8.8 Hz), 7.46 (1H, d, J = 7.4 Hz), 7.60-7.71 (2H, m), 8.50 (1H, dd, J = 8.8, 2.4 Hz), 8.78 (1H, t, J = 5.8 Hz), 9.07 (1H, d, J = 2.4 Hz), 13.31 (1H, br s). | |
| 61 | | 554 | 552 | 1H-NMR (DMSO-D6) δ: 1.38 (6H, s), 1.60-1.67 (2H, m), 1.74-1.81 (2H, m), 3.23 (3H, s), 3.37 (2H, t, J = 6.5 Hz), 4.36-4.40 (4H, m), 6.96 (1H, d, J = 8.8 Hz), 7.44 (1H, d, J = 7.4 Hz), 7.59-7.72 (2H, m), 8.50 (1H, dd, J = 8.8, 2.3 Hz), 8.63 (1H, t, J = 5.9 Hz), 9.10 (1H, d, J = 2.3 Hz), 13.30 (1H, br s). | |
| 62 | | 564 | 562 | 1H-NMR (DMSO-D6) δ: 1.12-1.27 (2H, m), 1.22 (6H, d, J = 6.9 Hz), 1.41-1.64 (6H, m), 2.30-2.37 (2H, m), 3.12-3.19 (1H, m), 3.99 (3H, s), 4.42 (2H, d, J = 5.8 Hz), 7.41-7.46 (1H, m), 7.60 (1H, d, J = 8.3 Hz), 7.65-7.68 (1H, m), 8.38 (1H, d, J = 2.1 Hz), 8.77 (1H, t, J = 5.8 Hz), 8.96 (1H, d, J = 2.1 Hz), 13.32 (1H, br s). | |
| 63 | | 531 | 529 | 1H-NMR (DMSO-D6) δ: 0.79-0.93 (4H, m), 1.43 (3H, s), 1.50-1.70 (4H, m), 1.83-1.93 (2H, m), 2.29-2.39 (2H, m), 4.38 (2H, d, J = 5.8 Hz), 7.41 (1H, dd, J = 8.3, 1.8 Hz), 7.45 (1H, t, J = 7.7 Hz), 7.51 (1H, d, J = 7.7 Hz), 7.60 (1H, d, J = 8.3 Hz), 7.64 (1H, s), 8.12 (1H, d, J = 7.7 Hz), 8.19 (1H, s), 8.70 (1H, t, J = 5.8 Hz), 13.34 (1H, br s). | |
| 64 | | 545 | 543 | 1H-NMR (DMSO-D6) δ: 0.79-0.93 (4H, m), 1.10-1.28 (3H, m), 1.39-1.48 (2H, m), 1.43 (3H, s), 1.50-1.56 (1H, m), 1.58-1.66 (2H, m), 2.31-2.38 (2H, m), 4.42 (2H, d, J = 5.8 Hz), 7.41-7.47 (2H, m), 7.51 (1H, d, J = 7.6 Hz), 7.60 (1H, d, J = 8.3 Hz), 7.67 (1H, s), 8.12 (1H, d, J = 7.6 Hz), 8.19 (1H, s), 8.77 (1H, t, J = 5.8 Hz), 13.33 (1H, br s). | |

TABLE 1-9

| Ex. No. | Structure | MS (M + H) | MS (M − H) | NMR | Note |
|---|---|---|---|---|---|
| 65 | | 521 | 519 | 1H-NMR (DMSO-D6) δ: 0.80-0.94 (4H, m), 1.43 (3H, s), 1.54 (3H, s), 3.36 (3H, s), 4.33-4.45 (2H, m), 7.44-7.49 (2H, m), 7.52 (1H, d, J = 7.6 Hz), 7.61 (1H, d, J = 8.1 Hz), 7.66-7.71 (1H, m), 8.13 (1H, d, J = 7.6 Hz), 8.19 (1H, s), 9.02 (1H, t, J = 6.0 Hz), 13.33 (1H, br s). | |
| 66 | | 523 | 521 | 1H-NMR (DMSO-D6) δ: 1.34 (9H, s), 1.54 (3H, s), 3.36 (3H, s), 4.33-4.45 (2H, m), 7.46 (1H, d, J = 8.3 Hz), 7.50 (1H, t, J = 7.9 Hz), 7.61 (1H, d, J = 8.3 Hz), 7.67-7.72 (1H, m), 7.72 (1H, d, J = 7.9 Hz), 8.16 (1H, d, J = 7.9 Hz), 8.38 (1H, s), 9.02 (1H, t, J = 6.2 Hz), 13.34 (1H, br s). | |
| 67 | | 525 | 523 | 1H-NMR (DMSO-D6) δ: 1.38 (6H, s), 1.39 (9H, s), 4.37 (2H, d, J = 6.0 Hz), 7.32 (1H, dd, J = 12.4, 8.3 Hz), 7.43 (1H, dd, J = 8.3, 1.7 Hz), 7.61 (1H, d, J = 8.3 Hz), 7.65 (1H, s), 8.22-8.27 (1H, m), 8.38 (1H, dd, J = 8.3, 1.8 Hz), 8.63 (1H, t, J = 6.0 Hz), 13.36 (1H, br s). | |
| 68 | | 594 | 592 | 1H-NMR (DMSO-D6) δ: 1.07-1.26 (3H, m), 1.10 (3H, t, J = 7.1 Hz), 1.41-1.64 (5H, m), 1.94-2.00 (2H, m), 2.35 (2H, d, J = 13.4 Hz), 3.42 (2H, q, J = 7.0 Hz), 3.51 (2H, t, J = 6.4 Hz), 4.40-4.43 (4H, m), 6.97 (1H, d, J = 8.6 Hz), 7.41-7.50 (1H, m), 7.57-7.75 (2H, m), 8.50 (1H, dd, J = 8.8, 2.2 Hz), 8.78 (1H, t, J = 5.7 Hz), 9.09 (1H, d, J = 2.2 Hz), 13.32 (1H, br s). | |
| 69 | | 594 | 592 | 1H-NMR (DMSO-D6) δ: 0.85 (3H, t, J = 7.4 Hz), 1.08-1.28 (3H, m), 1.41-1.54 (5H, m), 1.63 (2H, d, J = 11.8 Hz), 2.35 (2H, d, J = 12.9 Hz), 3.40 (2H, t, J = 6.6 Hz), 3.72 (2H, t, J = 4.6 Hz), 4.42 (2H, d, J = 5.8 Hz), 4.49 (2H, t, J = 4.6 Hz), 7.00 (1H, d, J = 8.6 Hz), 7.43-7.49 (1H, m), 7.61-7.75 (2H, m), 8.51 (1H, dd, J = 8.7, 2.2 Hz), 8.78 (1H, t, J = 5.8 Hz), 9.09 (1H, d, J = 2.2 Hz), 13.32 (1H, br s). | |

TABLE 1-9-continued

| Ex. No. | Structure | MS (M + H) | MS (M − H) | NMR | Note |
|---|---|---|---|---|---|
| 70 | | 457 | 455 | 1H-NMR (DMSO-D6) δ: 1.15 (6H, d, J = 1.6 Hz), 1.25 (6H, d, J = 6.9 Hz), 2.95-3.05 (1H, m), 4.30-4.47 (4H, m), 7.37-7.72 (5H, m), 8.10-8.24 (2H, m), 8.34 (1H, t, J = 6.0 Hz), 13.32 (1H, br s). | |
| 71 | | 533 | 531 | 1H-NMR (DMSO-D6) δ: 1.08-1.26 (3H, m), 1.25 (6H, d, J = 8.0 Hz), 1.41-1.64 (5H, m), 2.35 (2H, d, J = 12.5 Hz), 2.96-3.03 (1H, m), 4.42 (2H, d, J = 5.9 Hz), 7.42-7.51 (2H, m), 7.56 (1H, d, J = 7.7 Hz), 7.62 (1H, d, J = 8.5 Hz), 7.67 (1H, br s), 8.15 (1H, d, J = 7.7 Hz), 8.22 (1H, br s), 8.78 (1H, t, J = 5.9 Hz). | |
| 72 | | 578 | 576 | 1H-NMR (DMSO-D6) δ: 0.91 (3H, t, J = 7.3 Hz), 1.12-1.26 (3H, m), 1.32-1.38 (3H, m), 1.39-1.67 (7H, m), 2.32-2.38 (2H, m), 2.58 (2H, t, J = 7.5 Hz), 4.41-4.48 (4H, m), 7.43-7.49 (1H, m), 7.58-7.71 (2H, m), 8.31-8.34 (1H, m), 8.78 (1H, t, J = 6.0 Hz), 8.95 (1H, d, J = 2.4 Hz), 13.28 (1H, br s). | |

TABLE 1-10

| Ex. No. | Structure | MS (M + H) | MS (M − H) | NMR | Note |
|---|---|---|---|---|---|
| 73 | | 538 | 536 | 1H-NMR (DMSO-D6) δ: 0.91 (3H, t, J = 7.3 Hz), 1.35 (3H, t, J = 7.1 Hz), 1.38 (6H, s), 1.54-1.67 (2H, m), 2.58 (2H, t, J = 7.5 Hz), 4.37 (2H, d, J = 5.9 Hz), 4.45 (2H, q, J = 7.1 Hz), 7.43-7.46 (1H, m), 7.60-7.67 (2H, m), 8.33 (1H, d, J = 2.4 Hz), 8.64 (1H, t, J = 5.9 Hz), 8.96 (1H, d, J = 2.4 Hz), 13.27 (1H, br s). | |
| 74 | | 509 | 507 | 1H-NMR (DMSO-D6) δ: 1.25 (6H, d, J = 6.9 Hz), 1.54 (3H, s), 2.95-3.05 (1H, m), 3.36 (3H, s), 4.33-4.45 (2H, m), 7.46 (1H, d, J = 8.3 Hz), 7.48 (1H, t, J = 7.4 Hz), 7.56 (1H, d, J = 7.4 Hz), 7.61 (1H, d, J = 8.3 Hz), 7.66-7.70 (1H, m), 8.16 (1H, d, J = 7.4 Hz), 8.22 (1H, s), 9.03 (1H, t, J = 6.0 Hz), 13.32 (1H, br s). | |

TABLE 1-10-continued

| Ex. No. | Structure | MS (M + H) | MS (M − H) | NMR | Note |
|---|---|---|---|---|---|
| 75 | | 483 | 481 | 1H-NMR (DMSO-D6) δ: 0.66 (6H, t, J = 7.4 Hz), 1.25 (6H, d, J = 6.7 Hz), 1.56-1.71 (4H, m), 2.96-3.04 (1H, m), 3.14 (3H, s), 4.35 (2H, d, J = 6.2 Hz), 7.46-7.51 (2H, m), 7.56 (1H, d, J = 7.9 Hz), 7.59 (1H, d, J = 8.3 Hz), 7.65-7.70 (1H, m), 8.15 (1H, d, J = 7.9 Hz), 8.21 (1H, s), 8.37 (1H, t, J = 6.2 Hz), 13.31 (1H, br s). | |
| 76 | | 507 | 505 | 1H-NMR (DMSO-D6) δ: 1.24 (6H, s), 1.25 (6H, d, J = 7.2 Hz), 2.59 (2H, q, J = 12.0 Hz), 2.94-3.05 (1H, m), 4.34 (2H, d, J = 5.8 Hz), 7.44 (1H, d, J = 8.3 Hz), 7.48 (1H, t, J = 7.9 Hz), 7.56 (1H, d, J = 7.9 Hz), 7.59 (1H, d, J = 8.3 Hz), 7.63-7.67 (1H, m), 8.16 (1H, d, J = 7.9 Hz), 8.22 (1H, s), 8.34 (1H, t, J = 5.8 Hz), 13.31 (1H, br s). | |
| 77 | | 475 | 473 | 1H-NMR (DMSO-D6) δ: 1.21 (6H, s), 1.25 (6H, d, J = 6.9 Hz), 2.97-3.04 (1H, m), 4.36 (2H, d, J = 6.0 Hz), 6.14 (1H, t, J = 56.6 Hz), 7.41-7.71 (5H, m), 8.12-8.34 (2H, m), 8.49 (1H, t, J = 6.0 Hz), 13.32 (1H, br s). | |
| 78 | | 500 | 498 | 1H-NMR (DMSO-D6) δ: 0.90 (3H, t, J = 7.3 Hz), 1.28 (6H, s), 1.29 (3H, d, J = 6.2 Hz), 1.32-1.45 (2H, m), 1.51-1.76 (2H, m), 3.17 (3H, s), 4.33 (2H, d, J = 6.2 Hz), 5.27-5.35 (1H, m), 6.91 (1H, d, J = 8.8 Hz), 7.43-7.51 (1H, m), 7.57-7.73 (2H, m), 8.45-8.49 (2H, m), 9.08 (1H, d, J = 2.3 Hz), 13.27 (1H, br s). | |
| 79 | | 528 | 526 | 1H-NMR (DMSO-D6) δ: 0.66 (6H, t, J = 7.4 Hz), 0.89 (3H, t, J = 7.3 Hz), 1.29 (3H, d, J = 6.2 Hz), 1.33-1.45 (2H, m), 1.54-1.75 (6H, m), 3.14 (3H, s), 4.34 (2H, d, J = 6.4 Hz), 5.27-5.35 (1H, m), 6.91 (1H, d, J = 8.8 Hz), 7.45-7.53 (1H, m), 7.56-7.76 (2H, m), 8.36 (1H, t, J = 6.4 Hz), 8.48 (1H, dd, J = 8.8, 2.3 Hz), 9.08 (1H, d, J = 2.3 Hz), 13.28 (1H, br s). | |

TABLE 1-10-continued

| Ex. No. | Structure | MS (M + H) | MS (M − H) | NMR | Note |
|---|---|---|---|---|---|
| 80 | 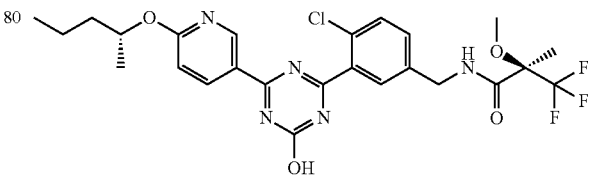 | 554 | 552 | 1H-NMR (DMSO-D6) δ: 0.89 (3H, t, J = 7.3 Hz), 1.29 (3H, d, J = 6.2 Hz), 1.32-1.46 (2H, m), 1.54 (3H, s), 1.55-1.74 (2H, m), 3.36 (3H, s), 4.33-4.44 (2H, m), 5.27-5.35 (1H, m), 6.91 (1H, d, J = 8.8 Hz), 7.43-7.50 (1H, m), 7.59-7.74 (2H, m), 8.48 (1H, dd, J = 8.8, 2.3 Hz), 9.02 (1H, t, J = 6.4 Hz), 9.08 (1H, d, J = 2.3 Hz), 13.28 (1H, br s). | |

TABLE 1-11

| Ex. No. | Structure | MS (M + H) | MS (M − H) | NMR | Note |
|---|---|---|---|---|---|
| 81 | 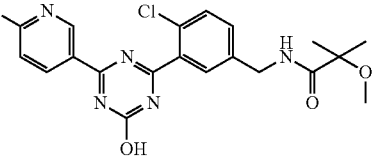 | 514 | 512 | 1H-NMR (DMSO-D6) δ: 0.88 (3H, t, J = 6.9 Hz), 1.27 (6H, s), 1.28-1.35 (4H, m), 1.37-1.48 (2H, m), 1.68-1.75 (2H, m), 3.15 (3H, s), 4.30 (4H, t, J = 6.9 Hz), 6.81 (1H, d, J = 8.4 Hz), 7.25 (1H, d, J = 8.1 Hz), 7.40 (1H, d, J = 8.1 Hz), 7.54 (1H, s), 8.39-8.45 (2H, m), 8.99 (1H, s). | |
| 82 | 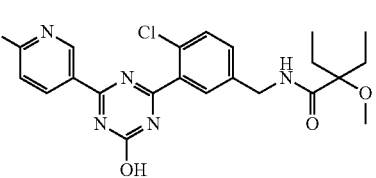 | 542 | 540 | 1H-NMR (DMSO-D6) δ: 0.66 (6H, t, J = 7.5 Hz), 0.87 (3H, t, J = 7.0 Hz), 1.27-1.45 (6H, m), 1.58-1.67 (3H, m), 1.69-1.76 (3H, m), 3.14 (3H, s), 4.29-4.36 (4H, m), 6.88 (1H, d, J = 8.8 Hz), 7.35-7.40 (1H, m), 7.49 (1H, d, J = 8.1 Hz), 7.61 (1H, s), 8.29-8.36 (1H, m), 8.46 (1H, dd, J = 8.8, 2.0 Hz), 9.03 (1H, d, J = 2.0 Hz). | |
| 83 | 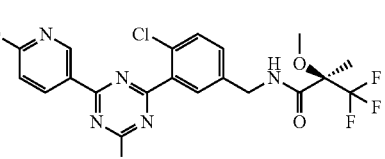 | 568 | 566 | 1H-NMR (DMSO-D6) δ: 0.87 (3H, t, J = 7.1 Hz), 1.29-1.35 (4H, m), 1.37-1.45 (2H, m), 1.54 (3H, s), 1.70-1.77 (2H, m), 3.36 (3H, s), 4.33-4.41 (4H, m), 6.95 (1H, d, J = 8.8 Hz), 7.44-7.47 (1H, m), 7.60 (1H, d, J = 8.3 Hz), 7.67 (1H, s), 8.49 (1H, dd, J = 8.8, 2.3 Hz), 9.02 (1H, t, J = 6.1 Hz), 9.09 (1H, d, J = 2.1 Hz), 13.30 (1H, br s). | |

TABLE 1-11-continued

| Ex. No. | Structure | MS (M + H) | MS (M − H) | NMR | Note |
|---|---|---|---|---|---|
| 84 | | 516 | 514 | 1H-NMR (DMSO-D6) δ: 0.88 (3H, t, J = 7.1 Hz), 1.15 (6H, d, J = 1.6 Hz), 1.26-1.44 (6H, m), 1.70-1.77 (2H, m), 4.32-4.45 (6H, m), 6.92 (1H, d, J = 8.6 Hz), 7.37-7.40 (1H, m), 7.55 (1H, d, J = 8.3 Hz), 7.62 (1H, d, J = 1.8 Hz), 8.30-8.34 (1H, m), 8.48 (1H, dd, J = 8.8, 2.3 Hz), 9.06 (1H, d, J = 2.3 Hz), 13.30 (1H, br s). | |
| 85 | | 534 | 532 | 1H-NMR (DMSO-D6) δ: 0.87 (3H, t, J = 7.1 Hz), 1.21 (6H, s), 1.26-1.46 (6H, m), 1.70-1.77 (2H, m), 4.33-4.37 (4H, m), 6.14 (1H, t, J = 56.4 Hz), 6.94 (1H, d, J = 8.8 Hz), 7.40-7.43 (1H, m), 7.59 (1H, d, J = 8.3 Hz), 7.64 (1H, d, J = 1.8 Hz), 8.45-8.51 (2H, m), 9.08 (1H, d, J = 2.1 Hz), 13.30 (1H, br s). | |
| 86 | | 538 | 536 | 1H-NMR (DMSO-D6) δ: 0.89 (3H, t, J = 7.4 Hz), 1.29 (3H, d, J = 6.2 Hz), 1.33-1.44 (2H, m), 1.38 (6H, s), 1.54-1.74 (2H, m), 4.37 (2H, d, J = 6.0 Hz), 5.27-5.35 (1H, m), 6.91 (1H, d, J = 8.8 Hz), 7.44 (1H, d, J = 6.9 Hz), 7.58-7.71 (2H, m), 8.48 (1H, dd, J = 8.8, 2.4 Hz), 8.63 (1H, t, J = 6.0 Hz), 9.09 (1H, d, J = 2.4 Hz), 13.29 (1H, br s). | |
| 87 | | 541 | 539 | 1H-NMR (DMSO-D6) δ: 1.38 (6H, s), 1.50 (9H, s), 4.37 (2H, d, J = 6.0 Hz), 7.44 (1H, dd, J = 8.3, 1.8 Hz), 7.59 (1H, d, J = 8.3 Hz), 7.61 (1H, d, J = 8.3 Hz), 7.64-7.67 (1H, m), 8.16 (1H, dd, J = 8.3, 1.6 Hz), 8.48 (1H, s), 8.63 (1H, t, J = 6.0 Hz), 13.42 (1H, br s). | |
| 88 | | 581 | 579 | 1H-NMR (DMSO-D6) δ: 1.27 (6H, d, J = 6.9 Hz), 1.74 (3H, s), 3.34-3.41 (1H, m), 4.43 (2H, d, J = 6.0 Hz), 7.43 (1H, dd, J = 8.3, 2.1 Hz), 7.59 (1H, d, J = 8.3 Hz), 7.62 (1H, d, J = 8.3 Hz), 7.66 (1H, d, J = 2.1 Hz), 8.16 (1H, dd, J = 8.3, 2.1 Hz), 8.35 (1H, d, J = 2.1 Hz), 9.10 (1H, t, J = 6.0 Hz), 13.41 (1H, br s). | |

TABLE 1-12

| Ex. No. | Structure | MS (M + H) | MS (M − H) | NMR | Note |
|---|---|---|---|---|---|
| 89 | | 559 | 557 | 1H-NMR (DMSO-D6) δ: 0.79-0.93 (4H, m), 1.43 (3H, s), 1.74 (3H, s), 4.44 (2H, d, J = 5.8 Hz), 7.44 (1H, d, J = 8.3 Hz), 7.46 (1H, t, J = 7.6 Hz), 7.53 (1H, d, J = 7.6 Hz), 7.63 (1H, d, J = 8.3 Hz), 7.68 (1H, s), 8.13 (1H, d, J = 7.6 Hz), 8.19 (1H, s), 9.10 (1H, t, J = 5.8 Hz), 13.34 (1H, br s). | |
| 90 | | 547 | 545 | 1H-NMR (DMSO-D6) δ: 1.25 (6H, d, J = 6.9 Hz), 1.74 (3H, s), 2.96-3.04 (1H, m), 4.44 (2H, d, J = 5.8 Hz), 7.44 (1H, d, J = 8.3 Hz), 7.48 (1H, t, J = 7.7 Hz), 7.56 (1H, d, J = 7.7 Hz), 7.63 (1H, d, J = 8.3 Hz), 7.67 (1H, s), 8.16 (1H, d, J = 7.7 Hz), 8.22 (1H, s), 9.11 (1H, t, J = 5.8 Hz), 13.33 (1H, br s). | |
| 91 | | 561 | 559 | 1H-NMR (DMSO-D6) δ: 1.34 (9H, s), 1.74 (3H, s), 4.43 (2H, d, J = 6.0 Hz), 7.43 (1H, dd, J = 8.3, 1.8 Hz), 7.49 (1H, t, J = 7.9 Hz), 7.62 (1H, d, J = 8.3 Hz), 7.68 (1H, s), 7.71 (1H, d, J = 7.9 Hz), 8.15 (1H, d, J = 7.9 Hz), 8.38 (1H, s), 9.10 (1H, t, J = 6.0 Hz), 13.36 (1H, br s). | |
| 92 | | 483 | 481 | 1H-NMR (DMSO-D6) δ: 1.25 (6H, d, J = 6.9 Hz), 1.51-1.60 (6H, m), 1.99 (2H, t, J = 6.0 Hz), 2.96-3.03 (1H, m), 4.35 (2H, d, J = 5.7 Hz), 4.47 (2H, d, J = 47.8 Hz), 7.40-7.48 (2H, m), 7.52-7.63 (3H, m), 8.15 (1H, d, J = 7.5 Hz), 8.21 (1H, s), 8.36 (1H, t, J = 5.7 Hz), 13.32 (1H, br s). | |
| 93 | | 497 | 495 | 1H-NMR (DMSO-D6) δ: 1.34 (9H, s), 1.49-1.59 (6H, m), 1.98 (2H, t, J = 6.3 Hz), 4.36 (2H, d, J = 6.0 Hz), 4.46 (2H, d, J = 47.5 Hz), 7.42-7.51 (2H, m), 7.58-7.72 (3H, m), 8.15 (1H, d, J = 7.8 Hz), 8.34-8.38 (2H, m), 13.33 (1H, br s). | |
| 94 | | 495 | 493 | 1H-NMR (DMSO-D6) δ: 0.80-0.83 (2H, m), 0.87-0.97 (2H, m), 1.43 (3H, s), 1.52-1.59 (6H, m), 1.98 (2H, t, J = 5.7 Hz), 4.36 (2H, d, J = 6.0 Hz), 4.47 (2H, d, J = 47.5 Hz), 7.45-7.67 (5H, m), 8.08-8.21 (2H, m), 8.36 (1H, t, J = 6.0 Hz), 13.33 (1H, br s). | |

TABLE 1-12-continued

| Ex. No. | Structure | MS (M + H) | MS (M − H) | NMR | Note |
|---|---|---|---|---|---|
| 95 | | 517 | 515 | 1H-NMR (DMSO-D6) δ: 1.27 (6H, d, J = 6.9 Hz), 1.51-1.59 (6H, m), 1.96-2.00 (2H, m), 3.33-3.41 (1H, m), 4.35 (2H, d, J = 6.0 Hz), 4.46 (2H, d, J = 47.8 Hz), 7.40 (1H, d, J = 8.4 Hz), 7.55-7.62 (3H, m), 8.15 (1H, dd, J = 8.4, 1.8 Hz), 8.34-8.37 (2H, m), 13.42 (1H, br s). | |
| 96 | | 501 | 499 | 1H-NMR (DMSO-D6) δ: 1.25 (6H, d, J = 6.9 Hz), 1.54-1.62 (4H, m), 1.75-1.82 (2H m), 2.04-2.10 (2H, m), 2.97-3.03 (1H, m), 4.37 (2H, d, J = 5.8 Hz), 6.26 (1H, t, J = 56.8 Hz), 7.42-7.50 (2H, m), 7.55-7.65 (3H, m), 8.16 (1H, d, J = 7.9 Hz), 8.22 (1H, s), 8.48 (1H, t, J = 5.8 Hz), 13.32 (1H, br s). | |

TABLE 1-13

| Ex. No. | Structure | MS (M + H) | MS (M − H) | NMR | Note |
|---|---|---|---|---|---|
| 97 | | 535 | 533 | 1H-NMR (DMSO-D6) δ: 1.27 (6H, d, J = 6.9 Hz), 1.52-1.62 (4H, m), 1.75-1.82 (2H, m), 2.04-2.10 (2H, m), 3.34-3.41 (1H, m), 4.37 (2H, d, J = 5.8 Hz), 6.26 (1H, t, J = 56.6 Hz), 7.43 (1H, dd J = 8.3, 2.1 Hz), 7.59-7.65 (3H, m), 8.16 (1H, dd, J = 8.6, 2.0 Hz), 8.35 (1H, d, J = 2.0 Hz), 8.47 (1H, t, J = 5.8 Hz), 13.41 (1H, br s). | |
| 98 | | 497 | 495 | 1H-NMR (DMSO-D6) δ: 1.18-1.38 (5H, m), 1.25 (6H, d, J = 6.9 Hz), 1.41-1.55 (3H, m), 1.96-2.04 (2H, m), 2.95-3.05 (1H, m), 4.36 (2H, d, J = 47.6 Hz), 4.38 (2H, d, J = 5.8 Hz), 7.44-7.73 (5H, m), 8.13-8.18 (1H, m), 8.22 (1H, s), 8.37 (1H, t, J = 5.8 Hz), 13.31 (1H, br s). | |
| 99 | | 511 | 509 | 1H-NMR (DMSO-D6) δ: 1.17-1.38 (5H, m), 1.34 (9H, s), 1.43-1.53 (3H, m), 1.96-2.04 (2H, m), 4.36 (2H, d, J = 47.6 Hz), 4.38 (2H, d, J = 5.8 Hz), 7.43-7.76 (5H, m), 8.15-8.18 (1H, m), 8.34-8.38 (2H, m), 13.33 (1H, br s). | |

TABLE 1-13-continued

| Ex. No. | Structure | MS (M + H) | MS (M − H) | NMR | Note |
|---|---|---|---|---|---|
| 100 | | 509 | 507 | 1H-NMR (DMSO-D6) δ: 0.79-0.82 (2H, m), 0.89-0.91 (2H, m), 1.16-1.38 (5H, m), 1.41-1.52 (6H, m), 1.42 (3H, s), 1.97-2.01 (2H, m), 4.36 (2H, d, J = 47.6 Hz), 4.37 (2H, d, J = 5.8 Hz), 7.39-7.48 (3H, m), 7.55 (1H, d, J = 8.3 Hz), 7.63-7.63 (1H, m), 8.11 (1H, d, J = 7.4 Hz), 8.19 (1H, s), 8.35 (1H, t, J = 5.8 Hz), 13.34 (1H, br s). | |
| 101 | | 531 | 529 | 1H-NMR (DMSO-D6) δ: 1.17-1.39 (5H, m), 1.27 (6H, d, J = 6.9 Hz), 1.41-1.54 (3H, m), 1.94-2.04 (2H, m), 3.33-3.43 (1H, m), 4.36 (2H, d, J = 47.6 Hz), 4.38 (2H, d, J = 5.8 Hz), 7.46 (1H, d, J = 7.6 Hz), 7.61 (2H, d, J = 8.6 Hz), 7.66 (1H, s), 8.15-8.18 (1H, m), 8.35-8.38 (2H, m), 13.40 (1H, br s). | |
| 102 | | 500 | 498 | 1H-NMR (DMSO-D6) δ: 0.90 (3H, t, J = 7.4 Hz), 1.28 (6H, s), 1.29 (3H, d, J = 6.3 Hz), 1.32-1.45 (2H, m), 1.53-1.74 (2H, m), 3.17 (3H, s), 4.33 (2H, d, J = 6.3 Hz), 5.26-5.36 (1H, m), 6.91 (1H, d, J = 8.8 Hz), 7.44-7.50 (1H, m), 7.57-7.73 (2H, m), 8.45-8.49 (2H, m), 9.08 (1H, d, J = 2.4 Hz), 13.27 (1H, br s). | |
| 103 | | 528 | 526 | 1H-NMR (DMSO-D6) δ: 0.66 (6H t, J = 7.3 Hz), 0.89 (3H, t, J = 7.4 Hz), 1.29 (3H, d, J = 6.3 Hz), 1.33-1.45 (2H, m), 1.54-1.75 (6H, m), 3.14 (3H, s), 4.34 (2H, d, J = 6.4 Hz), 5.27-5.35 (1H, m), 6.91 (1H, d, J = 8.8 Hz), 7.45-7.53 (1H, m), 7.56-7.76 (2H, m), 8.36 (1H, t, J = 6.4 Hz), 8.48 (1H, dd, J = 8.8, 2.3 Hz), 9.08 (1H, d, J = 2.3 Hz), 13.29 (1H, br s). | |
| 104 | | 554 | 552 | 1H-NMR (DMSO-D6) δ: 0.89 (3H, t, J = 7.3 Hz), 1.23-1.45 (2H, m), 1.29 (3H, d, J = 6.0 Hz), 1.51-1.63 (1H, m), 1.54 (3H, s), 1.65-1.75 (1H, m), 3.36 (3H, s), 4.33-4.44 (2H, m), 5.26-5.36 (1H, m), 6.91 (1H, d, J = 8.7 Hz), 7.44-7.49 (1H, m), 7.61 (1H, d, J = 8.4 Hz), 7.66-7.73 (1H, m), 8.48 (1H, dd, J = 8.7, 2.2 Hz), 9.03 (1H, t, J = 6.1 Hz), 9.08 (1H, d, J = 2.2 Hz), 13.29 (1H, br s). | |

TABLE 1-14

| Ex. No. | Structure | MS (M + H) | MS (M − H) | NMR | Note |
|---|---|---|---|---|---|
| 105 | | 502 | 500 | 1H-NMR (DMSO-D6) δ: 0.89 (3H, t, J = 7.3 Hz), 1.15 (6H, d, J = 1.2 Hz), 1.26-1.46 (2H, m), 1.29 (3H, d, J = 6.0 Hz), 1.54-1.74 (2H, m), 4.35 (2H, d, J = 6.4 Hz), 4.40 (2H, d, J = 47.2 Hz), 5.26-5.36 (1H, m), 6.91 (1H, d, J = 8.9 Hz), 7.41-7.48 (1H, m), 7.58-7.71 (2H, m), 8.34 (1H, t, J = 6.4 Hz), 8.48 (1H, dd, J = 8.9, 2.2 Hz), 9.09 (1H, d, J = 2.2 Hz), 13.29 (1H, br s). | |
| 106 | | 542 | 540 | 1H-NMR (DMSO-D6) δ: 0.89 (3H, t, J = 7.3 Hz), 1.21-1.63 (11H, m), 1.29 (3H, d, J = 6.3 Hz), 1.64-1.74 (1H, m), 1.95-2.04 (2H, m), 4.36 (2H, d, J = 47.8 Hz), 4.38 (2H, d, J = 6.0 Hz), 5.26-5.35 (1H, m), 6.90 (1H, d, J = 8.9 Hz), 7.42-7.49 (1H, m), 7.58-7.69 (2H, m), 8.37 (1H, t, J = 6.0 Hz), 8.48 (1H, dd, J = 8.9, 2.2 Hz), 9.08 (1H, d, J = 2.2 Hz), 13.29 (1H, br s). | |
| 107 | | 547 | 545 | 1H-NMR (DMSO-D6) δ: 1.11-1.63 (8H, m), 1.34 (9H, s), 2.35 (2H, d, J = 13.7 Hz), 4.42 (2H, d, J = 6.0 Hz), 7.42-7.50 (2H, m), 7.60 (1H, d, J = 8.5 Hz), 7.66-7.72 (2H, m), 8.15 (1H, d, J = 8.1 Hz), 8.38 (1H, br s), 8.78 (1H, t, J = 5.8 Hz), 13.36 (1H, br s). | |
| 108 | | 549 | 547 | 1H-NMR (DMSO-D6) δ: 1.10-1.36 (4H, m), 1.26 (6H, d, J = 6.9 Hz), 1.48-1.59 (4H, m), 2.12-2.16 (2H, m), 3.33-3.40 (1H, m), 4.39 (2H, d, J = 6.0 Hz), 5.87 (1H, t, J = 56.4 Hz), 7.36-7.39 (1H, m), 7.54 (2H, d, J = 8.5 Hz), 7.62 (1H, d, J = 1.8 Hz), 8.14 (1H, dd, J = 8.5, 2.2 Hz), 8.34 (1H, d, J = 2.2 Hz), 8.50 (1H, t, J = 6.0 Hz), 13.39 (1H, br s). | |
| 109 | | 560 | 558 | 1H-NMR (DMSO-D6) δ: 0.89 (3H, t, J = 7.5 Hz), 1.05-1.44 (7H, m), 1.29 (3H, d, J = 6.0 Hz), 1.47-1.76 (5H, m), 2.14 (2H, d, J = 12.3 Hz), 4.40 (2H, d, J = 5.9 Hz), 5.25-5.37 (1H, m), 5.88 (1H, t, J = 56.4 Hz), 6.87-6.94 (1H, m), 7.41-7.52 (1H, m), 7.53-7.73 (2H, m), 8.48 (1H, dd, J = 8.8, 2.5 Hz), 8.52 (1H, t, J = 5.9 Hz), 9.08 (1H, d, J = 2.5 Hz), 13.30 (1H, br s). | |

TABLE 1-14-continued

| Ex. No. | Structure | MS (M + H) | MS (M − H) | NMR | Note |
|---|---|---|---|---|---|
| 110 | | 546 | 544 | 1H-NMR (DMSO-D6) δ: 0.89 (3H, t, J = 7.4 Hz), 1.23-1.45 (2H, m), 1.29 (3H, d, J = 6.3 Hz), 1.50-1.64 (5H, m), 1.64-1.85 (3H, m), 2.02-2.12 (2H, m), 4.37 (2H, d, J = 6.0 Hz), 5.26-5.36 (1H, m), 6.27 (1H, t, J = 56.7 Hz), 6.91(1H, d, J = 8.9 Hz), 7.41-7.48 (1H, m), 7.56-7.71 (2H, m), 8.47-8.49 (2H, m), 9.08 (1H, d, J = 2.4 Hz), 13.28 (1H, br s). | |
| 111 | | 511 | 509 | 1H-NMR (DMSO-D6) δ: 1.25 (6H, d, J = 6.9 Hz), 1.38-1.51 (10H, m), 1.93-2.04 (2H, m), 2.94-3.05 (1H, m), 4.37 (2H, d, J = 47.5 Hz), 4.37 (2H, d, J = 5.9 Hz), 7.40-7.49 (2H, m), 7.53-7.60 (2H, m), 7.62 (1H, s), 8.15 (1H, d, J = 7.8 Hz), 8.21 (1H, s), 8.29 (1H, t, J = 5.9 Hz), 13.30 (1H, br s). | |
| 112 | | 525 | 523 | 1H-NMR (DMSO-D6) δ: 1.34 (9H, s), 1.40-1.52 (10H, m), 1.94-2.04 (2H, m), 4.37 (2H, d, J = 47.8 Hz), 4.37 (2H, d, J = 6.0 Hz), 7.41-7.45 (1H, m), 7.49 (1H, t, J = 7.8 Hz), 7.59 (1H, d, J = 8.1 Hz), 7.64 (1H, s), 7.70-7.74 (1H, m), 8.15 (1H, d, J = 7.8 Hz), 8.29 (1H, t, J = 6.0 Hz), 8.38 (1H, s), 13.34 (1H, br s). | |

TABLE 1-15

| Ex. No. | Structure | MS (M + H) | MS (M − H) | NMR | Note |
|---|---|---|---|---|---|
| 113 | | 523 | 521 | 1H-NMR (DMSO-D6) δ: 0.80-0.86 (2H, m), 0.87-0.92 (2H, m), 1.39-1.52 (10H, m), 1.43 (3H, s), 1.94-2.02 (2H, m), 4.37 (2H, d, J = 47.8 Hz), 4.37 (2H, d, J = 5.9 Hz), 7.42-7.52 (3H, m), 7.59 (1H, d, J = 8.1 Hz), 7.63 (1H, s), 8.12 (1H, d, J = 7.5 Hz), 8.19 (1H, s), 8.29 (1H, t, J = 5.9 Hz), 3.34 (1H, br s). | |
| 114 | | 545 | 543 | 1H-NMR (DMSO-D6) δ: 1.27 (6H, d, J = 6.9 Hz), 1.39-1.51 (10H, m), 1.94-2.03 (2H, m), 3.34-3.42 (1H, m), 4.36 (2H, d, J = 5.9 Hz), 4.37 (2H, d, J = 47.5 Hz), 7.41-7.45 (1H, m), 7.57-7.65 (3H, m), 8.15 (1H, dd, J = 8.5, 2.2 Hz), 8.29 (1H, t, J = 5.9 Hz), 8.35 (1H, d, J = 2.1 Hz), 13.41 (1H, br s). | |

TABLE 1-15-continued

| Ex. No. | Structure | MS (M + H) | MS (M − H) | NMR | Note |
|---|---|---|---|---|---|
| 115 | | 519 | 517 | 1H-NMR (DMSO-D6) δ; 0.76 (6H, t, J = 7.4 Hz), 1.27 (6H, d, J = 6.9 Hz), 1.49-1.64 (4H, m), 3.34-3.43 (1H, m), 4.35 (2H, d, J = 6.0 Hz), 4.50 (2H, d, J = 47.6 Hz), 7.47 (1H, d, J = 8.1 Hz), 7.60-7.69 (3H, m), 8.16 (1H, d, J = 8.3 Hz), 8.34-8.37 (2H, m), 13.41 (1H, br s). | |
| 116 | | 503 | 501 | 1H-NMR (DMSO-D6) δ: 0.83 (6H, t, J = 7.5 Hz), 1.25 (6H, d, J = 6.9 Hz), 1.71 (4H, q, J = 7.5 Hz), 2.94-3.05 (1H, m), 4.38 (2H, d, J = 5.9 Hz), 6.20 (1H, t, J = 55.5 Hz), 7.45-7.50 (2H, m), 7.55-7.62 (2H, m), 7.68 (1H, s), 8.15 (1H, d, J = 7.6 Hz), 8.22 (1H, s), 8.42 (1H, t, J = 5.9 Hz), 13.32 (1H, br s). | |
| 117 | | 517 | 515 | 1H-NMR (DMSO-D6) δ: 0.83 (6H, t, J = 7.4 Hz), 1.34 (9H, s), 1.71 (4H, q, J = 7.4 Hz), 4.38 (2H, d, J = 5.8 Hz), 6.20 (1H, t, J = 55.4 Hz), 7.46-7.52 (2H, m), 7.61 (1H, d, J = 8.1 Hz), 7.67-7.74 (2H, m), 8.16 (1H, d, J = 7.4 Hz), 8.38-8.43 (2H, m), 13.34 (1H, br s). | |
| 118 | | 515 | 513 | 1H-NMR (DMSO-D6) δ: 0.82-0.85 (8H, m), 0.91 (2H, br s), 1.43 (3H, s), 1.71 (4H, q, J = 7.5 Hz), 4.38 (2H, d, J = 5.8 Hz), 6.20 (1H, t, J = 55.4 Hz), 7.44-7.53 (3H, m), 7.60-7.73 (2H, m), 8.12-8.21 (2H, m), 8.42 (1H, t, J = 5.8 Hz), 13.33 (1H, br s). | |
| 119 | | 537 | 535 | 1H-NMR (DMSO-D6) δ: 0.83 (6H, t, J = 7.4 Hz), 1.27 (6H, d, J = 6.7 Hz), 1.71 (4H, q, J = 7.4 Hz), 3.34-3.43 (1H, m), 4.38 (2H, d, J = 5.8 Hz), 6.20 (1H, t, J = 55.4 Hz), 7.46-7.49 (1H, m), 7.60-7.68 (3H, m), 8.16 (1H, dd, J = 8.4, 2.0 Hz), 8.35 (1H, d, J = 1.8 Hz), 8.42 (1H, t, J = 5.9 Hz), 13.41 (1H, s). | |

TABLE 1-15-continued

| Ex. No. | Structure | MS (M + H) | MS (M − H) | NMR | Note |
|---|---|---|---|---|---|
| 120 | | 529 | 527 | 1H-NMR (DMSO-D6) δ: 1.25 (6H, d, J = 6.9 Hz), 1.35-1.47 (6H, m), 1.51-1.61 (2H, m), 1.65-1.72 (2H, m), 2.10 (2H, dd, J = 14.6, 8.8 Hz), 2.94-3.05 (1H, m), 4.38 (2H, d, J = 5.8 Hz), 6.04 (1H, t, J = 56.3 Hz), 7.41-7.44 (1H, m), 7.46 (1H, t, J = 7.6 Hz), 7.52-7.55 (1H, m), 7.59 (1H, d, J = 8.3 Hz), 7.63-7.63 (1H, m), 8.15 (1H, d, J = 7.9 Hz), 8.21 (1H, s), 8.41 (1H, t, J = 5.8 Hz), 13.32 (1H, br s). | |

TABLE 1-16

| Ex. No. | Structure | MS (M + H) | MS (M − H) | NMR | Note |
|---|---|---|---|---|---|
| 121 | | 543 | 541 | 1H-NMR (DMSO-D6) δ: 1.34 (9H, s), 1.37-1.47 (6H, m), 1.51-1.62 (2H, m), 1.65-1.71 (2H, m), 2.10 (2H, dd, J = 14.7, 8.9 Hz), 4.38 (2H, d, J = 5.8 Hz), 6.04 (1H, t, J = 56.4 Hz), 7.42-7.52 (2H, m), 7.59-7.74 (3H, m), 8.15 (1H, d, J = 7.2 Hz), 8.38-8.42 (2H, m), 13.34 (1H, br s). | |
| 122 | | 541 | 539 | 1H-NMR (DMSO-D6) δ: 0.80-0.83 (2H, m), 0.91 (2H, br s), 1.36-1.48 (6H, m), 1.43 (3H, s), 1.53-1.59 (2H, m), 1.66-1.71 (2H, m), 2.10 (2H, dd, J = 14.8, 8.8 Hz), 4.39 (2H, d, J = 5.8 Hz), 6.04 (1H, t, J = 56.4 Hz), 7.41-7.71 (5H, m), 8.10-8.22 (2H, m), 8.41 (1H, t, J = 5.8 Hz), 13.33 (1H, br s). | |
| 123 | | 548 | 546 | 1H-NMR (DMSO-D6) δ: 0.83 (6H, t, J = 7.7 Hz), 0.89 (3H, t, J = 7.5 Hz), 1.29 (3H, d, J = 6.4 Hz), 1.33-1.46 (2H, m), 1.54-1.63 (1H, m), 1.65-1.74 (5H, m), 4.37 (2H, d, J = 5.7 Hz), 5.25-5.36 (1H, m), 6.21 (1H, t, J = 55.4 Hz), 6.87-6.94 (1H, m), 7.41-7.52 (1H, m), 7.54-7.73 (2H, m), 8.42 (1H, t, J = 5.7 Hz), 8.48 (1H, dd, J = 8.9, 2.4 Hz), 9.08 (1H, d, J = 2.4 Hz), 13.29 (1H, br s). | |

TABLE 1-16-continued

| Ex. No. | Structure | MS (M + H) | MS (M − H) | NMR | Note |
|---|---|---|---|---|---|
| 124 | | 530 | 528 | 1H-NMR (DMSO-D6) δ: 0.76 (6H t, J = 7.5 Hz), 0.89 (3H t, J = 7.3 Hz), 1.29 (3H, d, J = 6.0 Hz), 1.33-1.46 (2H, m), 1.47-1.75 (6H, m), 4.35 (2H, d, J = 6.0 Hz), 4.50 (2H, d, J = 47.8 Hz), 5.26-5.36 (1H, m), 6.88-6.94 (1H, m), 7.44-7.51 (1H, m), 7.55-7.73 (2H, m), 8.36 (1H, t, J = 6.0 Hz), 8.48 (1H, dd, J = 9.0, 2.4 Hz), 9.08 (1H, d, J = 2.4 Hz), 13.29 (1H, br s). | |
| 125 | | 564 | 562 | 1H-NMR (DMSO-D6) δ: 0.89 (3H, t, J = 7.3 Hz), 1.23-1.48 (2H, m), 1.29 (3H, d, J = 6.3 Hz), 1.50-1.75 (6H, m), 1.84-1.92 (2H, m), 2.30-2.38 (2H, m), 4.38 (2H, d, J = 6.0 Hz), 5.27-5.35 (1H, m), 6.91(1H, d, J = 8.9 Hz), 7.39-7.49 (1H, m), 7.52-7.72 (2H, m), 8.48 (1H, dd, J = 8.9, 2.3 Hz), 8.71 (1H, t, J = 6.0 Hz), 9.08 (1H, d, J = 2.3 Hz), 13.29 (1H, br s). | |
| 126 | | 546 | 544 | 1H-NMR (DMSO-D6) δ: 0.89 (3H, t, J = 7.3 Hz), 1.24-1.46 (2H, m), 1.29 (3H, d, J = 6.3 Hz), 1.51-1.64 (5H, m), 1.64-1.84 (3H, m), 2.02-2.13 (2H, m), 4.37 (2H, d, J = 6.0 Hz), 5.26-5.36 (1H, m), 6.26 (1H, t, J = 56.7 Hz), 6.91 (1H, d, J = 8.7 Hz), 7.41-7.48 (1H, m), 7.56-7.71 (2H, m), 8.47-8.49 (2H, m), 9.08 (1H, d, J = 2.4 Hz), 13.29 (1H, br s). | |
| 127 | | 560 | 558 | 1H-NMR (DMSO-D6) δ: 0.89 (3H, t, J = 7.5 Hz), 1.05-1.44 (7H, m), 1.29 (3H, d, J = 6.0 Hz), 1.47-1.76 (5H, m), 2.14 (2H, d, J = 12.3 Hz), 4.40 (2H, d, J = 5.8 Hz), 5.25-5.37 (1H, m), 5.88 (1H, t, J = 56.4 Hz), 6.87-6.94 (1H, m), 7.41-7.52 (1H, m), 7.53-7.73 (2H, m), 8.48 (1H, dd, J = 8.8, 2.5 Hz), 8.52 (1H, t, J = 5.8 Hz), 9.08 (1H, d, J = 2.5 Hz), 13.30 (1H, br s). | |

TABLE 1-16-continued

| Ex. No. | Structure | MS (M + H) | MS (M − H) | NMR | Note |
|---|---|---|---|---|---|
| 128 | | 542 | 540 | 1H-NMR (DMSO-D6) δ: 0.89 (3H, t, J = 7.3 Hz), 1.21-1.63 (11H, m), 1.29 (3H, d, J = 6.3 Hz), 1.64-1.74 (1H, m), 1.95-2.04 (2H, m), 4.36 (2H, d, J = 47.8 Hz), 4.38 (2H, d, J = 6.0 Hz), 5.26-5.35 (1H, m), 6.90 (1H, d, J = 8.9 Hz), 7.42-7.49 (1H, m), 7.58-7.69 (2H, m), 8.37 (1H, t, J = 6.0 Hz), 8.48 (1H, dd, J = 8.9, 2.3 Hz), 9.08 (1H, d, J = 2.3 Hz), 13.29 (1H, br s). | |

TABLE 1-17

| Ex. No. | Structure | MS (M + H) | MS (M − H) | NMR | Note |
|---|---|---|---|---|---|
| 129 | | 556 | 554 | 1H-NMR (DMSO-D6) δ: 0.89 (3H, t, J = 7.5 Hz), 1.24-1.51 (12H, m), 1.29 (3H, d, J = 6.3 Hz), 1.54-1.74 (2H, m), 1.94-2.04 (2H, m), 4.37 (2H, d, J = 5.7 Hz), 4.37 (2H, d, J = 47.8 Hz), 5.26-5.36 (1H, m), 6.87-6.95 (1H, m), 7.41-7.48 (1H, m), 7.55-7.72 (2H, m), 8.29 (1H, t, J = 5.7 Hz), 8.48 (1H, dd, J = 8.7, 2.4 Hz), 9.08 (1H, d, J = 2.4 Hz), 13.29 (1H, br s). | |
| 130 | | 548 | 546 | 1H-NMR (DMSO-D6) δ: 0.83 (6H, t, J = 7.7 Hz), 0.89 (3H, t, J = 7.4 Hz), 1.29 (3H, d, J = 6.3 Hz), 1.33-1.46 (2H, m), 1.54-1.63 (1H, m), 1.65-1.74 (5H, m), 4.37 (2H, d, J = 5.7 Hz), 5.25-5.36 (1H, m), 6.21 (1H, t, J = 55.4 Hz), 6.87-6.94 (1H, m), 7.41-7.52 (1H, m), 7.54-7.73 (2H, m), 8.42 (1H, t, J = 5.7 Hz), 8.48 (1H, dd, J = 8.8, 2.4 Hz), 9.08 (1H, d, J = 2.4 Hz), 13.29 (1H, br s). | |
| 131 | | 530 | 528 | 1H-NMR (DMSO-D6) δ: 0.76 (6H, t, J = 7.5 Hz), 0.89 (3H, t, J = 7.3 Hz), 1.29 (3H, d, J = 6.0 Hz), 1.33-1.45 (2H, m), 1.47-1.74 (6H, m), 4.35 (2H, d, J = 5.9 Hz), 4.50 (2H, d, J = 47.7 Hz), 5.26-5.37 (1H, m), 6.88-6.94 (1H, m), 7.44-7.50 (1H, m), 7.53-7.75 (2H, m), 8.36 (1H, t, J = 5.9 Hz), 8.48 (1H, dd, J = 9.0, 2.4 Hz), 9.08 (1H, d, J = 2.4 Hz), 13.28 (1H, br s). | |

TABLE 1-17-continued

| Ex. No. | Structure | MS (M + H) | MS (M − H) | NMR | Note |
|---|---|---|---|---|---|
| 132 | 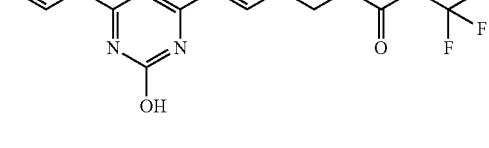 | 523 | 521 | 1H-NMR (DMSO-D6) δ: 0.80 (3H, t, J = 7.3 Hz), 1.25 (6H, d, J = 6.9 Hz), 1.97-2.08 (2H, m), 2.96-3.04 (1H, m), 3.45 (3H, s), 4.38 (2H, d, J = 6.1 Hz), 7.42-7.71 (5H, m), 8.15 (1H, d, J = 7.5 Hz), 8.21 (1H, s), 8.95 (1H, t, J = 6.1 Hz), 13.32 (1H, br s). | 1 |
| 133 | 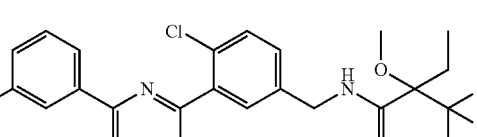 | 537 | 535 | 1H-NMR (DMSO-D6) δ: 0.80 (3H, t, J = 7.5 Hz), 1.34 (9H, s), 1.97-2.08 (2H, m), 3.44 (3H, s), 4.38 (2H, d, J = 6.2 Hz), 7.42-7.75 (5H, m), 8.16 (1H, d, J = 6.9 Hz), 8.38 (1H, br s), 8.94 (1H, t, J = 6.2 Hz), 13.35 (1H, br s). | 1 |
| 134 | 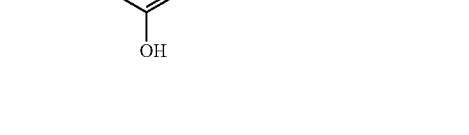 | 523 | 521 | 1H-NMR (DMSO-D6) δ: 0.80 (3H, t, J = 7.3 Hz), 1.25 (6H, d, J = 6.9 Hz), 1.97-2.08 (2H, m), 2.96-3.04 (1H, m), 3.44 (3H, s), 4.38 (2H, d, J = 6.2 Hz), 7.46 (1H, d, J = 8.3 Hz), 7.48 (1H, t, J = 7.5 Hz), 7.56 (1H, d, J = 7.5 Hz), 7.61 (1H, d, J = 8.3 Hz), 7.65-7.69 (1H, m), 8.15 (1H, d, J = 7.5 Hz), 8.21 (1H, s), 8.95 (1H, t, J = 6.2 Hz), 13.32 (1H, br s). | 2 |
| 135 | 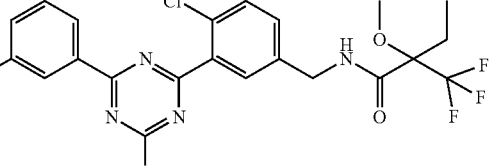 | 537 | 535 | 1H-NMR (DMSO-D6) δ: 0.80 (3H, t, J = 7.3 Hz), 1.34 (9H, s), 1.97-2.08 (2H, m), 3.44 (3H, s), 4.38 (2H, d, J = 6.2 Hz), 7.46 (1H, d, J = 8.6 Hz), 7.49 (1H, t, J = 7.9 Hz), 7.61 (1H, d, J = 8.6 Hz), 7.66-7.71 (1H, m), 7.72 (1H, d, J = 7.9 Hz), 8.15 (1H, d, J = 7.9 Hz), 8.38 (1H, s), 8.94 (1H, t, J = 6.2 Hz), 13.34 (1H, br s). | 2 |
| 136 |  | 535 | 533 | 1H-NMR (DMSO-D6) δ: 0.78-0.94 (7H, m), 1.43 (3H, s), 1.97-2.08 (2H, m), 3.45 (3H, s), 4.38 (2H, d, J = 6.2 Hz), 7.44-7.49 (2H, m), 7.52 (1H, d, J = 8.1 Hz), 7.61 (1H, d, J = 8.1 Hz), 7.65-7.70 (1H, m), 8.13 (1H, d, J = 7.4 Hz), 8.19 (1H, s), 8.95 (1H, t, J = 6.2 Hz), 13.34 (1H, br s). | 2 |

TABLE 1-18

| Ex. No. | Structure | MS (M + H) | MS (M − H) | NMR | Note |
|---|---|---|---|---|---|
| 137 | | 557 | 555 | 1H-NMR (DMSO-D6) δ: 0.80 (3H, t, J = 7.4 Hz), 1.27 (6H, d, J = 6.7 Hz), 1.97-2.08 (2H, m), 3.34-3.42 (1H, m), 3.45 (3H, s), 4.38 (2H, d, J = 6.2 Hz), 7.47 (1H, dd, J = 8.3, 1.8 Hz), 7.61 (1H, d, J = 8.3 Hz), 7.62 (1H, d, J = 8.3 Hz), 7.65-7.69 (1H, m), 8.16 (1H, dd, J = 8.3, 2.0 Hz), 8.35 (1H, d, J = 2.0 Hz), 8.95 (1H, t, J = 6.2 Hz), 13.41 (1H, br s). | 2 |
| 138 | | 535 | 533 | 1H-NMR (DMSO-D6) δ: 0.78-0.94 (7H, m), 1.43 (3H, s), 1.97-2.08 (2H, m), 3.45 (3H, s), 4.38 (2H, d, J = 6.2 Hz), 7.44-7.49 (2H, m), 7.52 (1H, d, J = 8.1 Hz), 7.61 (1H, d, J = 8.1 Hz), 7.65-7.70 (1H, m), 8.13 (1H, d, J = 7.4 Hz), 8.19 (1H, s), 8.95 (1H, t, J = 6.2 Hz), 13.34 (1H, br s). | 1 |
| 139 | | 557 | 555 | 1H-NMR (DMSO-D6) δ: 0.80 (3H, t, J = 7.4 Hz), 1.27 (6H, d, J = 6.7 Hz), 1.97-2.08 (2H, m), 3.34-3.42 (1H, m), 3.45 (3H, s), 4.38 (2H, d, J = 6.2 Hz), 7.47 (1H, dd, J = 8.3, 1.8 Hz), 7.61 (1H, d, J = 8.3 Hz), 7.62 (1H, d, J = 8.3 Hz), 7.65-7.69 (1H, m), 8.16 (1H, dd, J = 8.3, 2.0 Hz), 8.35 (1H, d, J = 2.0 Hz), 8.95 (1H, t, J = 6.2 Hz), 13.41 (1H, br s). | 1 |
| 140 | | 564 | 562 | 1H-NMR (DMSO-D6) δ: 0.89 (3H, t, J = 7.3 Hz), 1.21-1.47 (2H, m), 1.29 (3H, d, J = 6.2 Hz), 1.50-1.75 (6H, m), 1.82-1.93 (2H, m), 2.30-2.39 (2H, m), 4.38 (2H, d, J = 5.9 Hz), 5.27-5.35 (1H, m), 6.91 (1H, d, J = 8.8 Hz), 7.39-7.49 (1H, m), 7.52-7.72 (2H, m), 8.48 (1H, dd, J = 8.9, 2.3 Hz), 8.71 (1H, t, J = 5.9 Hz), 9.08 (1H, d, J = 2.3 Hz), 13.28 (1H, br s). | |
| 141 | | 556 | 554 | 1H-NMR (DMSO-D6) δ: 0.89 (3H, t, J = 7.5 Hz), 1.24-1.51 (12H, m), 1.29 (3H, d, J = 6.3 Hz), 1.54-1.74 (2H, m), 1.94-2.04 (2H, m), 4.37 (2H, d, J = 5.7 Hz), 4.37 (2H, d, J = 47.8 Hz), 5.26-5.36 (1H, m), 6.87-6.95 (1H, m), 7.41-7.48 (1H, m), 7.55-7.72 (2H, m), 8.29 (1H, t, J = 5.7 Hz), 8.48 (1H, dd, J = 8.7, 2.4 Hz), 9.08 (1H, d, J = 2.4 Hz), 13.29 (1H, br s). | |

TABLE 1-18-continued

| Ex. No. | Structure | MS (M + H) | MS (M − H) | NMR | Note |
|---|---|---|---|---|---|
| 142 | | 568 | 566 | 1H-NMR (DMSO-D6) δ: 0.81 (3H, t, J = 7.3 Hz), 0.89 (3H, t, J = 7.3 Hz), 1.23-1.45 (2H, m), 1.29 (3H, d, J = 6.2 Hz), 1.53-1.75 (2H, m), 1.95-2.10 (2H, m), 3.45 (3H, s), 4.38 (2H, d, J = 6.2 Hz), 5.27-5.35 (1H, m), 6.91 (1H, d, J = 8.8 Hz), 7.42-7.50 (1H, m), 7.58-7.74 (2H, m), 8.48 (1H, dd, J = 8.8, 2.3 Hz), 8.95 (1H, t, J = 6.2 Hz), 9.08 (1H, d, J = 2.3 Hz), 13.29 (1H, br s). | 2 |
| 143 | | 568 | 566 | 1H-NMR (DMSO-D6) δ: 0.81 (3H, t, J = 7.3 Hz), 0.89 (3H, t, J = 7.3 Hz), 1.24-1.45 (2H, m), 1.29 (3H, d, J = 6.2 Hz), 1.54-1.75 (2H, m), 1.96-2.09 (2H, m), 3.45 (3H, s), 4.38 (2H, d, J = 6.0 Hz), 5.27-5.36 (1H, m), 6.91 (1H, d, J = 8.8 Hz), 7.42-7.50 (1H, m), 7.58-7.74 (2H, m), 8.48 (1H, dd, J = 8.8, 2.3 Hz), 8.95 (1H, t, J = 6.0 Hz), 9.08 (1H, d, J = 2.3 Hz), 13.29 (1H, br s). | 1 |
| 144 | | 568 | 566 | 1H-NMR (DMSO-D6) δ: 0.81 (3H, t, J = 7.4 Hz), 0.89 (3H, t, J = 7.3 Hz), 1.24-1.45 (2H, m), 1.29 (3H, d, J = 6.2 Hz), 1.54-1.75 (2H, m), 1.96-2.09 (2H, m), 3.45 (3H, s), 4.38 (2H, d, J = 6.1 Hz), 5.27-5.36 (1H, m), 6.91 (1H, d, J = 8.8 Hz), 7.42-7.50 (1H, m), 7.58-7.74 (2H, m), 8.48 (1H, dd, J = 8.8, 2.3 Hz), 8.95 (1H, t, J = 6.1 Hz), 9.08 (1H, d, J = 2.3 Hz), 13.29 (1H, br s). | 2 |

| Ex. No. | Structure | MS (M + H) | MS (M − H) | NMR | Note |
|---|---|---|---|---|---|
| 145 | | 568 | 566 | 1H-NMR (DMSO-D6) δ: 0.81 (3H, t, J = 7.3 Hz), 0.89 (3H, t, J = 7.3 Hz), 1.23-1.46 (2H, m), 1.29 (3H, d, J = 6.1 Hz), 1.53-1.75 (2H, m), 1.95-2.10 (2H, m), 3.45 (3H, s), 4.38 (2H, d, J = 6.1 Hz), 5.27-5.35 (1H, m), 6.91 (1H, d, J = 8.8 Hz), 7.42-7.50 (1H, m), 7.58-7.74 (2H, m), 8.48 (1H, dd, J = 8.8, 2.3 Hz), 8.95 (1H, t, J = 6.1 Hz), 9.08 (1H, d, J = 2.3 Hz), 13.28 (1H, br s). | 1 |

Experimental Example 1: Evaluation of Human mPGES-1 Enzyme Inhibitory Activity The human mPGES-1 enzyme inhibitory activity of a test article was evaluated according to the report of Xu et al. (XU, D et al. MF63 [2-(6-chloro-1H-phenanthro[9,10-d]imidazol-2-yl)-isophthalonitrile], a selective microsomal prostaglandin E synthase-1 inhibitor relieves pyresis and pain in preclinical models of inflammation. J Pharmacol Exp Ther. September 2008, Vol. 326, No. 3, pages 754-763). The amount of PGE2 produced by human mPGES-1 in the presence of a test article was measured by the HTRF (homogeneous time resolved fluorescence) method, and the human mPGES-1 enzyme inhibitory activity of the test article was determined.

1) Preparation of Human mPGES-1 Expressing Cell Microsome Fraction

A DNA fragment containing human mPGES-1, which is added with a BamHI recognition cleavage sequence just before the translation initiation codon and an EcoRI recognition cleavage sequence just after the translation termination codon, was amplified by the PCR (Polymerase Chain Reaction) method using a human mPGES-1 expression plasmid DNA (pME-18S/iPGES-1) prepared in-house as a template. The purified DNA fragment was digested with BamHI and EcoRI, and ligated to pcDNA3.1(+) (Invitrogen, model number V790-20), similarly_digested with BamHI and EcoRI, by using a DNA Ligation kit ver. 2.1 (Takara Bio, model number 6022). The human mPGES-1 expression plasmid DNA was isolated from *Escherichia coli* DH5a (TOYOBO, model number DNA-903) transformed with the obtained ligation product. The base sequence of human mPGES-1 cloned to a vector was determined by the Dye Terminator method using BigDye Terminator v3.1 Cycle Sequencing Kit (Applied Biosystems, #4337455). The determined sequence was identical with the sequence of the protein translational region of human mPGES-1 (Accession number NM 004878) registered in the NCBI Reference Database.

Human mPGES-1 expression plasmid DNA was transfected into Chinese hamster ovary-derived cells (FreeStyle CHO-S Cell, Invitrogen, #R$^{800}$-07) by using a transgene reagent (FreeStyle MAX Reagent (Invitrogen, #16447-100)), and cultured with shaking (8% $CO_2$, 37° C.) in a medium containing 8 mmol/L L-glutamine (GIBCO FreeStyle CHO Expression Medium, Invitrogen, #12651-022) for 48 hr.

The CHO-S cells were suspended in Homogenate Buffer (100 mmol/L potassium phosphate (pH 7.4), 250 mmol/L Sucrose, 100 mmol/L EDTA, complete EDTA free (Roche, #1873580)). Using an ultrasonic disruptor UD-201 (Tomy Seiko), the suspended cells were disrupted at output:3, duty cycle:50 for 30 seconds. The precipitate was removed by centrifugation (1,000×g, 5 min, 4° C.), and the supernatant was centrifuged (5,000×g, 10 min, 4° C.). The supernatant was further centrifuged (105,000×g, 60 min, 4° C.). The obtained precipitate was suspended in Resuspension Buffer (100 mmol/L potassium phosphate (pH 7.4), 250 mmol/L sucrose, 100 mmol/L EDTA, 10% glycerol) to give a microsome fraction.

The protein concentration of the microsome fraction was measured by the Bradford method (Protein Assay Kit, Bio-Rad). The microsome fraction was rapidly frozen in liquid nitrogen and preserved at −80° C. Human mPGES-1 in the microsome fraction was detected by Western Blot using rabbit anti-mPGES-1 polyclonal antibody (ThermoFisher Scientific, #PA1-10264).

2) Evaluation of Human mPGES-1 Enzyme Inhibitory Activity

A test article solution diluted with 0.1 mol/L potassium phosphate, pH 7.4 (hereinafter to be referred to as KPB) or DMSO (Nacalai Tesque, #13407-45) was added at 5 μL/well to 96 well V-bottom plate (Corning, #3363). The final DMSO concentration during the reaction was set to 2%(v/v). Furthermore, a microsome fraction of CHO-S cells expressing human mPGES-1, which was diluted with reduced GSH (12.5 mmol/L KPB solution, SIGMA, #G6529-25G) such that the protein concentration was 5 μg/mL, was added at 20 μL/well. The amount of the microsome fraction used is within a range where the amount of PGE2 produced under the reaction conditions shown below and the 5 amount of microsome fraction used show linearity. To the blank was added reduced GSH (12.5 mmol/L KPB solution) at 20 μL/well. After stirring at room temperature for 10 min, PGH2 (PGH2 dissolved in cold acetone to 100 μg/mL and diluted with D-PBS(−) (Nikken biomedical laboratory, #CM6201) to 10 pig/mL, Cayman Chemical, #17020) was added at 25 μL/well, and the mixture was stood at room temperature for 45 seconds. Tin(II) chloride dihydrate (2 mg/mL 10 mmol/L citric acid solution, Wako Pure Chemical Industries, Ltd., #204-01562) was added at 50 μL/well, and the plate was gently shaken to terminate the enzyme is reaction.

The concentration of PGE2 in the above-mentioned enzyme reaction mixture was measured using Prostaglandin E2 assay (CISbio Bioassays, #62P2APEC) according to the manual. As the reference standard for analytical curve, PGE2 (Cayman Chemical, #14010) was used. Using EnVision 2104 (Perkin Elmer), the time-resolved fluorescence at 620 nm and 665 nm relative to the excitation light at 337 nm was measured. PGE2 concentration was extrapolated from the PGE2 analytical curve. Average of the PGE2 concentrations of the respectively-treated wells was used as the data.

The mPGES-1 enzyme inhibitory activity (%) of the test article was calculated according to the following Formula 1.

$$\text{mPGES-1 enzyme inhibitory activity}(\%) = (PGE2_A - PGE2_X)/(PGE2_A - PGE2_B) \times 100 \quad \text{[Formula 1]}$$

$PGE2_A$: PGE2 concentration of vehicle-treated well
$PGE2_B$: PGE2 concentration of blank well
$PGE2_X$: PGE2 concentration of test article-treated well The $IC_{50}$ value (50% inhibitory concentration) of the test article was calculated according to the following Formula 2.

$$IC_{50} \text{ value} = 10^{\{\log 10(D/E) \times (50 - G)/(F - G) + \log 10(E)\}} \quad \text{[Formula 2]}$$

D: concentration of test article that shows activity of not less than 0.50% inhibition between two points across 50% inhibition
E: concentration of test article that shows activity of not more than 50% inhibition between two points across 50% inhibition
F: mPGES-1 enzyme inhibitory activity (%) when concentration of test article is D
G: mPGES-1 enzyme inhibitory activity (%) when concentration of test article is E The results are shown in Table 2-1 to Table 2-5.

TABLE 2-1

| Example No. | humans mPGES-1 enzyme inhibitory activity (nM) |
|---|---|
| 1 | 0.9 |
| 2 | 1.1 |
| 3 | 2.1 |
| 4 | 12 |
| 5 | 1.1 |
| 6 | 0.4 |
| 7 | 1.0 |
| 8 | 0.7 |
| 9 | 0.7 |
| 10 | 1.7 |
| 11 | 0.2 |
| 12 | 3.2 |
| 13 | 21 |
| 14 | 1.2 |
| 15 | 0.5 |
| 16 | 0.4 |
| 17 | 67 |
| 18 | 5.3 |
| 19 | 3.3 |
| 20 | 30 |
| 21 | 3.9 |
| 22 | 0.9 |
| 23 | 7.2 |
| 24 | 1.6 |
| 25 | 3.1 |
| 26 | 0.7 |
| 27 | 0.7 |
| 28 | 1.8 |
| 29 | 0.8 |
| 30 | 0.8 |

TABLE 2-2

| Example No. | humans mPGES-1 enzyme inhibitory activity (nM) |
|---|---|
| 31 | 1.0 |
| 32 | 0.7 |
| 33 | 0.8 |
| 34 | 1.6 |
| 35 | 2.0 |
| 36 | 5.8 |
| 37 | 3.0 |
| 38 | 2.9 |
| 39 | 3.9 |
| 40 | 0.8 |
| 41 | 1.3 |
| 42 | 1.3 |
| 43 | 3.5 |
| 44 | 3.6 |
| 45 | 1.3 |
| 46 | 3.2 |
| 47 | 2.1 |
| 48 | 0.5 |
| 49 | 0.5 |
| 50 | 0.5 |
| 51 | 0.6 |
| 52 | 1.1 |
| 53 | 0.4 |
| 54 | 0.5 |
| 55 | 1.9 |
| 56 | 0.7 |
| 57 | 2.9 |
| 58 | 1.0 |
| 59 | 0.3 |
| 60 | 0.4 |

TABLE 2-3

| Example No. | humans mPGES-1 enzyme inhibitory activity (nM) |
|---|---|
| 61 | 0.5 |
| 62 | 1.0 |
| 63 | 1.7 |
| 64 | 1.6 |
| 65 | 1.1 |
| 66 | 0.7 |
| 67 | 2.8 |
| 68 | 0.6 |
| 69 | 2.3 |
| 70 | 1.5 |
| 71 | 0.7 |
| 72 | 5.3 |
| 73 | 4.2 |
| 74 | 1.3 |
| 75 | 1.8 |
| 76 | 1.3 |
| 77 | 0.8 |
| 78 | 1.2 |
| 79 | 4.6 |
| 80 | 2.7 |
| 81 | 2.1 |
| 82 | 7.2 |
| 83 | 5.0 |
| 84 | 2.0 |
| 85 | 4.9 |
| 86 | 1.8 |
| 87 | 5.2 |
| 88 | 19 |
| 89 | 3.7 |
| 90 | 2.1 |

TABLE 2-4

| Example No. | humans mPGES-1 enzyme inhibitory activity (nM) |
|---|---|
| 91 | 4.6 |
| 92 | 0.5 |
| 93 | 1.3 |
| 94 | 1.0 |
| 95 | 1.9 |
| 96 | 0.8 |
| 97 | 3.8 |
| 98 | 1.2 |
| 99 | 1.7 |
| 100 | 0.9 |
| 101 | 2.1 |
| 102 | 1.1 |
| 103 | 2.4 |
| 104 | 5.4 |
| 105 | 1.5 |
| 106 | 3.6 |
| 107 | 2.6 |
| 108 | 2.4 |
| 109 | 3.2 |
| 110 | 3.7 |
| 111 | 1.5 |
| 112 | 3.3 |
| 113 | 1.8 |
| 114 | 3.1 |
| 115 | 1.3 |
| 116 | 1.2 |
| 117 | 1.6 |
| 118 | 0.4 |
| 119 | 1.8 |
| 120 | 1.8 |

TABLE 2-5

| Example No. | humans mPGES-1 enzyme inhibitory activity (nM) |
|---|---|
| 121 | 3.3 |
| 122 | 1.8 |
| 123 | 4.0 |
| 124 | 2.6 |
| 125 | 6.0 |
| 126 | 3.1 |
| 127 | 2.4 |
| 128 | 2.2 |
| 129 | 5.7 |
| 130 | 3.8 |
| 131 | 2.9 |
| 132 | 0.8 |
| 133 | 1.4 |
| 134 | 1.7 |
| 135 | 2.0 |
| 136 | 1.2 |
| 137 | 4.7 |
| 138 | 1.5 |
| 139 | 5.4 |
| 140 | 10 |
| 141 | 14 |
| 142 | 7.7 |
| 143 | 3.9 |
| 144 | 3.9 |
| 145 | 4.5 |

Experimental Example 2: Evaluation of PGE2 Production Inhibitory Action Using A549 Cell A549 cell (Japan Health Sciences Foundation Research Resources Bank), which is cell line derived from humans lung cancer, was suspended in assay medium (Ham's F-12K (Wako, #080-08565) containing 2% FBS (Hyclone Laboratories, #SH30910.03), 100 units/mL penicillin and 100 µg/mL streptomycin (Invitrogen, #15140-122)), the suspension was added at $2.5 \times 10^4$ cells/100 µL/well to 96 well flat-bottom plate (Corning, #353072), and the plate was left standing for 20 hr in a $CO_2$ incubator set at 37° C. The test article was serially diluted with DMSO (Nacalai Tesque, #13407-45), and then 20-fold diluted with the assay medium to prepare a test article solution having a ten-fold concentration of the final concentration. The final DMSO concentration during the reaction was set to 0.5% (v/v). The medium was removed from the plate in which the cell was added, new assay medium was added at 160 µL/well to the plate, and the plate was left standing for 10 min in a $CO_2$ incubator. Then, the test article solution was added at 20 µL/well to the plate, and the plate was left standing for 30 min in a $CO_2$ incubator. Next, recombinant humans IL-1β (R&D Systems, #201-LB) as a stimulant to enhance PGE2 production due to increase of mPGES-1 mRNA expression was added at 20 µL/well (the final concentration was 1 ng/mL) to the plate, and the plate was left standing for 18 hr in a $CO_2$ incubator. The supernatant was collected at 180 µL/well, and the PGE2 concentration was measured using Prostaglandin E2 assay (CISbio Bioassays, #62P2APEC) according to the manual. As the reference standard for analytical curve, PGE2 (Cayman Chemical, #14010) was used. Using EnVision 2104 (Perkin Elmer), the time-resolved fluorescence at 620 nm and 665 nm relative to the excitation light at 337 nm was measured. PGE2 concentration was extrapolated from the PGE2 analytical curve. Average of the PGE2 concentrations of the respectively-treated wells was used as the data.

The PGE2 production inhibitory activity (%) of the test article was calculated according to the following Formula 3.

$$\text{PGE2 production inhibitory activity}(\%) = (PGE2_A - PGE2_X)/(PGE2_A - PGE2_B) \times 100 \quad \text{[Formula 3]}$$

$PGE2_A$: PGE2 concentration of vehicle-treated well
$PGE2_B$: PGE2 concentration of blank well (no addition of recombinant humans IL-1B)
$PGE2_X$: PGE2 concentration of test article-treated well The $IC_{50}$ value (50% inhibitory concentration) of the test article was calculated according to the following Formula 4

$$IC_{50} \text{ value} = 10^{\{log\ 10(D/E) \times (50-G)/(F-G) + log\ 10(E)\}} \quad \text{[Formula 4]}$$

D: concentration of test article that shows activity of not less than 50% inhibition between two points across 50% inhibition
E: concentration of test article that shows activity of not more than 50% inhibition between two points across 50% inhibition
F: PGE2 production inhibitory activity (%) when concentration of test article is D
G: PGE2 production inhibitory activity (%) when concentration of test article is E The results are shown in Table 3-1 to Table 3-5.

TABLE 3-1

| Example No. | cell PGE2 production inhibitory activity (µM) |
|---|---|
| 1 | 0.027 |
| 2 | 0.0086 |
| 3 | 0.027 |
| 4 | 0.0029 |
| 5 | 0.030 |
| 6 | 0.023 |
| 7 | 0.068 |
| 8 | 0.014 |
| 9 | 0.037 |
| 10 | 0.049 |
| 11 | 0.017 |
| 12 | 0.35 |
| 13 | 1.0 |
| 14 | 0.0047 |
| 15 | 0.12 |
| 16 | 0.034 |
| 17 | 1.3 |
| 18 | 0.26 |
| 19 | 0.0017 |
| 20 | 0.15 |
| 21 | 0.0022 |
| 22 | 0.016 |
| 23 | 0.0024 |
| 24 | 0.0082 |
| 25 | 0.0029 |
| 26 | 0.26 |
| 27 | 0.079 |
| 28 | 0.1 |
| 29 | 0.069 |
| 30 | 0.033 |

TABLE 3-2

| Example No. | cell PGE2 production inhibitory activity (µM) |
|---|---|
| 31 | 0.086 |
| 32 | 0.040 |
| 33 | 0.011 |
| 34 | 1.0 |
| 35 | 0.014 |
| 36 | 0.010 |
| 37 | 0.17 |
| 38 | 0.13 |

TABLE 3-2-continued

| Example No. | cell PGE2 production inhibitory activity (μM) |
|---|---|
| 39 | 0.057 |
| 40 | 0.045 |
| 41 | 0.023 |
| 42 | 0.0079 |
| 43 | 0.0065 |
| 44 | 0.026 |
| 45 | 0.0080 |
| 46 | 0.0041 |
| 47 | 0.10 |
| 48 | 0.0027 |
| 49 | 0.0073 |
| 50 | 0.17 |
| 51 | 0.41 |
| 52 | 0.0060 |
| 53 | 0.0037 |
| 54 | 0.0029 |
| 55 | 0.0026 |
| 56 | 0.0026 |
| 57 | 0.0045 |
| 58 | 0.15 |
| 59 | 0.053 |
| 60 | 0.0083 |

TABLE 3-3

| Example No. | cell PGE2 production inhibitory activity (μM) |
|---|---|
| 61 | 0.079 |
| 62 | 0.050 |
| 63 | 0.014 |
| 64 | 0.0053 |
| 65 | 0.0097 |
| 66 | 0.0038 |
| 67 | 0.0039 |
| 68 | 0.011 |
| 69 | 0.0081 |
| 70 | 0.056 |
| 71 | 0.0034 |
| 72 | 0.0059 |
| 73 | >0.03 (47%) |
| 74 | 0.029 |
| 75 | 0.032 |
| 76 | 0.088 |
| 77 | 0.044 |
| 78 | 0.0092 |
| 79 | 0.0026 |
| 80 | 0.0020 |
| 81 | 0.0050 |
| 82 | 0.0022 |
| 83 | 0.0027 |
| 84 | 0.0060 |
| 85 | 0.0035 |
| 86 | 0.0021 |
| 87 | 0.0029 |
| 88 | 0.0016 |
| 89 | 0.0025 |
| 90 | 0.0039 |

TABLE 3-4

| Example No. | cell PGE2 production inhibitory activity (μM) |
|---|---|
| 91 | 0.0040 |
| 92 | 0.090 |
| 93 | 0.030 |
| 94 | 0.059 |
| 95 | 0.017 |
| 96 | 0.061 |
| 97 | 0.0090 |
| 98 | 0.043 |

TABLE 3-4-continued

| Example No. | cell PGE2 production inhibitory activity (μM) |
|---|---|
| 99 | 0.011 |
| 100 | 0.043 |
| 101 | 0.0079 |
| 102 | 0.025 |
| 103 | 0.0065 |
| 104 | 0.0049 |
| 105 | 0.015 |
| 106 | 0.0050 |
| 107 | 0.0021 |
| 108 | 0.0024 |
| 109 | 0.0018 |
| 110 | 0.0027 |
| 111 | 0.054 |
| 112 | 0.024 |
| 113 | 0.095 |
| 114 | 0.013 |
| 115 | 0.0066 |
| 116 | 0.0072 |
| 117 | 0.0042 |
| 118 | 0.017 |
| 119 | 0.0030 |
| 120 | >0.03 (43%) |

TABLE 3-5

| Example No. | cell PGE2 production inhibitory activity (μM) |
|---|---|
| 121 | 0.0079 |
| 122 | 0.019 |
| 123 | 0.0015 |
| 124 | 0.0025 |
| 125 | 0.0016 |
| 126 | 0.0025 |
| 127 | 0.0009 |
| 128 | 0.0013 |
| 129 | 0.0022 |
| 130 | 0.0012 |
| 131 | 0.0019 |
| 132 | 0.0048 |
| 133 | 0.0024 |
| 134 | 0.019 |
| 135 | 0.0054 |
| 136 | 0.010 |
| 137 | 0.0026 |
| 138 | 0.0084 |
| 139 | 0.0021 |
| 140 | 0.0008 |
| 141 | 0.0038 |
| 142 | 0.0021 |
| 143 | 0.0016 |
| 144 | 0.0016 |
| 145 | 0.0017 |

Experimental Example 3: Evaluation of Effect on Prostaglandin Composition in Cynomolgus Monkey Aqueous Humor A test article is dissolved in saline containing 0.5% polysorbate 80 (Fluka) to prepare an ophthalmic solution (pH 7.0-8.0). Before instillation of the ophthalmic solution of test article, male Cynomolgus monkey is anesthetized with Escain (registered trade mark) inhalation anesthetics (Pfizer Inc., general name: isoflurane), the cornea of the both eyes is punctured with a 30G injection needle connected to silicone catheter tube, and the aqueous humor is collected. Immediately after collection of the aqueous humor, vehicle or the ophthalmic solution is administered once to the Cynomolgus monkey by instillation (30 μL per one eye) using a micropipette, and the lacrimal part is lightly fixed by gently pressing the lower s eyelid for about 15 seconds. After 5 min, Lipopolysaccharide (LPS) is administered to the anterior chamber, and the aqueous humor is collected under anesthesia. The opposite eye is treated in the same manner. The concentration of prostaglandins in the aqueous humor is measured by the LC/MS/MS system (Ultra high performance liquid chromatography: Nexera (registered trademark) manufactured by Shimadzu Corporation, mass spectrometer: QTRAP (registered trademark) 5500 manufactured by AB SCIEX), and the concentration ratio of each prostaglandin concentration relative to the total of all prostaglandin concentrations is calculated.

Experimental Example 4: Evaluation of Action of mPGES-1 Inhibitor on Normal Intraocular Pressure of Cynomolgus Monkey This test is performed using male Cynomolgus monkey.
To exclude the influence of the remaining test article, a 1-week washout period is set between tests. On the day of test, the monkeys are fed after the final measurement.

A test article is dissolved in saline containing 0.5% polysorbate 80 (Fluka) to prepare an ophthalmic solution. To the vehicle group is administered a vehicle (0.5% polysorbate-containing saline) by a method similar to that for the test article. As a reference article, Xalatan (registered trademark) ophthalmic solution 0.005% (Pfizer Inc., general name: latanoprost) is used. Test article is administered once by instillation (30 μL per one eye) using a micropipette. Each of vehicle and reference article is administered once by instillation. After instillation, the lacrimal part is lightly fixed by gently pressing the lower eyelid for about 15 seconds. The opposite eye is treated in the same manner. The intraocular pressure is measured immediately before administration, and 2, 4, 8, 12 and 24 hr after administration. Before measurement of the intraocular pressure, the animal is fixed on a monkey chair, and topically anesthetized by instillation of an ophthalmic surface anesthetic (Benoxyl (registered trademark) ophthalmic solution 0.4%, Santen Pharmaceutical Co., Ltd., general name: oxybuprocaine hydrochloride). A lid rectactor (Handaya Co., Ltd.) is set, and the intraocular pressure of the both eyes is measured using a pneumatic applanation tonometer (Model30 Classic, Reichert Inc.).

An intraocular pressure difference (AmmHg: in first decimal place) from the value immediately before administration is determined for each measurement eye at each measurement time point, an average of the both eyes is calculated and taken as the evaluation data of the individual. The mean and standard deviation (in second decimal place) of the intraocular pressure difference is calculated for each group.

Experimental Example 5: Measurement of Solubility (1) Saturated Britton-Robinson Buffer Solution (pH 8.5)
The test article was weighted in glass microtube, and dispersed in Britton-Robinson buffer solution (pH 8.5, 1.5 mL) to prepare a suspension. The suspension was shaked at 20° C. for 18 hr, and filtered through a membrane filter (0.45 μm), and the filtrate was used as a sample.
(2) Britton-Robinson Buffer Solution (pH 8.5) Containing 0.5 W/V % Polysorbate 80
The test article was weighted in glass microtube, and dispersed in Britton-Robinson buffer solution (pH 8.5, 1.5 mL) containing 0.5 W/V % polysorbate 80 to prepare a suspension. The suspension was shaked at 20° C. for 18 hr, and filtered through a membrane filter (0.45 μm), and the filtrate was used as a sample.
(3) Preparation of Standard Solution and Sample Solution, and Measurement of Solubility Sample solution was prepared by appropriately diluting sample with a mixture of water/acetonitrile (1:1). Standard solution was prepared by precisely weighting the test article, and then diluting the test article with a mixture of water/acetonitrile (1:1). The standard solution and sample solution were analyzed by liquid chromatography, and the test article content of the sample solution was calculated according to external standard method, based on which the solubility was determined.

The results are shown in Table 4.

TABLE 4

| Example No. | 0.5% polysorbate 80 solubility (%) at pH 8.5 |
| --- | --- |
| 66 | 0.136 |
| 71 | 0.057 |
| 79 | 0.157 |
| 81 | 0.071 |
| 107 | 0.032 |
| 131 | 0.109 |

The Formulation Examples of the present invention include the following formulations. However, the present invention is not limited by such Formulation Examples.

Formulation Example 1 (Production of Capsule)

| 1) compound of Example No. 48 | 30 mg |
| --- | --- |
| 2) microcrystalline cellulose | 10 mg |
| 3) lactose | 19 mg |
| 4) magnesium stearate | 1 mg |

1), 2), 3) and 4) are mixed and filled in a gelatin capsule.

Formulation Example 2 (Production of Tablet)

| 1) compound of Example No. 48 | 10 g |
| --- | --- |
| 2) lactose | 50 g |
| 3) cornstarch | 15 g |
| 4) carmellose calcium | 44 g |
| 5) magnesium stearate | 1 g |

The total amount of 1), 2), 3) and 30 g of 4) are kneaded with water, vacuum dried and sieved. The sieved powder is mixed with 14 g of 4) and 1 g of 5), and the mixture is tableted by a tableting machine. In this way, 1000 tablets containing 10 mg of the compound of Example No. 48 per tablet are obtained.

Formulation Example 3 (Production of Eye Drop)

in 100 mL of eye drop

| 1) compound of Example No. 48 | 100 mg |
| --- | --- |
| 2) polysorbate 80 | 500 mg |
| 3) sodium chloride | 900 mg |
| 4) sodium hydroxide | q.s. |
| 5) sterilized purified water | q.s. |

The above components are aseptically blended to pH 7.9-8.1 to give an eye drop.

Formulation Example 4 (Production of Eye Drop)

in 100 mL of eye drop

| | |
|---|---|
| 1) compound of Example No. 48 | 100 mg |
| 2) polysorbate 80 | 100 mg |
| 3) sodium dihydrogen phosphate dihydrate | 100 mg |
| 4) sodium chloride | 900 mg |
| 5) benzalkonium chloride | 5 mg |
| 6) sodium hydroxide | q.s. |
| 7) sterilized purified water | q.s. |

The above components are aseptically blended to pH 7.9-8.1 to give an eye drop.

Formulation Example 5 (Production of Eye Drop)
in 100 mL of eye drop

| | |
|---|---|
| 1) compound of Example No. 48 | 100 mg |
| 2) boric acid | 700 mg |
| 3) borax | q.s. |
| 4) sodium chloride | 500 mg |
| 5) sodium edetate | 0.05 mg |
| 6) benzalkonium chloride | 0.0005 mg |
| 7) sterilized purified water | q.s. |

The above components are aseptically blended to pH 7.9-8.1 to give an eye drop.

INDUSTRIAL APPLICABILITY

Since the compound of the present invention and a pharmaceutically acceptable salt thereof have an mPGES-1 inhibitory activity, they can afford a medicament effective for the prophylaxis or treatment of pain, rheumatism, osteoarthritis, fever, Alzheimer's disease, multiple sclerosis, arteriosclerosis, glaucoma, ocular hypertension, ischemic retinal disease, systemic scleroderma, cancer including colorectal cancer and/or diseases for which suppression of PGE2 production is effective.

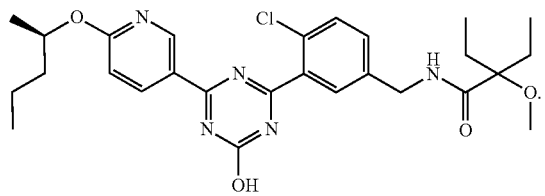 [SMILES: CCC[C@@H](C)Oc1ccc(-c2nc(O)nc(-c3cc(CNC(=O)C(CC)(CC)OC)ccc3Cl)n2)cn1]

The invention claimed is:

1. A compound of the formula [I-c], or a pharmaceutically acceptable salt thereof:

[I-c]

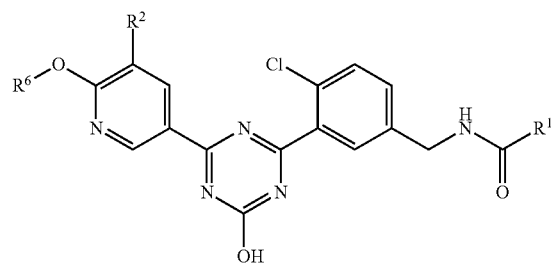

wherein
R is
(1) the formula:

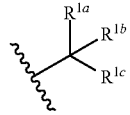

wherein
$R^{1a}$ is $C_{1-4}$ alkyl,
$R^{1b}$ is $C_{1-4}$ alkyl or trifluoromethyl, and
$R^{1c}$ is
(a) $C_{1-4}$ alkyl,
(b) $C_{1-4}$ fluoroalkyl,
(c) $C_{1-4}$ alkoxy, or
(d) $C_{1-4}$ alkoxy $C_{1-4}$ alkyl, or
(2) the formula:

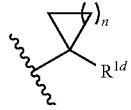

wherein
n is 1, 2, 3, 4 or 5, and
$R^{1d}$ is
(a) fluoro,
(b) $C_{1-4}$ alkyl,
(c) $C_{1-4}$ fluoroalkyl,
(d) $C_{1-4}$ alkoxy, or
(e) $C_{1-4}$ alkoxy $C_{1-4}$ alkyl,
$R^2$ is hydrogen, and
$R^6$ is 1-methylbutyl or n-hexyl.

2. The compound or pharmaceutically acceptable salt according to claim 1, wherein $R^1$ is the formula:

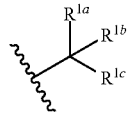

wherein
$R^{1a}$ is $C_{1-4}$ alkyl,
$R^{1b}$ is $C_{1-4}$ alkyl or trifluoromethyl, and
$R^{1c}$ is
(b) difluoromethyl or trifluoromethyl, or
(c) methoxy.

3. The compound or pharmaceutically acceptable salt according to claim 1, wherein $R^1$ is the formula:

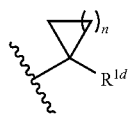

wherein
n is 3, 4 or 5, and
$R^{1d}$ is
(a) fluoro,
(c) $C_{1-4}$ fluoroalkyl, (d) methoxy, or
(e) methoxymethyl.

4. The compound or pharmaceutically acceptable salt according to claim 3, wherein n is 3 or 4, and $R^{1d}$ is monofluoromethyl, difluoromethyl or trifluoromethyl.

5. A compound selected from the following formulas:

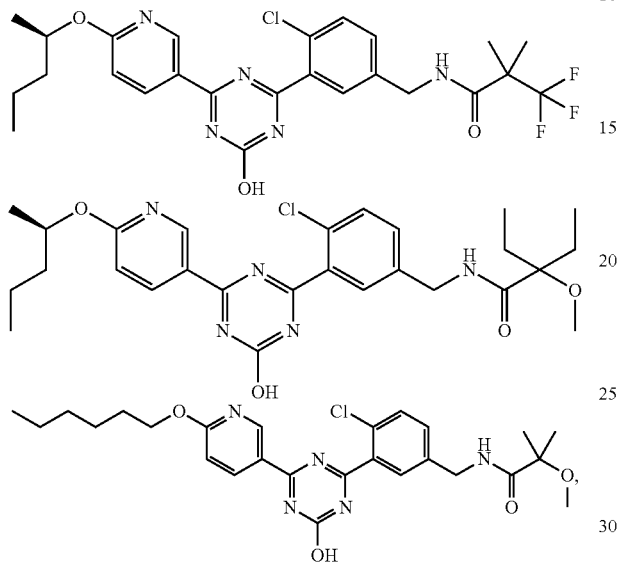

or a pharmaceutically acceptable salt thereof.

6. A pharmaceutical composition comprising the compound or pharmaceutically acceptable salt according to claim 1, and a pharmaceutically acceptable carrier.

7. A method of treating pain, rheumatism, fever, osteoarthritis, glaucoma, or ocular hypertension, which comprises administering a therapeutically effective amount of the compound or pharmaceutically acceptable salt according to claim 1 to a human in need thereof.

8. A compound of the following formula or a pharmaceutically acceptable salt thereof:

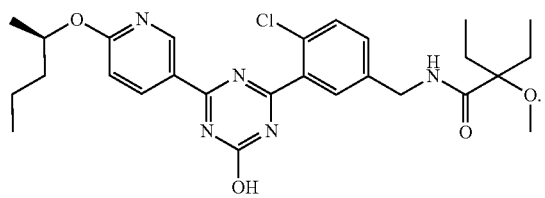 [SMILES: CCC[C@@H](C)Oc1ccc(-c2nc(O)nc(-c3cc(CNC(=O)C(CC)(CC)OC)ccc3Cl)n2)cn1]

9. A compound of the following formula: